(12) United States Patent
DiCorpo et al.

(10) Patent No.: US 12,450,413 B2
(45) Date of Patent: *Oct. 21, 2025

(54) SYSTEMS AND METHODS FOR ASSEMBLING AND DEVELOPING AN SoC EFFICIENTLY USING TEMPLATES AND DESIGNER INPUT DATA

(71) Applicant: efabless corporation, San Jose, CA (US)

(72) Inventors: Jeffrey DiCorpo, San Carlos, CA (US); Mohamed K. Kassem, Carlsbad, CA (US); Michael S. Wishart, Hillsborough, CA (US); Mohamed A. Shalan, Cairo (EG)

( * ) Notice: Subject to any disclaimer, the term of this patent is extended or adjusted under 35 U.S.C. 154(b) by 922 days.

This patent is subject to a terminal disclaimer.

(21) Appl. No.: 17/671,520

(22) Filed: Feb. 14, 2022

(65) Prior Publication Data
US 2022/0171911 A1    Jun. 2, 2022

Related U.S. Application Data

(63) Continuation of application No. 16/689,031, filed on Nov. 19, 2019, now Pat. No. 11,270,053, which is a (Continued)

(51) Int. Cl.
G06F 30/39     (2020.01)
G06F 30/30     (2020.01)
G06F 30/33     (2020.01)
G06F 30/3323   (2020.01)
G06F 30/367    (2020.01)
(Continued)

(52) U.S. Cl.
CPC ............. *G06F 30/39* (2020.01); *G06F 30/30* (2020.01); *G06F 30/33* (2020.01); *G06F 30/3323* (2020.01); *G06F 30/367* (2020.01); *G06F 30/392* (2020.01); *G06F 30/398* (2020.01); *H01L 23/573* (2013.01)

(58) Field of Classification Search
USPC .................... 716/119, 138, 104, 126; 703/15
See application file for complete search history.

(56) References Cited

U.S. PATENT DOCUMENTS 7,788,625 B1 *   8/2010   Donlin ................... G06F 30/30
                                                  716/109
8,769,477 B1 *   7/2014   Gathoo .................. G06F 30/34
                                                  716/139

(Continued)

Primary Examiner — Phallaka Kik
(74) Attorney, Agent, or Firm — PENILLA IP, APC

(57) ABSTRACT

Systems and methods for assembling and developing a System-on-a-chip (SoC) by using templates and designer input data are described. One of the methods includes receiving a request for generating a design of the SoC. In response to the request, a template database is accessed to provide templates of a plurality of designs of systems-on-chips (SoCs). Each of the templates is for a technology application. The method includes receiving a selection of one of the templates. The one of the templates represents components of the SoC. The method also includes receiving a configuration file including configuration data input for the components of the SoC. The method includes compiling the configuration file and a definition file for the SoC to generate design files for the SoC.

21 Claims, 30 Drawing Sheets

Related U.S. Application Data continuation-in-part of application No. 16/583,170, filed on Sep. 25, 2019, now Pat. No. 11,182,526, and a continuation-in-part of application No. 16/564,536, filed on Sep. 9, 2019, now Pat. No. 10,671,700, said application No. 16/583,170 is a continuation of application No. 15/633,186, filed on Jun. 26, 2017, now Pat. No. 10,452,802, said application No. 16/564,536 is a continuation of application No. 15/633,412, filed on Jun. 26, 2017, now Pat. No. 10,423,748.

(60) Provisional application No. 62/359,858, filed on Jul. 8, 2016.

(51) Int. Cl.
    *G06F 30/392*     (2020.01)
    *G06F 30/398*     (2020.01)
    *H01L 23/00*     (2006.01)

(56) References Cited

U.S. PATENT DOCUMENTS

| | | | |
|---|---|---|---|
| 9,792,397 B1* | 10/2017 | Nagaraja | G06F 30/32 |
| 10,423,748 B2* | 9/2019 | Irissou | G06F 30/30 |
| 10,452,802 B2* | 10/2019 | Irissou | G06F 30/392 |
| 10,671,700 B2* | 6/2020 | Irissou | G06F 30/3323 |
| 11,270,053 B2* | 3/2022 | DiCorpo | G06F 30/323 |
| 2003/0005396 A1* | 1/2003 | Chen | G06F 30/30 716/102 |
| 2003/0009658 A1* | 1/2003 | Chen | G06F 30/3308 713/153 |
| 2003/0009730 A1* | 1/2003 | Chen | G06F 30/33 716/102 |
| 2008/0222581 A1* | 9/2008 | Banerjee | G06Q 50/184 716/136 |
| 2009/0172621 A1* | 7/2009 | Sathe | G06F 30/30 716/113 |
| 2012/0210286 A1* | 8/2012 | Abdelhamid | G06F 30/327 716/113 |
| 2016/0070846 A1* | 3/2016 | Nandini | G06F 30/398 716/106 |
| 2016/0110458 A1* | 4/2016 | Colgrove | G06F 16/2448 707/706 |
| 2016/0299860 A1* | 10/2016 | Harriman | G06F 13/4282 |
| 2016/0306678 A1* | 10/2016 | Hira | G06F 9/5083 |
| 2017/0192513 A1* | 7/2017 | Karmon | G06V 40/28 |
| 2018/0260498 A1* | 9/2018 | Nagaraja | G06F 30/327 |
| 2019/0140995 A1* | 5/2019 | Roller | H04L 51/18 |
| 2019/0205493 A1* | 7/2019 | Garibay | G06F 30/398 |
| 2019/0259113 A1* | 8/2019 | Rao | G06F 16/13 |
| 2020/0201936 A1* | 6/2020 | Hanumanula | G06F 40/14 |
| 2021/0034225 A1* | 2/2021 | Harazi | G06F 3/0482 |

* cited by examiner

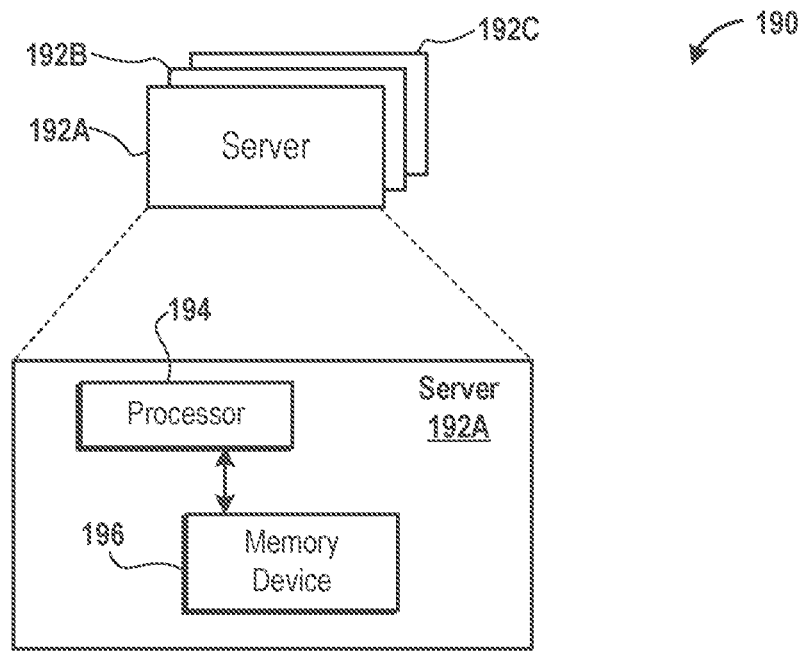
FIG. 1E-A
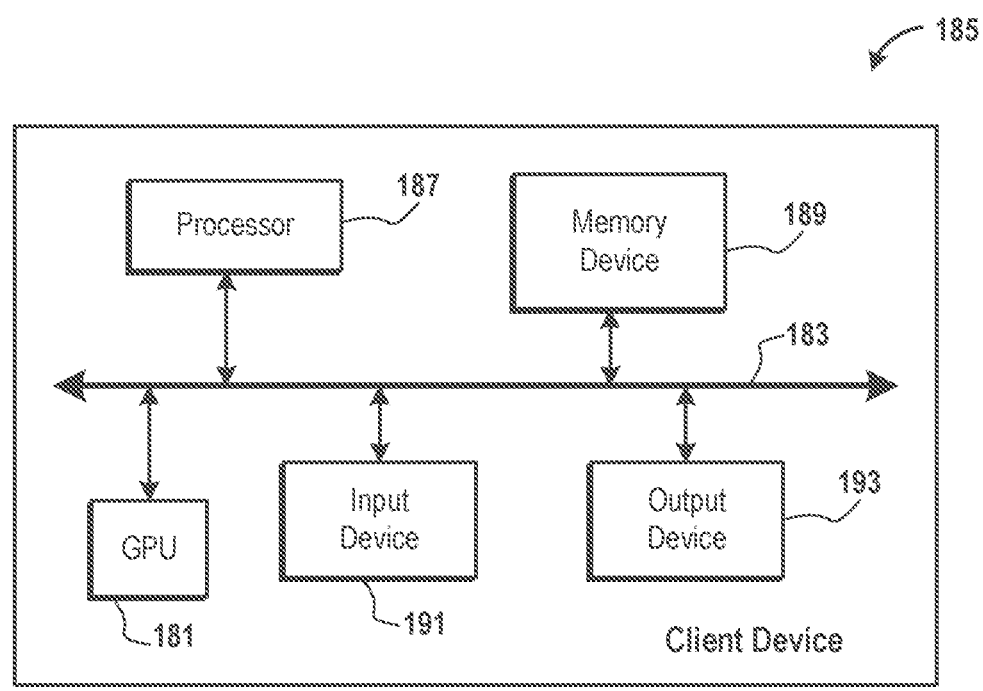
FIG. 1E-B

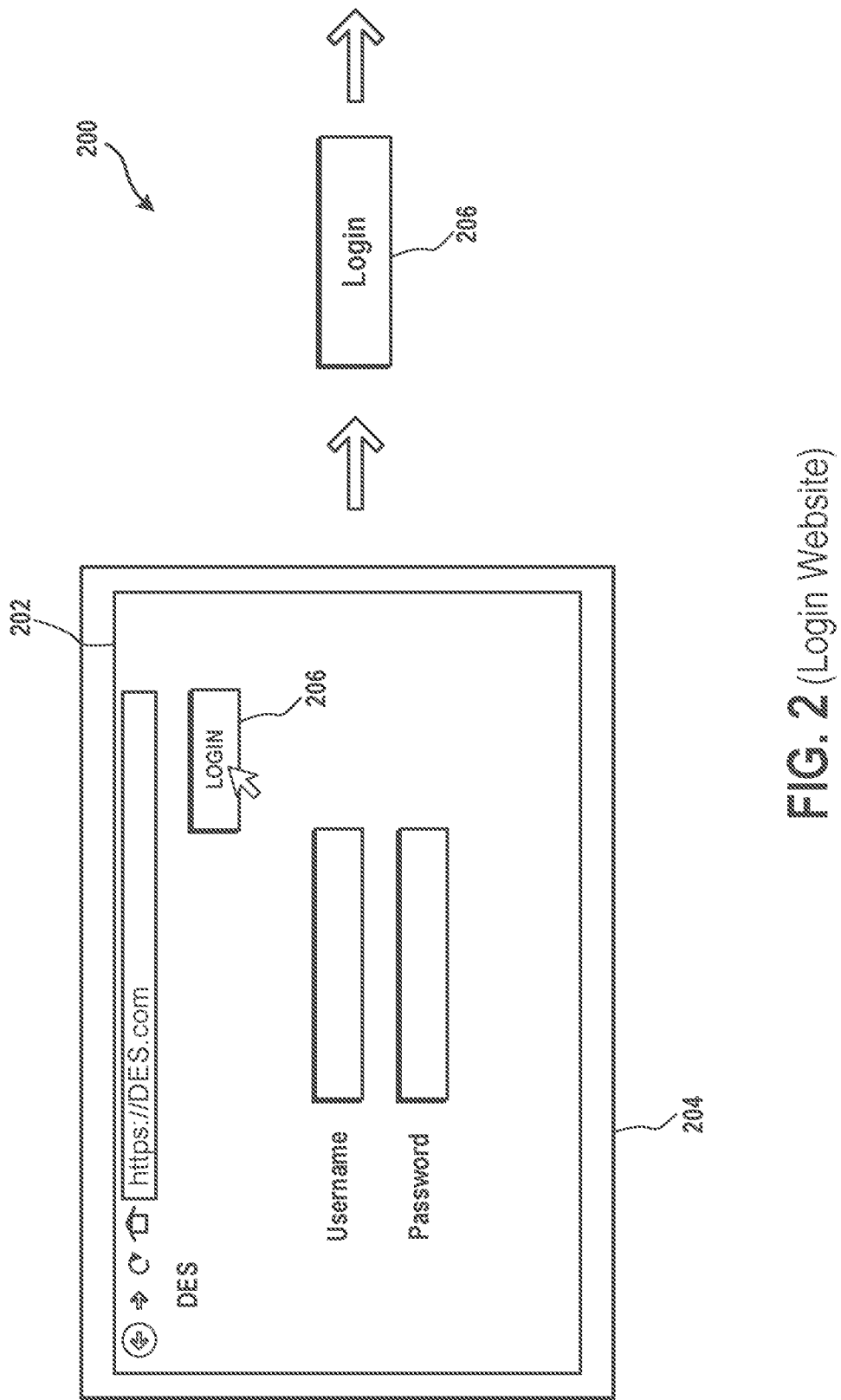
FIG. 2 (Login Website)

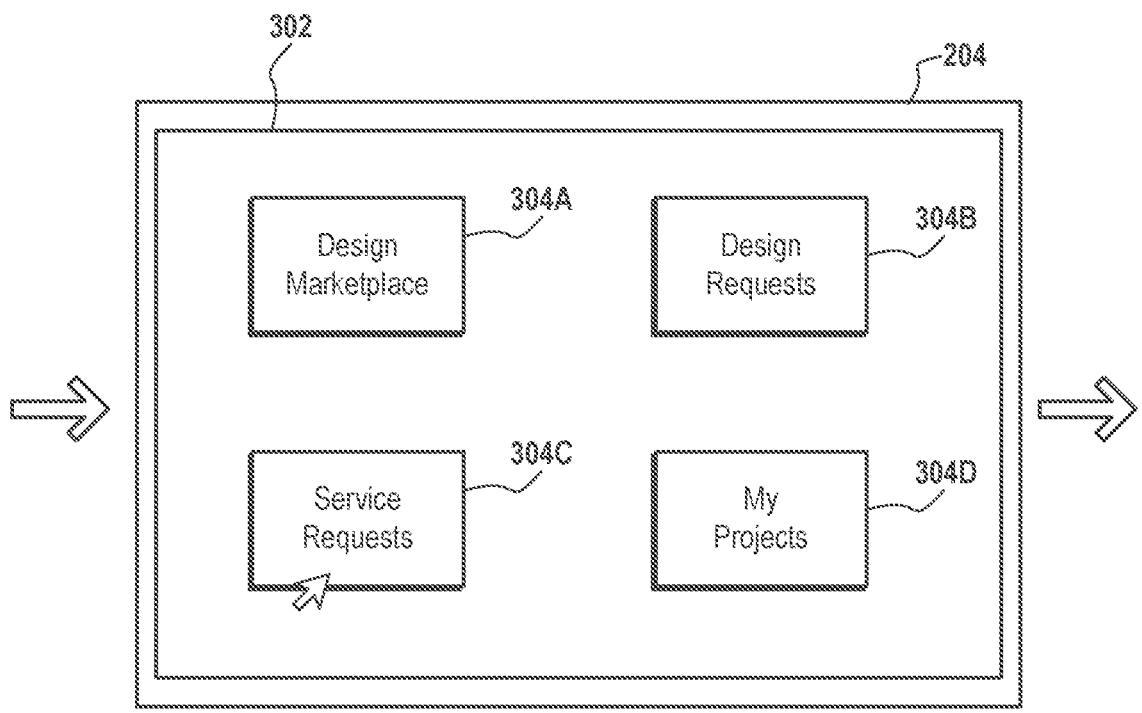
FIG. 3 (DES Webpage)
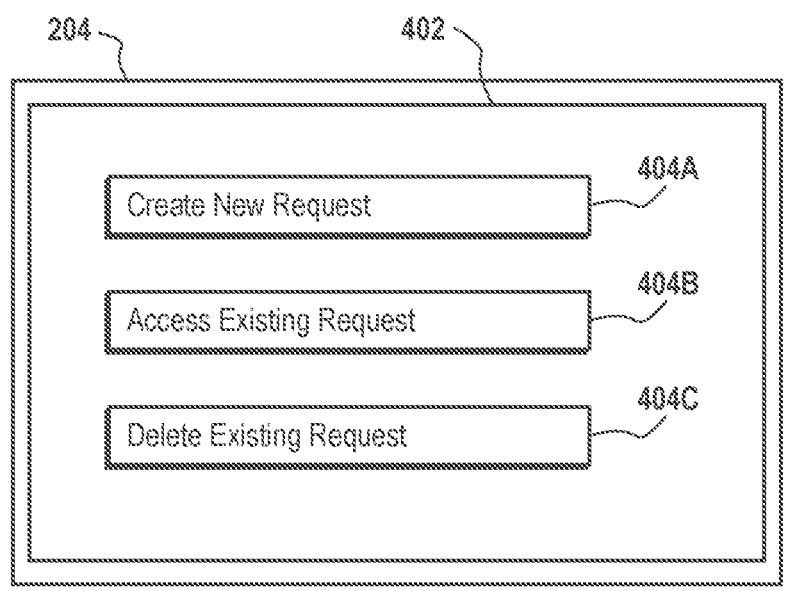
FIG. 4 (Service Request Webpage)

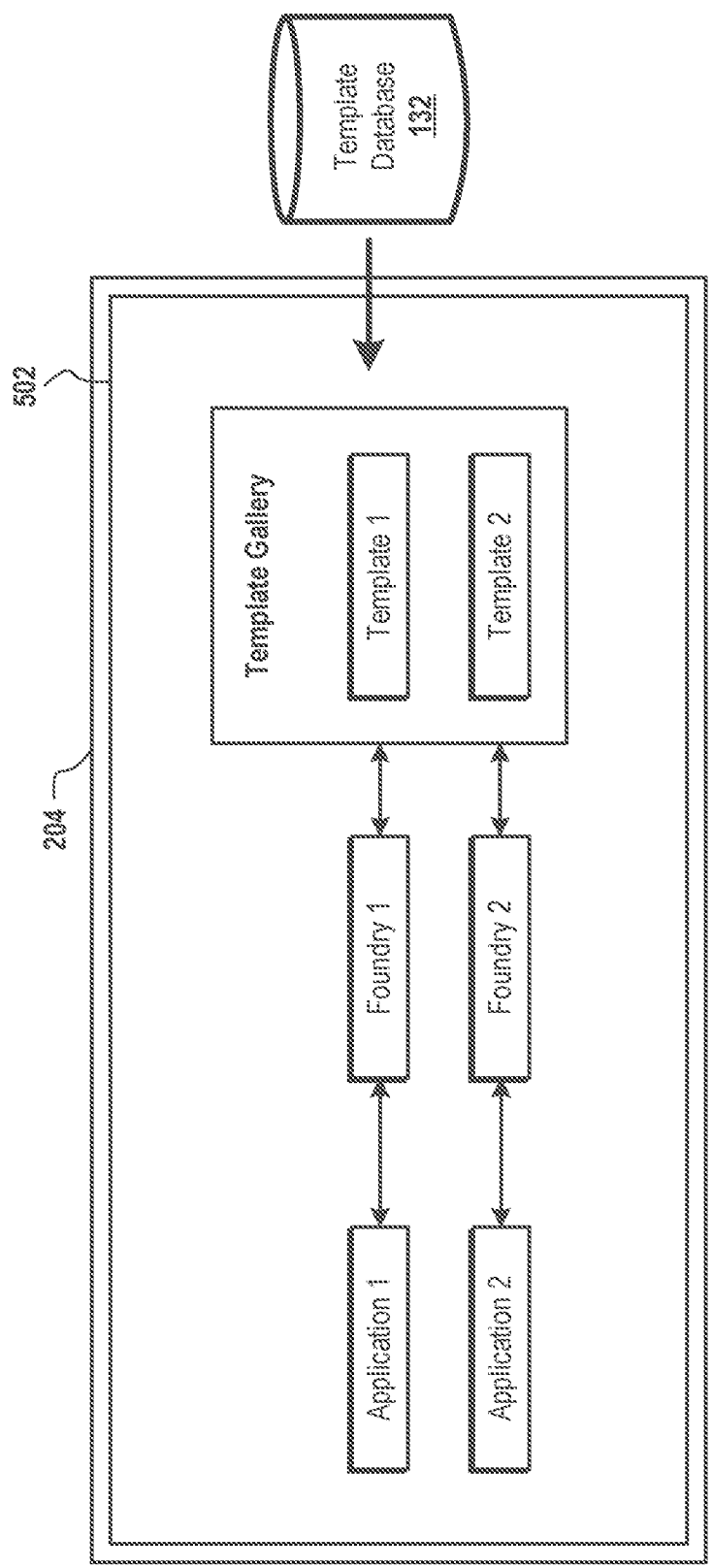

(Template Selection Webpage)

(Project Website)

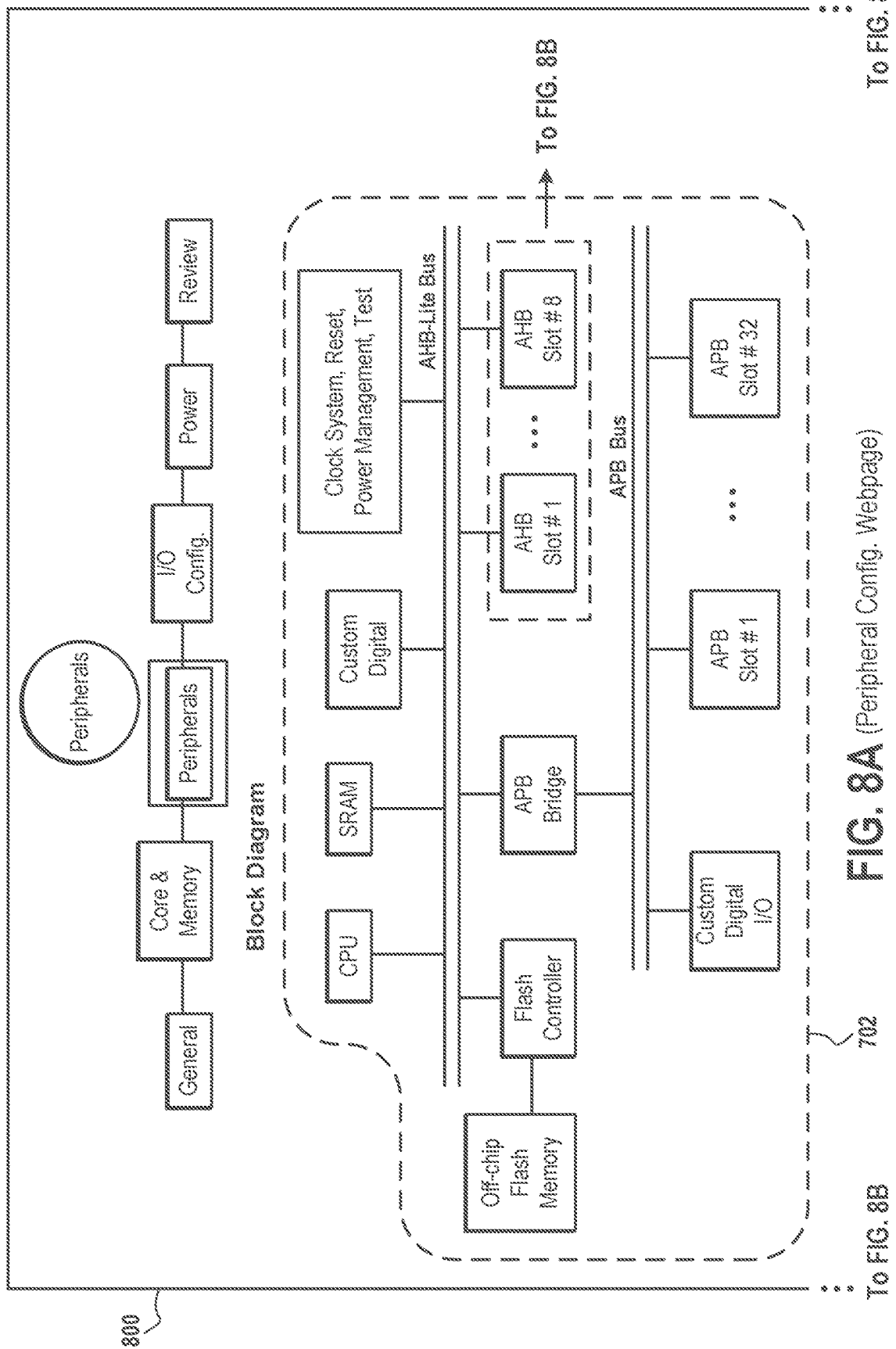
FIG. 8A (Peripheral Config. Webpage)

From FIG. 8A

APB Bus Peripherals

| Slot | Peripheral | Description |
|---|---|---|
| 1 | ADC – 12 Channel (858) | 10-bit successive approximation analog-to-digital converter (ADC) |
| 2 | ADC – 8 Channel (860) | 10-bit successive approximation analog-to-digital converter (ADC) |
| 3 | UART (862) | UART |
| 4 | System Clock (864) | System Clock |
| 5 | Timer (866) | 32-bit Timer |
| 6 | DAC – 10bit (868) | 10-bit voltage – scaling (potentiometric) digital-to-analog converter |
| 7 | I2C Master (870) | I2C Master, standard mode (up to 100 kbits.s) |
| 8 | Internal Reference Voltage (872) | Internal reference voltage (Vref = 1.235 V typ) |
| 9 | GPIO Port, 4-pin (874) | 4-pin GPIO for the APB bus |

Maximum 32 peripherals ← 880

[Add Row] [Previous] [Save] [Next]

From FIG. 8B

FIG. 8C

From FIG. 9A

| | | | |
|---|---|---|---|
| DAC – 10 bit | 0.26 | | [1] 918 |
| I2C Master | 0.27 | | [2] 920 |
| Internal Reference Voltage | 0.28 | | [0] 922 |
| GPIO Port, 4-pin (APB) | 0.2 | GPIO (1:3) | [4] 924 |
| RC Oscillator (5 MHz) | 0.16 | | [0] 926 |
| Crystal Oscillator (32.768 KHz) | 0.34 | | [0] 928 |
| Cortex M3 Core-32 Interrupts | 4.33 | XI, XO, RESET, WKUP, JTAG_TCLK, JTAG_TMS, JTAG_TDI, JTAG_TDO, SWDB_SCLK, SWDG_SIO, NMI | [15] 930 |
| SRAM 16KB | 3.19 | | [0] 932 |

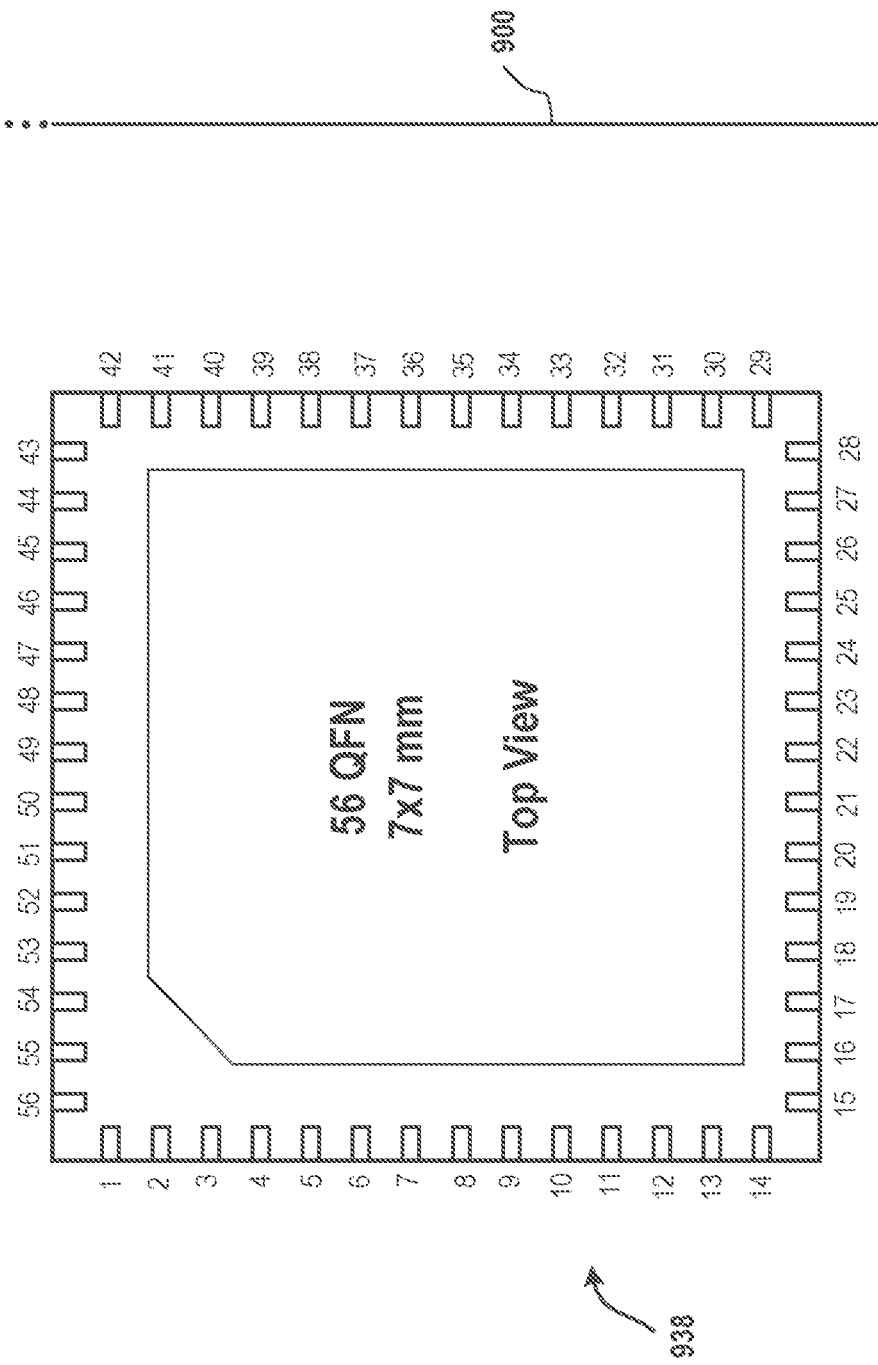

| SPECIFICATIONS | |
|---|---|
| CPU | 32-bit ARM® Cortex® - M3 Processor<br>Configuration:<br>1. 32 Interrupts<br>2. Wake-up Interrupt Controller<br>3. Serial Wire Debug<br>4. JTAG Controller |
| Memory | High Speed SRAM, 16KB<br>Typical Cycle Time = 4.262 ns<br>Worse Case Cycle Time- 7.829 ns<br>Typical Access Time (CLOAD = 0.2pf) = 3.146 ns |
| Internal CLK | Robust 5 MHz Low-Voltage RC Oscillator with internal R and C |
| GPIO Port 4-pin (AHB) | 4-Pin GPIO Port for the AHB Bus |
| SPI Master (AHB) | SPI Master Controller for the AHB Bus |
| SPI Master (AHB) | SPI Master Controller for the AHB Bus |
| ADC – 12 Channel | 10-bit Successive Approximation Analog-to-Digital Converter (ADC) |

FIG. 11C

| | |
|---|---|
| ADC – 8 Channel | 10-bit Successive Approximation Analog-to-Digital Converter (ADC) |
| UART | UART |
| System Clock | System Clock |
| Timer | 32-bit Timer |
| DAC – 10 bit | 10-bit Voltage-Scaling (Potentiometric) Digital-to-Analog Converter (DAC) |
| I2C Master | I2C Master, Standard Mode (up to 100 Kbits.s) |
| Internal Ref Voltage | Internal Reference Voltage (Vref = 1.235V typ) |
| GPIO Port, 4-pin (APB) | 4-Pin GPIO Port for the APB bus |

FIG. 11D

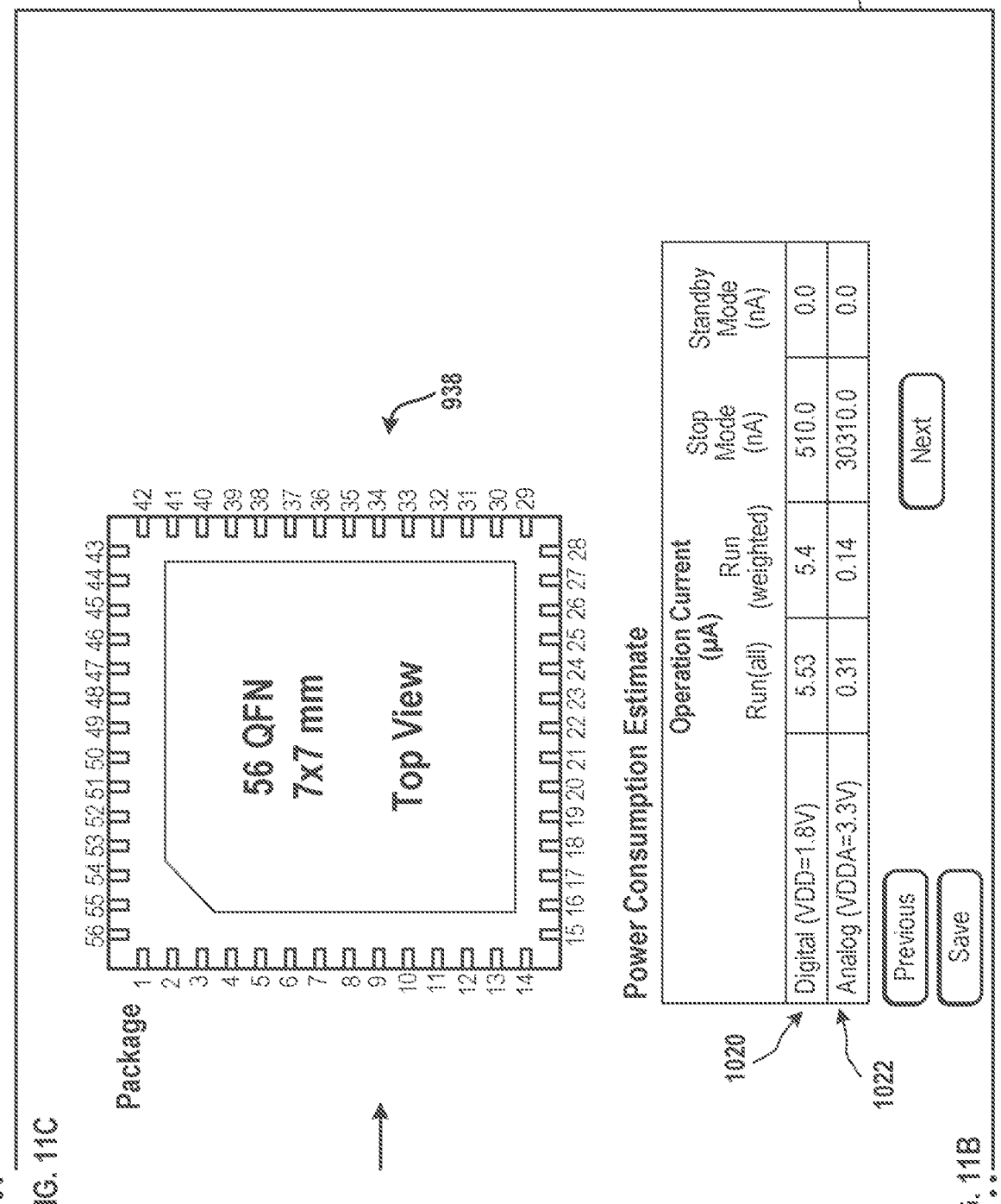

SYSTEMS AND METHODS FOR ASSEMBLING AND DEVELOPING AN SoC EFFICIENTLY USING TEMPLATES AND DESIGNER INPUT DATA

CLAIM OF PRIORITY

The present patent application is a continuation of and claims the benefit of and priority, under 35 U.S.C. § 120, to U.S. nonprovisional application Ser. No. 16/689,031, filed on Nov. 19, 2019, and titled "Systems and Methods for Assembling and Developing an SoC Efficiently Using Templates and Designer Input Data", which is a continuation-in-part of and claims the benefit of and priority, under 35 U.S.C. § 120, to U.S. nonprovisional application Ser. No. 16/564,536, filed on Sep. 9, 2019, titled "Systems and Methods for Obfuscating a Circuit Design", and now issued as U.S. Pat. No. 10,671,700, which is a continuation of and claims the benefit of and priority, under 35 U.S.C. § 120, to U.S. nonprovisional application Ser. No. 15/633,412, filed on Jun. 26, 2017, titled "Systems and Methods for Obfuscating a Circuit Design", and now issued as U.S. Pat. No. 10,423,748, which claims priority, under 35 U.S.C. § 119(e), to a U.S. provisional patent application having application No. 62/359,858, filed on Jul. 8, 2016, and titled "Systems and Methods for Engineering Integrated Circuit Design and Development", all of which are incorporated by reference herein in their entirety.

The U.S. nonprovisional application Ser. No. 16/689,031 is a continuation-in-part of and claims the benefit of and priority, under 35 U.S.C. § 120, to U.S. nonprovisional application Ser. No. 16/583,170, filed on Sep. 25, 2019, titled "Methods for Engineering Integrated Circuit Design and Development", now issued as U.S. Pat. No. 11,182,526, which is a continuation of and claims the benefit of and priority, under 35 U.S.C. § 120, to U.S. nonprovisional application Ser. No. 15/633,186, filed on Jun. 26, 2017, titled "Methods for Engineering Integrated Circuit Design and Development", which claims priority, under 35 U.S.C. § 119(e), to a U.S. provisional patent application having application No. 62/359,858, filed on Jul. 8, 2016, and titled "Systems and Methods for Engineering Integrated Circuit Design and Development", all of which are incorporated by reference herein in their entirety.

FIELD

The present embodiments relate to systems and methods for assembling and developing a System-on-a-chip (SoC) by using templates and designer input data.

BACKGROUND

System-on-a-chip (SoC) industry has developed rapidly over the years from producing very large scale integration (VLSI) devices that integrate a processor, memory and a few peripheral components onto a single chip to today's complex, high-performance SoCs that incorporate hundreds of intellectual property (IP) blocks. Complex systems have always been hard to build and debug. Several types of computer-aided design (CAD) tools are available to aid in the design and fabrication of SoCs. Such computer-aided design tools can address both synthesis and optimization processes. Synthesis is generally defined as an automatic method of converting a higher level of abstraction to a lower level of abstraction.

The synthesis process generally begins with a designer compiling a set of system specifications based on a desired functionality of the SoC. These specifications can be used to define a SoC in terms of the desired inputs and outputs, as well as desired functionality such as available memory or clock speed. The specifications are then encoded in a hardware description language (HDL), such as VHSIC hardware description language (VHDL) available from Institute of Electrical and Electronics Engineers™ (IEEE) of New York, N.Y., or Verilog available from Cadence Design Systems™, Inc. of Santa Clara, California. From the HDL, the designer then generates a netlist including a list of gates and their interconnections, which is descriptive of parts of the SoC. Ultimately, a design of the SoC is generated and masks fabricated for producing the physical SoC, such as an integrated circuit chip.

It is important that the SoC be designed in an efficient manner. Any delay in designing the SoC increases time to market of the physical SoC.

SUMMARY

Embodiments of the disclosure provide apparatus, methods and computer programs for assembling and developing a System-on-a-chip (SoC) by using templates and designer input data.

It should be appreciated that the present embodiments can be implemented in numerous ways, e.g., a process, an apparatus, a system, a piece of hardware, or a method on a computer-readable medium. Several embodiments are described below. Other aspects will become apparent from the following detailed description, taken in conjunction with the accompanying drawings.

In one embodiment, the systems and methods, described herein, provide a customer, such as an original equipment manufacturer (OEM) or an original design manufacturer (ODM), or another entity, with a simple but effective means to estimate power, performance and area of custom silicon system-on-a-chip (SoC), and engage with design firms of a community to complete a design of the SoC. The customer interacts through a design engineering system (DES) using a series of pull-down menus with a pre-engineered design template and a database of silicon proven intellectual (IP) blocks to re-configure the design template for the SoC. As an example, the design template is a soft version of the SoC with a central processing unit (CPU) or a microprocessing unit (MPU) and various peripherals attached to one or more buses, such as a high-speed bus for accessing data from or writing data to memory, a digital bus for communication of computer instructions, and a peripheral bus for communicating instructions and data between peripherals and the CPU. The design template can be open source or proprietary, and can be designed by members of the community, or design partners, or design firms, or others and offered by the design engineering system. The design partners are design firms and may be business partners of a management entity that manages the design engineering system. The design template and additional design templates are accessed through the design engineering system.

Each of the design templates has a set of intellectual property (IP) associated with it in the form of IP blocks. As configuration data for configuring the design template is received, the configuration data is reflected in revisions of the design template. The provision of the design template reduces time to fabricate the SoC and costs associated with the fabrication. The design template provides configurable elements, such as the IP blocks, that allow the customer to specify and optimize an integrated SoC solution tailored to an application. Moreover, a circuit design of the SoC can be generated or a layout design of the SoC can be generated or the SoC can be fabricated based on the design template configured according to selections made by the customer. Time and cost for generating the circuit design, or the layout design, or for fabricating the SoC is much lower than that associated with creating a new design of the SoC that is started from scratch. Moreover, the template design is provided using a web-based platform that brings together resources, IP, design and manufacturing partners. Examples of the resources include a circuit design tool, a layout design tool, a circuit design verification tool, and a layout design verification tool.

Any request from the customer for a design of the SoC is made easy and streamlined through a web-based process, and engagement with the design firms or the members of the community is facilitated via the web-based platform. The web-based platform is accessible to a broad range of customers that request a design of the SoC, provides a superior design and functionality of the SoC, and reduces production costs of fabricating the SoC to improve margins for manufacturing the SoC.

In one embodiment, a method for providing real-time feedback for a template design of the SoC is described. The method includes receiving, by a server, a request via a computer network from a computing device for generating a design of the SoC. In response to the request from the computing device, the method further includes accessing a template database to provide templates of a plurality of designs of systems-on-chips (SoCs). Each of the templates is for a technology application. The method includes receiving a selection of one of the templates. The one of the templates represents components of the SoC. In the method, configuration data is input for each of the components of the SoC. Also, parameters are updated for the design of the SoC as inputs for the configuration data are provided for the SoC. The method includes receiving, via the computer network from the computing device, a configuration file including the configuration data input for the components of the SoC. The method also includes compiling, by the server, the configuration file and a definition file for the SoC to generate design files for the SoC.

In an embodiment, a server is described. The server includes a processor configured to receive a request via a computer network from a computing device for generating a design of the SoC. In response to the request from the computing device, the processor is configured to access a template database to provide templates of a plurality of designs of SoCs. Each of the templates is for a technology application. The processor is further configured to receive a selection of one of the templates. The one of the templates represents components of the SoC. Configuration data is input for each of the components of the SoC and parameters are updated for the design of the SoC as inputs for the configuration data are provided for the SoC. The processor is configured to receive, via the computer network from the computing device, a configuration file including the configuration data input for the components of the SoC. The processor is also configured to compile the configuration file and a definition file for the SoC to generate design files for the SoC. The server includes a memory device coupled to the processor. The memory device is configured to store the template database.

The systems and methods described herein allow the customer to configure the template design while providing the real-time feedback regarding one or more parameters, such as power consumption, speed of operation, licensing costs, and die area consumed. Also, the real-time feedback regarding whether the configuration meets performance rules is provided. The real-time feedback regarding whether the configuration meets the performance rules increases efficiency in designing the SoC. Based on the real-time feedback, which indicates that the SoC is not being appropriately configured, the customer can adjust configuration data of the SoC. This increases efficiency in designing the SoC, which decreases time to market of a physical integrated circuit chip of the SoC.

Other aspects described in the present disclosure will become apparent from the following detailed description, taken in conjunction with the accompanying drawings, illustrating by way of example the principles of various embodiments described in the present disclosure.

BRIEF DESCRIPTION OF THE DRAWINGS

The embodiments are understood by reference to the following description taken in conjunction with the accompanying drawings.

FIG. 1E-A is a diagram of an embodiment of multiple servers, which are examples of the one or more servers of the DES.

FIG. 1E-B is a diagram of an embodiment of a client device.

FIG. 4 is a diagram of an embodiment of a service request webpage for requesting a service for selecting and configuring the template design.

FIG. 5A is a diagram of an embodiment of a template selection webpage for selecting the template design.

FIG. 5B-2 is a diagram of an embodiment of a second portion of the template selection webpage of FIG. 5B-1.

FIG. 5B-3 is a diagram of an embodiment of a third portion of the template selection webpage of FIG. 5B-1.

FIG. 8A is a diagram of an embodiment of a first portion of a peripheral configuration webpage that is used to receive configuration data for configuring peripherals of the SoC.

FIG. 8C is an embodiment of a third portion of the peripheral configuration webpage.

FIG. 9B is a diagram of an embodiment of a second portion of the I/O configuration webpage.

FIG. 9D is a diagram of an embodiment of a fourth portion of the I/O configuration webpage.

FIG. 11C is a diagram of an embodiment of a third portion of the specification review webpage.

FIG. 11D is a diagram of an embodiment of a fourth portion of the specification review webpage.

FIG. 11E is a diagram of an embodiment of a fifth portion, which is the remaining portion of the specification review webpage.

DETAILED DESCRIPTION

The following embodiments describe systems and methods for assembling and developing a System-on-a-chip (SoC) by using templates and by leveraging multiple designers and partners to deliver the SoC. It will be apparent that the present embodiments may be practiced without some or all of these specific details. In other instances, well known process operations have not been described in detail in order not to unnecessarily obscure the present embodiments.

Figure 1A:
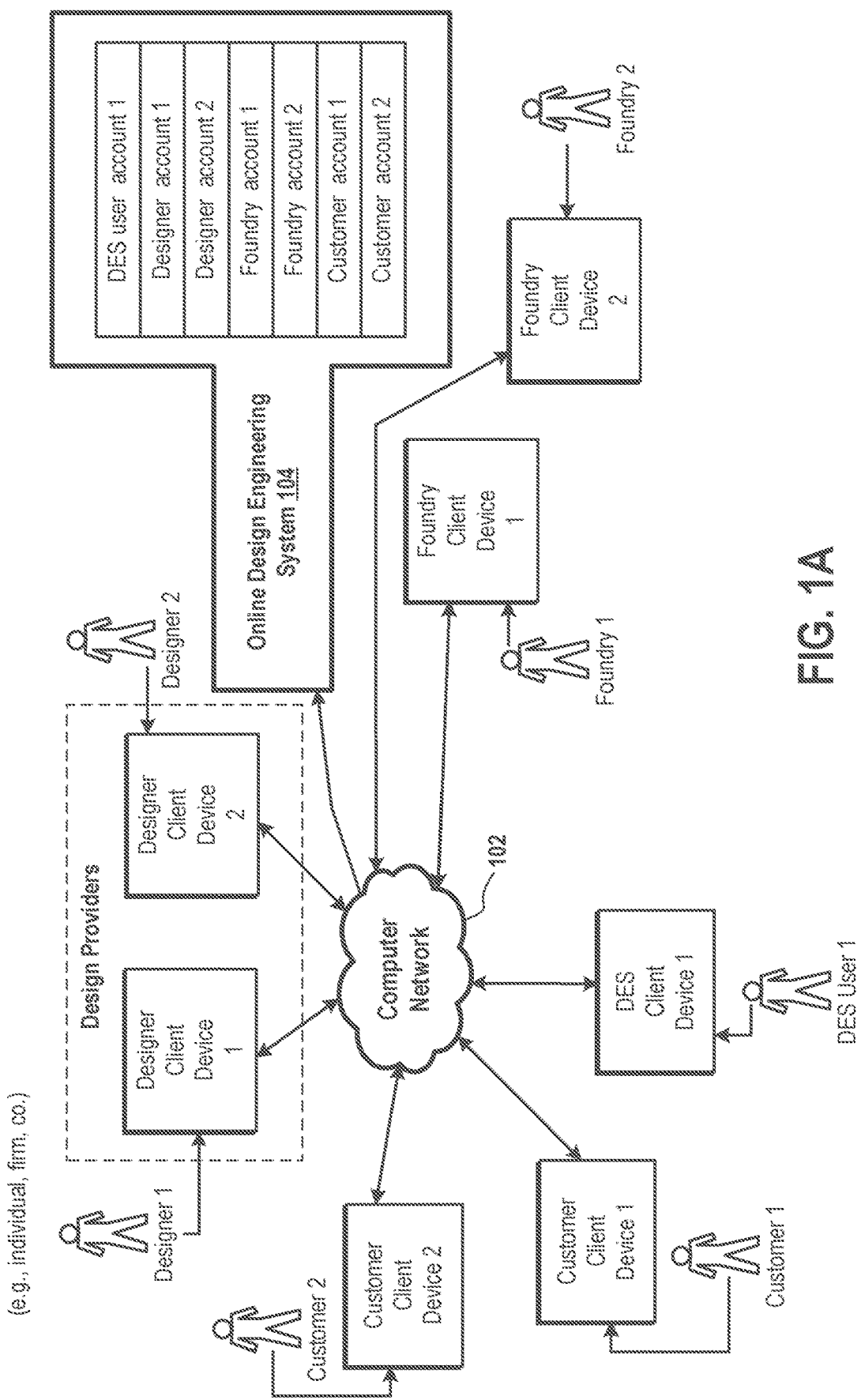
FIG. 1A is a diagram of an embodiment of a system to illustrate use of a design engineering system (DES) in fabricating a system-on-a-chip (SoC) from a design that is configured by a customer using a template.

FIG. 1A is a diagram of an embodiment of a system 100 to illustrate use of a design engineering system (DES) 104 in fabricating the SoC from a design that is configured by a customer, such as an original equipment manufacturer (OEM), or an original design manufacturer (ODM), using a template. It should be noted that the terms design engineering system and online design engineering system are used herein interchangeably. The SoC is sometimes referred to herein as custom silicon. For example, all components of the SoC are fabricated on a silicon substrate.

The system 100 includes the DES 104, a foundry client device 1, a foundry client device 2, a customer client device 1, a customer client device 2, a designer client device 1, and a designer client device 2. It should be noted that the terms client device and computing device are used herein interchangeably. Examples of a client device, as used herein, include a smart phone, a tablet, a phablet, a desktop computer, a laptop computer, and a smart television, etc. Each client device includes a processor, a memory device, one or more input devices, one or more output devices, and a network interface controller (NIC). Examples of an input device include a mouse, a stylus, a keyboard, a keypad, a touchpad, a touchscreen, etc. As used herein, the terms processor, an application specific integrated circuit (ASIC), a programmable logic device (PLD), a central processing unit (CPU), a microcontroller, a controller, and a microprocessor are used herein interchangeably. An example of a controller includes a processor and a memory device, and the processor is coupled to the memory device. Another example of the controller includes a processor and the controller does not include a memory device. Examples of the memory device include a read-only memory (ROM) and a random access memory (RAM). To illustrate, a memory device is a flash memory or a volatile memory or a non-volatile memory or a redundant array of independent disks (RAID). A memory device, as used herein, is an example of a computer-readable medium. Examples of the NIC include a network interface card that facilitates communication of the client device with a computer network 102. Examples of the one or more output devices include a display device, such as a liquid crystal display (LCD), a light emitting diode display (LED), and a plasma display. Other examples of the one or more output devices include one or more speakers and haptic feedback devices.

The system 100 further includes the computer network 102. The customer client devices 1 and 2, the foundry client devices 1 and 2, the DES 104, and the designer client devices 1 and 2 are coupled to each other via the computer network 102. Examples of the computer network 102 include a local area network (LAN), such as an Intranet, and a wide area network (WAN), such as the Internet, or a combination of the LAN and WAN. To illustrate, a communication protocol, such as Transmission Control Protocol (TCP) over Internet Protocol (IP) or a Universal Datagram Protocol (UDP) over IP, is applied by client devices, described herein, to communicate via the computer network 102 with each other. To further illustrate, packets, such as TCP/IP or UDP/IP packets are generated by a NIC of a sending client device and the packets are depacketized by a NIC of a receiving client device to extract data within the packets.

The DES 104 is a network of servers and computing devices that are coupled to each other to perform functions or services or operations, described herein, as being performed by the DES 104. For example, the servers and the computing devices of the DES 104 are coupled with each other via the computer network 102 or via a LAN. An example of the DES 104 is provided in U.S. patent application Ser. No. 15/633,186, U.S. patent application Ser. No. 15/633,253, and U.S. patent application Ser. No. 15/633,412, all of which are incorporated by reference herein in their entirety.

A customer 1, a customer 2, a designer 1, a designer 2, a foundry 1, and a foundry 2 are members of a community. A community member, as described herein, is a person or an entity that is a member of the community. For example, the community member is assigned a username and password by one or more servers, such as an authentication server, of the DES 104. In this example, the community member is allowed access to his/her account stored within the one or more servers of the DES 104 when the username and password that is received via the computer network 102 from a client device operated by the community member is authenticated by the one or more servers of the DES 104. Examples of an entity include a company and a firm. The community is a network of members that are allowed access to one or more design tools of the DES 104 to facilitate generation of circuit and layout designs of the SoC. Examples of the design tools include a circuit design tool, a circuit design verification tool, a layout design tool, and a layout design verification tool. To illustrate, the circuit design tool is executed by the one or more servers of the DES 104 to create a circuit design of the SoC and the layout design tool is executed by the one or more servers to create a layout design of the SoC. Examples of the circuit design tool include a computer program such as Ngspice™, or Cider™, or Xspice™. An example of the layout design tool is a computer program that is executed to generate multiple planes, such as intellectual property (IP) layers, in which each plane includes tiles, such as rectangles. A tile is a cell that represents a portion of the electrical circuit, such as n-type well or a p-type well or a via or an interconnect between two components of the electrical circuit. The tiles and the interconnect are examples of layout design features. As an illustration, Magic™ is an example of the layout design tool. Moreover, the circuit design verification tool is executed by the one or more servers of the DES 104 to validate or verify the circuit design of the SoC and the layout design verification tool is executed by the one or more servers of the DES 104 to validate or verify the layout design of the SoC. As an example, the circuit design verification tool is a computer program that is executed by the one or more servers of the DES 104 to test a circuit design to determine whether the circuit design passes or fails a test. As another example, the layout design verification tool is a computer program that is executed by the one or more servers of the DES 104 to test a layout design to determine whether the layout design passes or fails a test. Also, further examples of the design tools are provided in U.S. patent application Ser. No. 15/633,186, U.S. patent application Ser. No. 15/633,253, and U.S. patent application Ser. No. 15/633, 412.

The community is managed by a design engineering entity, which is a company. A DES user 1 is employed by or owns part or all of the design engineering entity. As an example, the DES user 1 manages the DES system 104. The DES user 1 logs into his/her DES user account 1 to access the DES 104 via a DES client device 1. The DES user account 1 is assigned by the one or more servers of the DES 104 to the DES user 1.

The customer 1 is assigned a customer account 1 by the one or more servers of the DES 104. Similarly, the customer 2 is assigned a customer account 2 by the one or more servers of the DES 104, the designer 1 is assigned a designer account 1 by the one or more servers, the designer 2 is assigned a designer account 2 by the one or more servers, the foundry 1 is assigned a foundry account 1 by the one or more servers, and the foundry 2 is assigned a foundry account 2 by the one or more servers of the DES 104.

The customer client devices are operated by the customers. For example, the customer client device 1 is operated by a customer 1 and the customer client device 2 is operated by a customer 2. Examples of the customers 1 and 2 include persons that are employed by or own part or all of an entity, such as the OEM or ODM.

Also, the designer client devices 1 and 2 are operated by designers. As an example, the designer client device 1 is operated by a designer 1 and the designer client device 2 is operated by another designer 2. Examples of the designers 1 and 2 include persons that are employed by or own part or all of an entity, such as a design engineering firm.

The foundry client devices 1 and 2 are operated by foundries that fabricate SoCs. For example, the foundry client device 1 is operated by the foundry 1 and the foundry client device 2 is operated by the foundry 2. A foundry, as used herein, is generally an entity or a person employed by the entity that operates a semiconductor fabrication plant where integrated circuits, such as SoCs, are fabricated.

The customer 1 uses an input device of the customer client device 1 to log into the customer account 1 and generates a service request for creating a template design of the SoC. A NIC of the customer client device 1 communicates the service request in the form of packets via the computer network 102 to the DES 104. Upon receiving the service request, the DES 104 provides access, via the customer account 1 and the computer 102, to multiple templates for generation of the template design of the SoC. The access is provided to the customer client device 1.

Once a selection of one of the templates is received from the customer client device 1 via the computer network 102 and the customer account 1, the DES 104 provides, via the customer account 1 and the computer network 102, copies of configuration tools, a copy of a parameter compute tool, and a copy of a feedback tool, all of which are described below with reference to FIG. 1F. The copies of the configuration tools, the parameter computer tool, and the feedback tool are sent from the DES 104 via the computer network 102 to the customer client device 1 for storage in a memory device of the customer client device 1. The configuration tools of the customer client device 1 facilitate receipt of configuration data that is input by the customer 1 via the input device of the customer client device 1 and the customer account 1 to configure the template design of the SoC. The parameter compute tool and the feedback tool are further described below. Any tools, such as the configuration tools, the parameter compute tool, and the feedback tool of the customer client device 1 are executed by a processor of the customer client device 1 to generate one or more outputs based on functions that are integrated within the tools.

When configuration data is received by the configuration tools of the customer client device 1, the configuration tools provide the configuration data to the parameter compute tool of the customer client device 1. Upon receiving the configuration data, the parameter compute tool of the customer client device 1 processes the configuration data to determine one or more parameters, such as one or more metrics, to further provide a real-time update of the one or more parameters on a display device of the customer client device 1. For example, the parameter compute tool of the customer client device 1 determines an amount of space on a wafer die consumed by a core and memory and provides the amount of space in real-time to a display device of the customer client device 1 via the customer account 1 for display on the customer client device 1. Moreover, in this example, the configuration tools of the customer client device 1 have not yet received the configuration data for configuring a peripheral of the SoC, configuring an input/output (I/O) of the SoC, or configuring an amount of power consumed by the SoC. Also, in this example, the customer client device 1 displays an estimate of the amount of space on the wafer die via the customer account 1 on the display device of the customer client device 1, in real-time, which is before the customer client device 1 receives one or more of remaining configuration data via the customer account 1 for configuring the core and memory of the SoC, or the configuration data for configuring the peripheral of the SoC, or the configuration data for configuring the I/O of the SoC, or the configuration data for configuring the amount of power consumed by the SoC.

As another example, the operation of processing the configuration data received by the customer client device 1 is completed by the parameter compute tool of the customer client device 1 before additional configuration data is received by the configuration tools of the customer client device 1 from the input device of the customer client device 1 via the customer account 1. With receipt of the additional configuration data via the customer account 1, the one or more parameters are updated by the parameter compute tool of the customer client device 1 for display on the display device of the customer client device 1.

Once the customer 1 uses the input device of the customer client device 1 to publish configuration data, such as configuration data 140 and additional configuration data 142, described below, of the template design of the SoC, the processor of the customer client device 1 generates a configuration file and a request for publication of the template design and sends the request and the configuration file via the computer network 102 and the customer account 1 to the DES 104. Upon receiving the request to publish, the DES 104 publishes the template design and the configuration data of the SoC on a webpage that is accessible by a member of the community via his/her account assigned by the DES 104. The one or more servers publish the template design and the configuration data with a request for generating the circuit design, or the layout design, or both the circuit and layout designs of the SoC on the webpage. The circuit design, or the layout design, or both the circuit and layout designs of the SoC are to be generated based on the template design configured according to the configuration data that is published.

Upon viewing the template design and the configuration data, one or more designers, such as the designer 1 and the designer 2, accept the request for generating the circuit design, or the layout design, or both the circuit and layout designs via his/her account. For example, the designer 1 accepts via the designer account 1 the request for generating the circuit design, or the layout design, or both the circuit and layout designs via the designer client device 1 and the designer 2 accepts via the designer account 2 the request for generating the circuit design, or the layout design, or both the circuit and layout designs via the designer client device 2.

The designer 1 uses the designer client device 1 to access the circuit design tool via the computer network 102 and the designer account 1 from the DES 104 to generate a circuit design of the SoC based on the template design and a specification of the template design. The specification of the template design is received within the configuration file and is further described below. The circuit design tool that is accessed by the designer client device 1 from the DES 104 via the designer account 1 and the computer network 102 cannot be stored within a memory device of the designer client device 1. As an alternative or in addition, the designer 1 uses the designer client device 1 to access a circuit design tool that is stored within the memory device of the designer client device 1. Either the circuit design tool stored within the DES 104 or within the designer client device 1 or both the circuit design tools stored within the DES 104 and the designer client device 1 are accessed by the designer 1 to generate the circuit design of the SoC. An input device of the designer client device 1 is used by the designer 1 to create a circuit design file, store the circuit design within the circuit design file, and send the circuit design file via the computer network 1 and the designer account 1 to the DES 104 for storage within the one or more servers. For example, once the circuit design is created, the input device of the designer client device 1 is used to execute a compiler. The compiler compiles the configuration file and an SoC definition file to generate a compiled file, such as the circuit design file.

Similarly, the designer 1 uses the input device of the designer client device 1 to access the layout design tool via the computer network 102 and the designer account 1 from the DES 104 to generate a layout design of the SoC. The layout design tool that is accessed from the DES 104 via the designer account 1 cannot be stored within a memory device of the designer client device 1. Alternatively or in addition, the designer 1 uses the designer client device 1 to access a layout design tool that is stored locally within the memory device of the designer client device 1. Either the layout design tool stored within the DES 104 or the layout design tool stored within the designer client device 1 or both the layout design tools stored within the DES 104 and the designer client device 1 are accessed to generate the layout design of the SoC. The input device of the designer client device 1 is used by the designer 1 to create a layout design file, store the layout design within the layout design file, and send the layout design file via the computer network 1 and the designer account 1 to the one or more servers of the DES 104 for storage. For example, once the layout design is created, the input device of the designer client device 1 is used to execute the compiler. The compiler compiles the configuration file and the SoC definition file to generate a compiled file, such as the layout design file.

The one or more servers of the DES 104 send the layout design file or both circuit design file and the layout design file via the computer network 102 to the foundry client device 1. The foundry 1 accesses, via the foundry account 1, the layout design file or both circuit design file and the layout design file from a memory device of the foundry client device 1 and fabricates an integrated circuit including the SoC, tests the integrated circuit, and sends the integrated circuit to the customer 1 for use by the customer 1. It should be noted that there is no need for the one or more servers of the DES 104 to receive a request from the foundry client device 1 to provide the layout design file or both circuit design file and the layout design file via the computer network 102 to the foundry client device 1. For example, without receiving the request, the one or more servers of the DES 104 send the layout design file or both circuit design file and the layout design file via the computer network 102 and the foundry account 1 to the foundry client device 1 for fabrication of the SoC.

In an embodiment, a webpage, as used herein, is displayed after execution of a web browser program by a processor of a client device. As an example, a webpage is written in Hypertext Markup Language (HTML) and is accessed when a Uniform Resource Locator (URL) address is entered by a user, such as a customer, or a foundry, or a designer, via an input device of a client device.

In some embodiments, a tool, as described herein, is a computer program or a software code that is executed by one or more processors to produce one or more outputs. In an embodiment, a tool, as described herein, is a processor or a server that implements functions or operations, described herein, as being performed by the tool. In one embodiment, a tool includes a combination of software and hardware. For example, a tool is a PLD that implements functions described herein as being performed by the tool.

It should be noted that although a limited number of foundry client devices are illustrated in FIG. 1A, in one embodiment, any other number of foundry client devices can be used. Similarly, in one embodiment, any other number of customer client devices or designer client devices can be used. Also, although one DES user 1 is illustrated in FIG. 1A, in one embodiment, the DES system 104 is managed by multiple DES users. For example, each DES user communicates with the DES 104 via a corresponding DES client device.

In one embodiment, the customer 1 or 2 is a person that is not employed by or owns part or all of the entity, such as the OEM or ODM. Also, in an embodiment, the designer 1 or 2 is a person that is not employed by or owns part or all of the entity, such as the design engineering entity.

In an embodiment, a designer can use one or more design tools that are not stored within the DES 104 to create or verify a design of the SoC. For example, the designer 1 accesses a circuit design verification tool that is stored in a memory device of the designer client device 1 and uses the input device of the designer client device 1 to verify a circuit design of the SoC or uses a layout design verification tool stored in the memory device of the designer client device 1 and uses the input device to verify a layout design of the SoC.

In one embodiment, a template, as used herein, includes a test bench for testing a design of the SoC.

In one embodiment, a template of the SoC is for a higher-level design of the SoC. For example, the template is for a multi-chip module (MCM), which is an electronic assembly where multiple integrated circuits, semiconductor dies, and/or other discrete components are integrated onto a unifying substrate so that the SoC can be treated as a larger integrated circuit.

In an embodiment, one or more of the functions described herein as being performed by the DES 104 can be accessed by a customer without registering with the DES 104. For example, there is no need for the customer 1 to be assigned the customer account 1 to view a template design of the SoC that is accessed from the DES 104. The customer account 1 is assigned when the template design is to be modified.

Figure 1B:
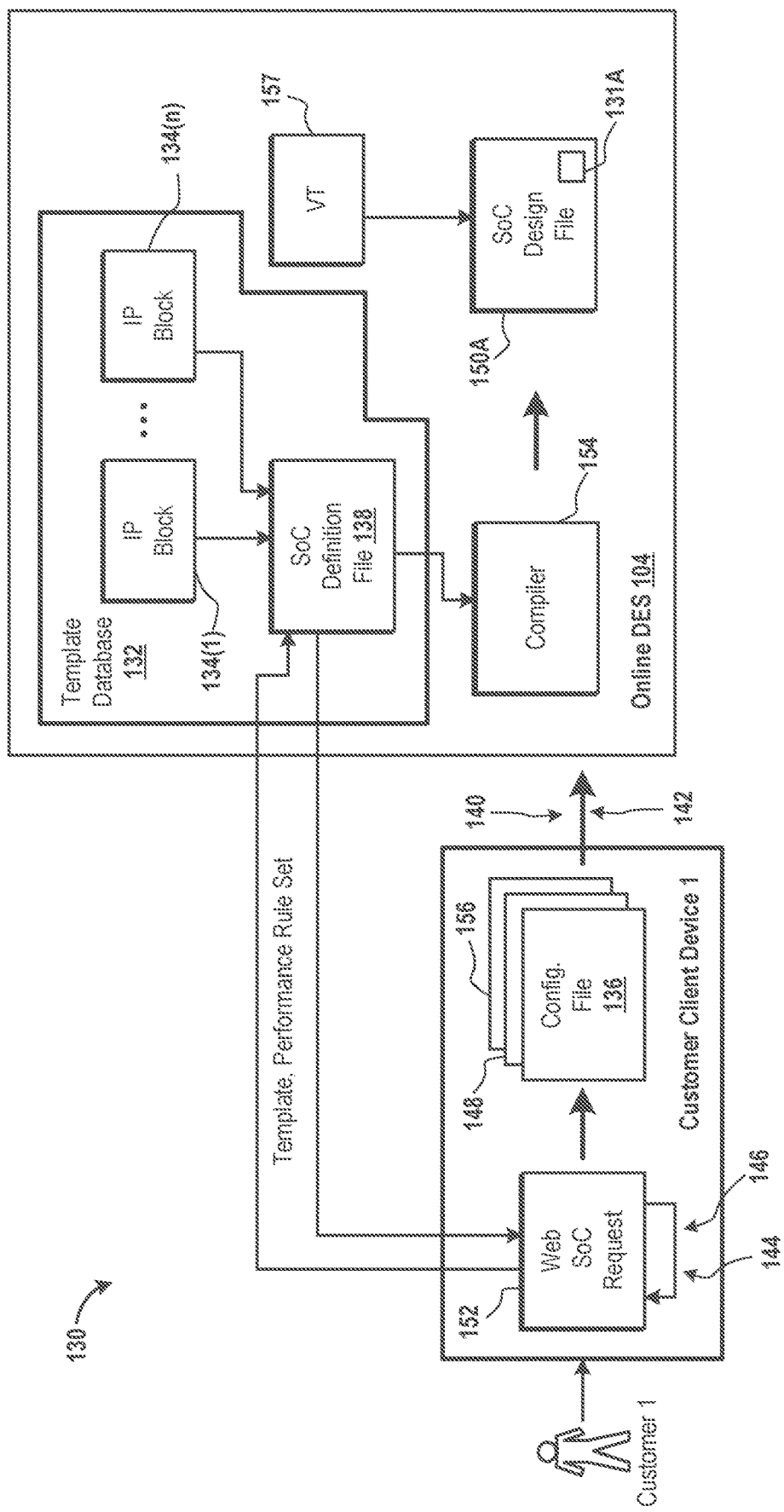
FIG. 1B is a diagram of an embodiment of a system to illustrate a real-time determination of parameters by the DES based on configuration data that is received from a customer client device via a computer network.

FIG. 1B is a diagram of an embodiment of a system 130 to illustrate a real-time determination of parameters by the processor of the customer client device 1 based on configuration data that is received via the input device of the customer client device 1. The system 130 includes the customer client device 1 and the DES 104.

When the customer 1 logs into its customer account 1 after being authenticated by the one or more servers of the DES 104, the one or more servers of the DES 104 generate webpage data and sends the webpage data via the computer network 102 to the display device of the customer client device 1 to display a webpage 152 on the display device. For example, the one or more servers of the DES 104 access an SoC definition file 138 stored within a template database 132. The template database 132 is a database within the DES 104 and is coupled to the one or more servers or is a portion of the one or more servers of the DES 104. The SoC definition file 138 is a structured file that has multiple templates for defining designs of different SoCs or configuring the different SoCs. In addition, for each design template, the SoC definition file 138 provides limits or constraints on configuration data that can be filled on the webpage 152. For example, a field within the webpage 152 includes two options, which include a Cortex M0™ core and a Cortex M3™ core and there are no other options within the field. The Cortex M0™ and Cortex M3™ are examples of types of cores. Other examples of types of cores include Cortex M4™, Cortex M7™, and Cortex M33™ cores. Cortex-M™ cores are used as dedicated microcontroller chips, but can also be integrated inside of SoC integrated circuit chips as power management controllers, I/O controllers, system controllers, touch screen controllers, smart battery controllers, and sensor controllers. One type of core differs from another type of core in terms of parameters, such as power consumption, performance, and speed of operation, using which instructions are processed.

Each design template includes one or more IP blocks, which are labeled as 134(1) through 134(n), where n is a positive integer. An IP block is sometimes referred to herein as a representation of a component of the SoC. To illustrate, an IP block is a template design of the component of the SoC. The IP block has functions that are executable by the one or more servers of the DES 104 to generate an output and the functions are the same as those performed by an integrated circuit that is represented by the IP block.

Continuing with the example regarding the webpage data for the webpage 152, the SoC definition file 138 is accessed by the one or more servers of the DES 104 from the template database 132 to generate the webpage data for the webpage 152. The webpage data includes one of the templates and multiple fields for receiving configuration data for designing the SoC. The webpage 152 is labeled as a web SoC request in FIG. 1B.

Upon receiving the webpage data for the webpage 152, a graphical processing unit (GPU) of the customer client device 1 displays the webpage 152 on the display device of the customer client device 1. Once the webpage 152 is displayed, the customer 1 uses the input device of the customer client device 1 to provide the configuration data 140 on the webpage 152 via the customer account 1 (FIG. 1A).

The configuration tools of the customer client device 1 determine that the configuration data 140 is received on the webpage 152 via the customer account 1 and provide the configuration data 140 to the parameter compute tool of the customer client device 1. For example, upon determining that the configuration data 140, such as a type of a processor core or a type of a memory device or a storage size of the memory device, is received on the webpage 152 from the input device of the customer client device 1, the configuration tools of the customer client device 1 provides the configuration data 140 to the parameter compute tool of the customer client device 1. The configuration tools of the customer client device 1 do not wait to receive a request from the parameter compute tool of the customer client device 1 to send the configuration data 140 and initiates sending the configuration data 140 as soon as the configuration data 140 is received on the webpage 152 from the input device of the customer client device 1 via the customer account 1. The provision of the configuration data 140 facilitates real-time generation of updated values 144 of one or more parameters to provide real-time feedback. The updated values 144 are values that are updated by the parameter compute tool of the customer client device 1 based on the configuration data 140.

As another example, in response to determining that a predetermined number of fields, such as one or two or three, within the webpage 152 has been filled by the customer 1 via the customer account 1 and the input device of the customer client device 1 with the configuration data 140, the configuration tools of the customer client device 1 send the configuration data 140 to the parameter compute tool of the customer client device 1. The configuration tools of the customer client device 1 do not wait to receive the additional configuration data 142 within a preset number of fields of the webpage 152 after the configuration data 140 is received within the predetermined number of fields and immediately sends the configuration data 140 once the configuration data 140 is received within the predetermined number of fields. An example of the field, as used herein, includes a text field of a web form or an HTML form on a webpage.

It should be noted that the preset number of fields is different from or the same as the predetermined number of fields. For example, the predetermined number of fields is 1 and the preset number of fields is 2. As another example, the predetermined number of fields is 2 and the preset number of fields is 1. As another example, the predetermined number of fields is 1 and the preset number of fields is 1.

As another example, in response to determining that the predetermined number of fields within the webpage 152 has been filled by the customer 1 via the customer account 1 and the input device of the customer client device 1 with the configuration data 140 and a predetermined amount of time has passed since a time configuration data has been previously entered on the webpage 152, the configuration tools of the customer client device 1 sends the configuration data 140 to the parameter compute tool of the customer client device 1. The configuration data is previously received on the web page 152 by the configuration tools of the customer client device 1 before the configuration data 140 is entered on the webpage 152 by the customer 1 via the input device of the customer client device 1. Also, the configuration data previously received via the webpage 152 by the configuration tools of the customer client device 1 is sent from the configuration tools to the parameter compute tool of the customer client device 1 before, such as preceding to, sending of the configuration data 140 to the parameter compute tool of the customer client device 1.

The parameter compute tool of the customer client device 1 applies parameter definitions to calculate the updated values 144 from the configuration data 140 received from the configuration tools of the customer client device 1. For example, the parameter compute tool of the customer client device 1 identifies an amount of power consumed by one or more of the IP blocks 134(1) through 134(n) that are configured using the configuration data 140. The amount of power consumed by the one or more of the IP blocks 134(1) through 134(n) is an example of the parameter definitions and is a total amount of power consumed by the SoC. The amount of power consumed by the one or more of the IP blocks 134(1) through 134(n) is an example of the updated values 144. The total amount of power consumed by the SoC defines a performance of the SoC when the SoC is manufactured.

As another example, the parameter compute tool of the customer client device 1 receives an amount of speed of operation, such as a speed of a clock measured in hertz (Hz), of a component of the SoC and the amount of speed is received within the configuration data 140. The parameter compute tool of the customer client device 1 identifies the amount of speed within the configuration data 140. The amount of speed is an example of the parameter definitions and also of the updated values 144. The amount of speed is sometimes referred to herein as a maximum speed of the SoC. A speed of operation defines a performance of the SoC when the SoC is manufactured.

As still another example, the parameter compute tool of the customer client device 1 obtains from the memory device of the customer client device 1 a licensing cost for licensing IP of the one or more components of the SoC that are configured according to the configuration data 140 to identify the licensing cost. The licensing cost is stored within the SoC definition file 138 and is received by the customer client device 1 with the reception of the copy of the parameter compute tool for storage in the memory device of the customer client device 1. The licensing cost for licensing the intellectual property of the one or more components of the SoC is an example of the parameter definitions and also of the updated values 144, and is sometimes referred to herein as a total licensing cost. The parameter definitions are stored within a copy of a portion of the SoC definition file 138, and the copy is received by the customer client device 1 from the one or more servers of the DES 104 with the reception of the copy of the parameter compute tool.

As yet another example, the parameter compute tool of the customer client device 1 identifies or determines a cost of fabricating the one or more components of the SoC that are configured according to the configuration data 140. The cost is stored within the SoC definition file 138 and is received by the customer client device 1 with the reception of the copy of the parameter compute tool. The cost of fabricating the component of the SoC is an example of the parameter definitions stored within the copy of the portion of the SoC definition file 138, and also of the updated values 144. The cost of fabricating the one or more components of the SoC is sometimes referred to herein as a part cost estimate.

As still another example, the parameter compute tool of the customer client device 1 identifies or determines an amount of die area consumed on a wafer die by one or more components of the SoC of the SoC that are configured according to the configuration data 140. The amount of die area is stored within the SoC definition file 138 and is received by the customer client device 1 with the reception of the copy of the parameter compute tool. The amount of die area consumed by one or more components of the SoC on the wafer die is an example of the parameter definitions and is also an example of the updated values 144.

As another example, the parameter compute tool of the customer client device 1 identifies a number of I/O pins that is received within the configuration data 140. The number of I/O pins of the SoC is an example of the parameter definitions and also of the updated values 144. The number of I/O pins is sometimes referred to herein as total I/Os. Examples of the number of I/Os of the SoC include a number of I/O pins to be coupled to a CPU of the SoC, a number of I/O pins that are to be coupled to each peripheral of the SoC, and a number of I/O pins that are to be coupled to a memory of the SoC. The I/Os of the SoC are pins that are used for communication between the one or more components of the SoC and one or more other circuit devices, such as another SoC or a controller or a processor or a computer or a sensor or an electrical circuit, that are not a part of the SoC. To illustrate, a first number of I/O pins of the SoC are assigned, such as designated, to carry data for communication between one of the components of the SoC and one of the other circuit devices and a second number of I/O pins of the SoC carry data are assigned for communication between another one of the components of the SoC and one of the other circuit devices.

The other circuit devices are not integrated within the SoC. For example, the other circuit devices are not fabricated as a part of a silicon of the SoC.

In response to identifying or determining the updated values 144, the processor of the customer client device 1 provides the updated values 144 to the GPU of the customer client device 1. The GPU of the customer client device 1 displays the updated values 144 in real-time on the webpage 152 displayed on the display device of the customer client device 1. As an example, before the configuration tools of the customer client device 1 receives the additional configuration data 142 on the webpage 152 from the customer 1 via the input device of the customer client device 1, the updated values 144 are displayed on the webpage 152. As another example, a total of an amount of time taken by the processor of the customer client device 1 to process the configuration data 140 to generate the updated values 144 and an amount of time taken by the GPU of the customer client device 1 to display the updated value 144 on the webpage 152 is less than an amount of time taken by the customer 1 for entry of the additional configuration data 142 on the webpage 152.

The customer 1 uses the input device of the customer client device 1 to enter the additional configuration data 142 on the webpage 152 via the customer account 1. The additional configuration 142 is received on the webpage 152 by the configuration tools of the customer client device 1 immediately after the configuration data 140 is received on the webpage 152. For example, there is no other configuration data received on the webpage between a time at which the configuration data 140 is received and a time at which the additional configuration data 142 is received on the webpage 152. As another example, the configuration data 140 is received on the webpage 152 preceding to reception of the additional configuration data 142. An example of the additional configuration data 142 includes a speed of an internal clock source of the SoC or an external clock source of the SoC or a size of a memory of the SoC. The internal clock source and the external clock source are examples of a clocking system associated with the SoC. In this example, an illustration of the configuration data 140 includes the Cortex M3™ core or the Cortex M0™ core.

A speed of a component of the SoC is defined by a speed of a clock signal received from the clocking system. For example, the component periodically processes data, such as reads data from, writes data to, etc., at a frequency of the clock signal. As another example, the component periodically processes data at a rate that is a multiple, such as two or three or half or one-third, of the frequency of the clock signal.

Upon receiving the additional configuration data 142, the configuration tools of the customer client device 1 send the additional configuration data 142 to the parameter compute tool of the customer client device 1. For example, in response to the reception of the additional configuration data 142 on the webpage 152, the configuration tools of the customer client device 1 do not wait to receive a request from the parameter compute tool of the customer client device 1 to send the additional configuration data 142 and initiates sending the additional configuration file 148 to the parameter compute tool to facilitate generation of updated values 146 of the one or more parameters. Also, the configuration tools of the customer client device 1 does not wait for further configuration data to be received on the webpage 152 via the input device of the customer client device 1 after the additional configuration data 142 is received on the webpage 152. Sometimes, the further configuration data is referred to herein as supplemental configuration data.

As another example, in response to determining that the preset number of fields, such as one or two or three, within the webpage 152 has been filled by the customer 1 via the customer account 1 and the input device of the customer client device 1 with the configuration data 142, the configuration tools of the customer client device 1 send the configuration data 142 to the parameter compute tool of the customer client device 1. The configuration tools of the customer client device 1 do not wait to receive the further configuration data within the predetermined number of fields of the webpage 152 after the configuration data 142 is received within the preset number of fields and immediately sends the configuration data 142 to the parameter compute tool of the customer client device 1 once the configuration data 142 is received within the preset number of fields.

As yet another example, in response to determining that the preset number of fields within the webpage 152 has been filled by the customer 1 via the customer account 1 and the input device of the customer client device 1 with the additional configuration data 142 and the predetermined amount of time has passed since a time the configuration data 140 has been previously entered on the webpage 152, the configuration tools of the customer client device 1 provide the additional configuration data 142 to the parameter compute tool of the customer client device 1. The configuration data 140 is previously received on the web page 152 before the additional configuration data 140 is received on the webpage 152 and is entered by the customer 1 via the input device of the customer client device 1. Also, the configuration data 140 previously entered on the webpage 152 is sent from the configuration tools of the customer client device 1 to the parameter compute tool of the customer client device 1 before, such as preceding to, sending of the additional configuration data 142 from the configuration tools of the customer client device 1 to the parameter compute tool of the customer client device 1.

The provision of the additional configuration data 142 facilitates real-time update of the one or more parameters to provide real-time feedback to the customer client device 1. Upon receiving the additional configuration data 142 from the configuration tools of the customer client device 1, the parameter compute tool of the customer client device 1 determines the updated values 146 based on the additional configuration data 142 in a similar or same manner in which the updated values 144 are determined based on the configuration data 140. For example, the parameter compute tool of the customer client device 1 adds amounts of power consumed by two or more of the IP blocks 134(1) through 134(n) that are configured using the configuration data 140 and the additional configuration data 142 to calculate or update the total amount of power consumed by the SoC. The IP block 134(1) is configured by the configuration data 140 and the IP block 134(n) is configured by the additional configuration data 142. The amounts of power consumed by the two or more of the IP blocks 134(1) through 134(n) are examples of the parameter definitions. The total amount of power consumed is an example of the updated values 146.

As another example, the parameter compute tool of the customer client device 1 receives amounts of speed of operation of corresponding two or more components from the configuration tools of the customer client device 1. One of the amounts of speed is received within the configuration data 140 and another one of the amounts of speed is received within the additional configuration data 142. The parameter compute tool of the customer client device 1 determines a greatest amount of speed from the amounts of speed to determine or update or calculate the maximum speed of operation of the SoC. The amounts of speed are examples of the parameter definitions and the operation of determining the greatest amount of speed is another example of the parameter definitions. The maximum speed of operation is another example of the updated values 146.

As still another example, the parameter compute tool of the customer client device 1 obtains licensing costs for licensing IP of two or more components of the SoC that are configured according to the configuration data 140 and the additional configuration data 142 to calculate or update the total licensing cost. One of the two components is configured according to the configuration data 140 and another one of the two components are configured according to the additional configuration data 142. The licensing costs are accessed from the copy of the portion of the SoC definition file 138 stored within the memory device of the customer client device 1 and are received by the customer client device 1 with the reception of the copy of the parameter compute tool for storage in the memory device of the customer client device 1. The licensing costs for licensing intellectual property of the components are examples of the parameter definitions and the operation of calculating the total licensing cost is yet another example of the parameter definitions. The total licensing cost is example of the updated values 146.

As yet another example, the parameter compute tool of the customer client device 1 obtains a cost of fabricating a component of the SoC configured according to the additional configuration data 142, and determines a sum of the cost of fabricating the component of the SoC configured according to the additional configuration data 142 and the cost of fabricating the component of the SoC configured according to the configuration data 140 to calculate or update the part cost estimate. The costs of fabricating the component of the SoC configured according to the additional configuration data 142 is obtained from the copy of the portion of the SoC definition file 138 stored within the memory device of the customer client device 1 and is received by the customer client device 1 with the reception of the copy of the parameter compute tool for storage in the memory device of the customer client device 1. The cost of fabricating the component of the SoC according to the additional configuration data 142 is an example of the parameter definitions stored within the copy of the portion of the SoC definition file 138. Moreover, an operation of adding the costs of fabricating the components of the SoC is another example of the parameter definitions stored within the copy of the portion of the SoC definition file 138. The total part cost estimate is an example of the updated values 146.

As still another example, the parameter compute tool of the customer client device 1 obtains an amount of area consumed on a wafer die by the component of the SoC that is configured according to the additional configuration data 142, and sums the amount of area with the amount of area consumed on the wafer die by the component of the SoC that is configured according to the configuration data 140 to calculate or update the total die area on the wafer die occupied by the SoC. The amount of area consumed by the component is obtained from the copy of the portion of the SoC definition file 138 stored within the memory device of the customer client device 1 and is received by the customer client device 1 with the reception of the copy of the parameter compute tool for storage in the memory device of the customer client device 1. The amount of area consumed by the component configured according to the configuration data 142 is an example of the parameter definitions and the operation of summing the amounts of die area to calculate or update the total die area is another example of the parameter definitions within the copy of the portion of the SoC definition file 138 stored within the memory device of the customer client device 1. The total die area is an example of the updated values 146.

As another example, the parameter compute tool of the customer client device 1 determines a sum of number of I/O pins that is received within the configuration data 140 and a number of I/O pins that is received within the configuration data 144 to calculate or update the total I/Os. The operation of determining the sum of the number of I/O pins is an example of the parameter definitions of the copy of the portion of the SoC definition file 138 stored within the memory device of the customer client device 1.

The GPU of the customer client device 1 displays the updated values 146 on the webpage 152 in real-time. As an example, before the processor of the customer client device 1 receives the further configuration data on the webpage 152 from the customer 1 via the input device of the customer client device 1, the updated values 146 are displayed on the webpage 152. As another example, a total of an amount of time taken by the customer client device 1 to process the additional configuration data 142 to generate the updated values 146 and an amount of time taken by the GPU to display the updated values 146 on the customer client device 1 is less than an amount of time taken by the customer 1 for entry of the further configuration data on the webpage 152.

In case a selection of a button, such as a publish button, which is further described below, on the webpage 152 is received from the input device of the customer client device 1 after entry of the configuration data 140 on the webpage 152 but before entry of the additional configuration data 142, the processor of the customer client device 1 generates a configuration file 136 having the configuration data 140. The processor of the customer client device 1 generates one or more packets by applying the communication protocol to the configuration file 136 and an indication of the selection of the button and sends the packets via the computer network 102 to the DES 104. The one or more packets include the configuration file 136 the indication of the selection of the button. The one or more servers of the DES 104 receive the one or more packets including the configuration file 136 including the configuration data 140 and the indication of the selection, and apply the communication protocol to extract the configuration file 136 and the indication of the selection from the packets and store the configuration file 136 within one or more of multiple databases, described below with reference to FIG. 1F. In response to the indication of the selection, the one or more servers of the DES 104 apply or execute a compiler 154, such as a compiler program or a compiler tool, to the configuration file 136 to compile the configuration file 136 and the SoC definition file 138 to output a compiled file, such as an SoC design file 150A, having the updated values 144. The SoC definition file 138 is compiled by the compiler 154 to apply a performance rule set, described below, to the configuration data 140 to generate the SoC design file 150A. The performance rule set is stored within the SoC definition file 138 of the DES 104 and includes multiple performance rules, such as the parameter definitions. The SoC design file 150A and the configuration file 136 are then published by the one or more servers of the DES 104 on a webpage that is accessible by a member of the community via his/her account assigned by the DES 104.

Similarly, in case a selection of the button, such as the publish button, on the webpage 152 is received from the input device of the customer client device 1 after entry of the additional configuration data 142 but before entry of the further configuration data, the processor of the customer client device 1 generates an additional configuration file 148 having an indication of the selection, the additional configuration data 142, and the configuration data 140. The processor of the customer client device 1 generates one or more packets by applying the communication protocol to the additional configuration file 148 and to the indication of the selection, and sends the packets via the computer network 102 to the DES 104. The one or more packets include the additional configuration file 148 and the indication of the selection. The one or more servers of the DES 104 receive the one or more packets including the additional configuration file 148 including the indication of the selection, the configuration data 140 and the additional configuration data 142, and apply the communication protocol to extract the additional configuration file 148 from the packets and the indication of the selection and store the additional configuration file 148 within the one or more of multiple databases, described below with reference to FIG. 1F. In response to the indication of the selection, the one or more servers of the DES 104 apply or execute the compiler 154 to the additional configuration file 148 to compile the additional configuration file 148 and the SoC definition file 138 to output a compiled file, such as the SoC design file 150A, having the updated values 146. The SoC definition file 138 is compiled by the compiler 154 to apply the performance rule set to the configuration data 140, and the additional configuration data 142 to generate the SoC design file 150A. The SoC design file 150A and the additional configuration data 142 are then published by the one or more servers of the DES 104 on a webpage that is accessible by a member of the community via his/her account assigned by the DES 104.

Also, in case a selection of the button, such as the publish button, is received from the input device of the customer client device 1 after entry of the further configuration data displayed on the webpage 152, the processor of the customer client device 1 generates a configuration file 156 having the configuration data 140, the additional configuration data 142, and the further configuration data, and sends one or more packets including the configuration file 156 via the computer network 102 and the customer account 1 to the DES 104. The indication of the selection includes instructions to the DES 104 to publish the configuration data 140, the additional configuration 142, and the further configuration data. The indication of the selection and the configuration file 156 are packetized using the communication protocol by the processor of the customer client device 1. The configuration file 156 includes the configuration data 140, the additional configuration data 142, and the further configuration data for configuring the SoC. Upon receiving the packets that includes the indication of the selection and the configuration file 156, the one or more servers of the DES 104 execute the communication protocol to obtain the configuration file 156 and the indication of the selection from the packets. The one or more servers of the DES 104 store the configuration file 156 within one or more of multiple databases, described below with reference to FIG. 1F, and in response to the indication of the selection, execute the compiler 154 to compile the configuration file 156 and the SoC definition file 138 to output a compiled file, such as the SoC design file 150A. The SoC definition file 138 is compiled by the compiler 154 to apply a performance rule set, described below, to the configuration data 140, the additional configuration data 142, and the further configuration data to generate the SoC design file 150A. The SoC design file 150A and the configuration file 156 are then published by the one or more servers of the DES 104 on a webpage that is accessible by a member of the community via his/her account assigned by the DES 104.

The compiler 154 is executed to output or generate a template design 131A of the SoC and the template design 131A is stored in the SoC design file 150A. The template design 131A is configured according to the configuration data 140, or additional configuration data 142, or the further configuration data, or a combination of two or more thereof, of a configuration file. As another example, the compiler 154 is executed to generate or output the specification of the template design 131A, which is described below with reference to FIGS. 11A-11E. The specification of the template design 131A is generated from the configuration data 140, or the additional configuration data 142, or the further configuration data, or a combination of two or more thereof, and includes the one or more parameters. The specification of the template design 131A is stored in the SoC design file 150A. As yet another example, the compiler 154 is executed to generate the SoC design file 150A, which includes a register transfer layer (RTL) of the template design 131A of the SoC. As yet another example, the SoC design file 150A is an RTL file that includes one or more test benches for testing the template design 131A of the SoC.

A template design verification tool 157 of the one or more servers of the DES 104 is executed to test the template design 131A of the SoC. As an example, in addition to generating the template design 131A, upon execution of the compiler 154 to generate the SoC design file 150A, the template design verification tool 157 is executed by the one or more servers to apply one or more test benches to test the template design 131A to generate a result of the verification. There is no need for the one or more servers of the DES 104 to receive an input from the customer 1 via the input device of the customer client device 1 or from the DES user 1 via an input device of the DES client device 1 to execute the template design verification tool 157 to generate the result. An example of the result includes whether less than a predetermined amount of power is consumed by the SoC having the template design 131A or greater than a predetermined amount of speed of operation is achieved by the SoC having the template design 131A. The predetermined amount of power and the predetermined amount of speed of operation are stored within a definition database, further described below. As another example, the template design 131A is verified within a predetermined time period, such as 12-24 hours, of receipt of the configuration file 156 by the DES 104. The predetermined time period for the verification is stored within the definition database.

As yet another example, the DES user 1 uses the input device of the DES client device 1 to access the template design verification tool 157 via the DES user account 1 and the computer network 102 and uses the input device to execute the template design verification tool 157 to test the template design 131A of the SoC. As yet another example, the customer 1 uses the input device of the customer client device 1 to access the template design verification tool 157 via the customer account 1 and the computer network 102 and uses the input device to execute the template design verification tool 157 to test the template design 131A. It should be noted that the template design verification tool 157 is stored within one or more memory devices of the one or more servers of the DES 104. The one or more servers of the DES 104 send the SoC design file 150A with the result via the computer network 102 and the customer account 1 to the customer client device 1.

In one embodiment, in response to the indication of the selection of the button, such as the publish button, the one or more servers of the DES 104 store a configuration file, such as the configuration file 136, 148, or 156 in the one or more of multiple databases, described below with reference to FIG. 1F. The configuration file is then compiled by the compiler 154 along with the SoC definition file 138 to generate a circuit design or the circuit design and a layout design of the SoC based on the configuration file.

In an embodiment, any other number, such as three or four, of SoC design files that store the template design 131 are generated upon execution of the compiler 154.

In one embodiment, instead of the webpage 152, multiple webpages linked together via a website are used to receive configuration data, such as the configuration data 140, the additional configuration data 142, and the further configuration data, for configuring the SoC. The website is managed by the design engineering entity.

Each configuration file, described herein, is a structured file or a format file. For example, each of the configuration files 136, 148, and 156 has a JavaScript Object Notation (JSON) file format. To illustrate, the DES 104 expects to receive the configuration data 140 in the JSON format, the additional configuration data 142 in the JSON format, and the further configuration data in the JSON format. The one or more servers of the DES 104 execute a JSON parser to interpret the configuration data 140, the additional configuration data 142, and the further configuration data.

In one embodiment, instead of the compiled file, such as the SoC design file 150A, any number of compiled filed, such as multiple SoC design files including the template design 131A, are generated by the compiler 154.

Figure 1C:
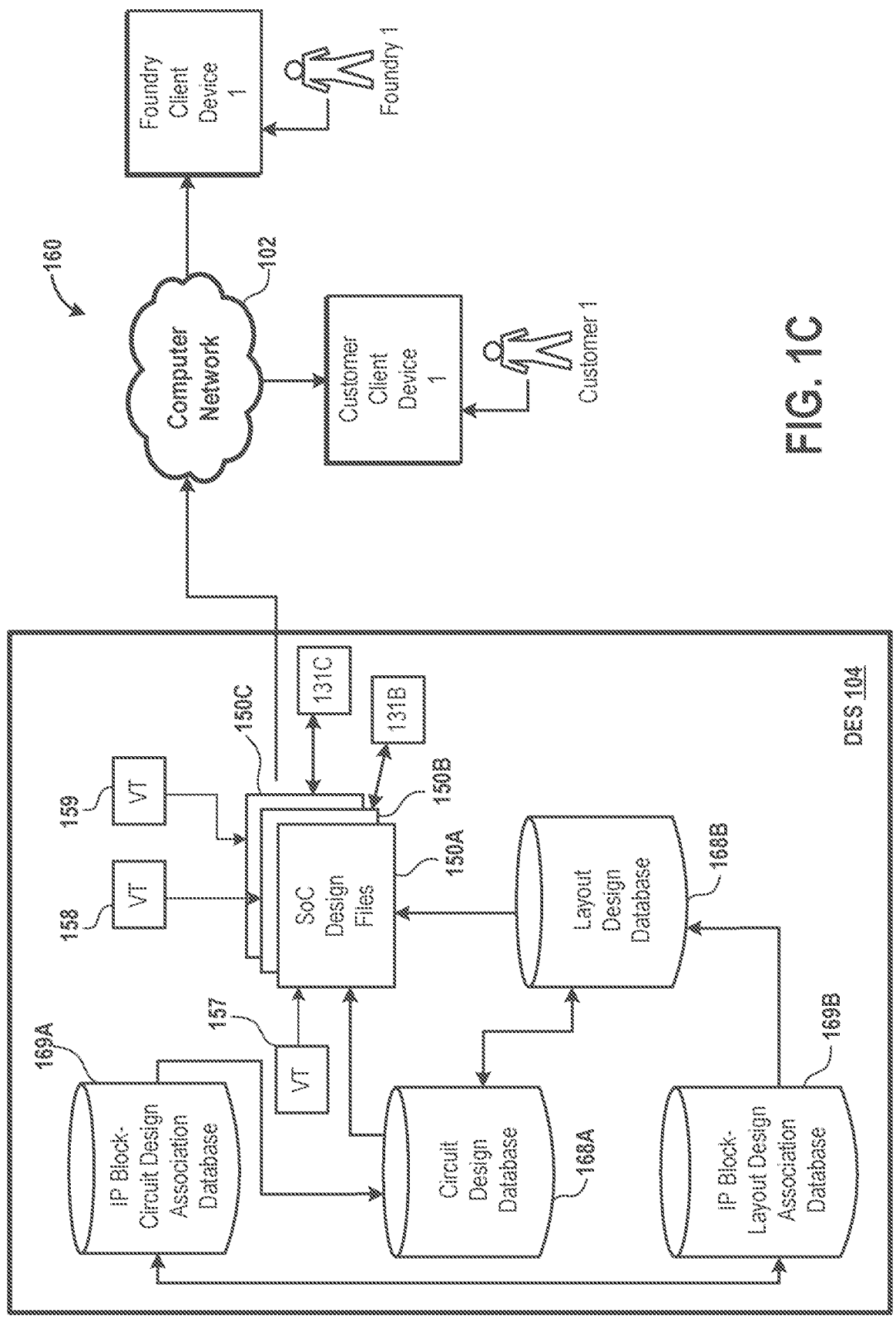
FIG. 1C is a diagram of an embodiment of a system to illustrate that a circuit design and a layout design are generated by one or more servers of the DES in response to receiving an indication from a customer that the SoC is to be fabricated.

FIG. 1C is a diagram of an embodiment of a system 160 to illustrate that a circuit design 131B and a layout design 131C are generated based on the template design 131A (FIG. 1b) and the specification of the template design 131A by the one or more servers of the DES 104 in response to receiving an indication from the customer 1 that the SoC is to be fabricated. For example, the circuit design 131B and the layout design 131C are generated by applying the template design 131A and the specification, of the template design 131A, stored in the SoC design file 150A.

The system 160 includes an IP block-circuit design association database 169A, a circuit design database 168A, an IP block-layout design association database 169B, a layout design database 168B, SoC design files 150A, 150B, and 150C, the computer network 102, a circuit design verification tool 158, a layout design verification tool 159, the customer client device 1, and the foundry client device 1. The SoC design file 150A is sometimes referred to herein as a template design file, the SoC design file 150B is sometimes referred to herein as a circuit design file, and SoC design file 150C is sometimes referred to herein as a layout design file.

An example of the layout design verification tool 159 includes a design rule check (DRC) tool. The circuit design verification tool 158, the layout design verification tool 159, the IP block-circuit design association database 169A, the IP block-layout design association database 169B, the circuit design database 168A and the layout design database 168B are stored within the one or more memory devices of the one or more servers of the DES 104. The circuit design file 150B includes the circuit design 131B of the SoC that is configured according to the configuration data 140, or the additional configuration data 142, or the further configuration data, or a combination of two or more thereof. For example, the circuit design file 150B is generated when the compiler 154 compiles the configuration file 136, or 148, or 156 (FIG. 1B) and the SoC definition file 138. An example of the circuit design 131B includes a gate-level design, which includes multiple logic gates and connections between the logic gates. Examples of the logic gates include an AND gate that performs an AND operation, an OR gate that performs an OR operation, a NOR gate that performs a NOR operation, and a NAND gate that performs a NAND operation.

Moreover, the layout design file 150C includes the layout design 131C of the SoC that is configured according to the configuration data 140, or the additional configuration data 142, or the further configuration data, or a combination of two or more thereof. For example, the layout design file 150C is generated when the compiler 154 compiles the configuration file 136, or 148, or 156 (FIG. 1B) and the SoC definition file 138. An example of the layout design 131C includes a design that includes the layout design features, such as a metal layer, an oxide layer, and a semi-conductor layer. Another example of the layout design features includes a size, such as a width, length, or depth of each layer of the layout design. The layout design 131C includes connections, such as the interconnect, between the layout features.

As an example of generation of the circuit design 131B from the template design 131A by the one or more servers of the DES 104, the one or more servers determine whether a request is received from the customer client device 1 via the computer network 102 and the customer account 1 to fabricate the SoC. Upon determining so and after generation of the template design 131A that includes the IP blocks 134(1) and 134(n) that are coupled with each other via a bus, the one or more servers of the DES 104 access the IP block-circuit design association database 169A to obtain a correspondence, such as a mapping or a one-to-one association or a link, between an identifier of a first circuit design of the IP block 134(1) and an identifier of the IP block 134(1) (FIG. 1B). An example of an identifier, as used herein, includes a series of alphanumeric characters. The template design 131A, including the IP blocks 134(1) and 134(n), is configured according to the configuration data 140, or the configuration data 142, or the further configuration data, or a combination of two or more thereof. An example of the first circuit design includes a gate level netlist of the IP block 134(1). Upon obtaining the identifier of the first circuit design of the IP block 134(1), the one or more servers of the DES 104 access one or more circuit design files including the first circuit design of the IP block 134(1) from the circuit design database 168A. Similarly, the one or more servers of the DES 104 access the IP circuit design association database 169A to obtain a correspondence between an identifier of a second circuit design of the IP block 134(n) and an identifier of the IP block 134(n). An example of the second circuit design includes a gate level netlist of the IP block 134(n). Upon obtaining the identifier of the second circuit design of the IP block 134(n), the one or more servers of the DES 104 access one or more circuit design files including the second circuit design of the IP block 134(n) from the circuit design database 168A. The one or more servers couple the first circuit design with the second circuit design according to a connection between the IP blocks 134(1) and 134(n) in the template design 131A to generate the circuit design 131B of the SoC. The circuit design 131B is a circuit design that is generated based on the template design 131A. The one or more servers of the DES 104 store the circuit design 131B in the circuit design file 150B.

Continuing with the example, before or after generation of the circuit design 131B, the one or more servers of the DES 104 access the IP layout design association database 169B to obtain a correspondence, such as a mapping or a one-to-one association or a link, between an identifier of a first layout design of the IP block 134(1) and an identifier of the IP block 134(1). Upon obtaining the identifier of the first layout design of the IP block 134(1), the one or more servers of the DES 104 access one or more layout design files, such as a Graphic Database System (GDS) II file, including the first layout design of the IP block 134(1) from the layout design database 168B. Similarly, the one or more servers of the DES 104 access the IP layout design association database 169B to obtain a correspondence between an identifier of a second layout design of the IP block 134(n) and an identifier of the IP block 134(n). Upon obtaining the identifier of the second layout design of the IP block 134(n), the one or more servers of the DES 104 access one or more layout design files, such as a GDSII file, including the second layout design of the IP block 134(n) from the layout design database 168B. The one or more servers couple the first layout design with the second layout design according to the connection between the IP blocks 134(1) and 134(n) in the template design 131A to generate the layout design 131C of the SoC. The one or more servers of the DES 104 store the layout design 131C in the layout design file 150C.

Continuing further with the example, the circuit design verification tool 158 is executed by the one or more servers of the DES 104 to test the circuit design 131B, or the layout design verification tool 159 is executed by the one or more servers to test the layout design of the SoC, or both the circuit design verification tool 158 and the layout design verification tool 159 are executed for performing the tests. To illustrate, upon generating the circuit design 131B, the circuit design verification tool 158 is executed by the one or more servers of the DES 104 to apply one or more test benches to test the circuit design or upon generating the layout design 131B, the layout design verification tool 159 is executed by the one or more servers to test the layout design 131C of the SoC. As another illustration, both the circuit design 131B and the layout design 131C of the SoC are verified within the predetermined time period, such as 12-24 hours, of receipt of the configuration file 156 by the DES 104. There is no need for the one or more servers of the DES 104 to receive an input from the customer 1 via the input device of the customer client device 1 or from the DES user 1 via the input device of the DES client device 1 to execute the circuit design verification tool 158 and the layout design verification tool 159. As another illustration, the DES user 1 uses the input device of the DES client device 1 to access the circuit design verification tool 158 via the DES user account 1 and the computer network 102 and to execute the circuit design verification tool 158. The circuit design verification tool 158 is executed to test the circuit design 131B of the SoC. As still another illustration, the DES user 1 uses the input device of the DES client device 1 to access the layout design verification tool 159 via the DES user account 1 and the computer network 102 and to execute the layout design verification tool 159. The layout design verification tool 159 is executed to test the layout design 131B of the SoC. As yet another illustration, the customer 1 uses the input device of the customer client device 1 to access the circuit design verification tool 158 via the customer account 1 and the computer network 102 to test the circuit design 131B of the SoC.

The one or more servers of the DES 104 send the design files 150A, 150B, and 150C via the computer network 102 to the foundry client device 1 and the foundry account 1 (FIG. 1A). For example, upon determining that the customer 1 has requested to obtain the SoC, such as a prototype of the SoC, the SoC design files 150A, 150B and 150C are sent to the foundry client device 1 for fabrication of the SoC. To illustrate, the one or more servers of the DES 104 determine that a selection for sending the SoC design files 150A, 150B and 150C is received via the customer account 1 and the computer network 102. Moreover, the one or more servers of the DES 104 determine that the template design 131A (FIG. 1B) of the SoC corresponds to, such as linked to or has a one-to-one mapping, with the foundry 1. Upon generating the design files 150A, 150B and 150C, the one or more servers of the DES 104 send the design files 150A, 150B and 150C via the computer network 102 and the foundry account 1 to the foundry client device 1. Upon receiving the SoC design files 150A, 150B and 150C, the foundry 1 fabricates the SoC and provides the SoC to the customer 1.

In one embodiment, the foundry 1 uses the input device of the customer client device 1 to access the layout design verification tool 159 (FIG. 1B) of the DES 104 via the foundry account 1 and the computer network 102 to test the layout design 131C of the SoC stored within the layout design file 150C before fabricating the SoC. In an embodiment, the foundry 1 does not access the layout design verification tool 159 (FIG. 1B) of the DES 104 via the foundry account 1 and the computer network 102 to test the layout design 131C.

In one embodiment, instead of accessing the layout design verification tool 159, the foundry 1 uses a layout design verification tool that is stored within a memory device of the foundry client device 1 or another client device that is accessible by the foundry client device 1 via the computer network 102.

In one embodiment, the one or more servers of the DES 104 determine whether a request to provide a design, such as a template design, a circuit design or a layout design, or a combination of two or more thereof, of the SoC is received via the computer network 102 and the customer account 1 from the customer client device 1. Upon receiving the request for the design, the one or more servers of the DES 104 send one or more of the design files 150A, 150B and 150C via the computer network 102 and the customer account 1 to the customer client device 1. For example, after verifying that the template design 131A, the one or more servers of the DES 104 send the design file 150A including the template design 131A via the computer network 102 and the customer account 1 to the customer client device 1 for storage in the memory device of the customer client device 1. As another example, after verifying that the circuit design 131B, the one or more servers of the DES 104 send the design file 150B including the circuit design 131B via the computer network 102 and the customer account 1 to the customer client device 1 for storage in the memory device of the customer client device 1. As another example, after verifying that the layout design 131C, the one or more servers of the DES 104 send the design file 150C including the layout design 131C via the computer network 102 and the customer account 1 to the customer client device 1 for storage in the memory device of the customer client device 1. As yet another example, after verifying the template design 131A, the circuit design 131B and the layout design 131C, the one or more servers of the DES 104 send the design file 150A including the circuit design 131A, the design file 150B including the circuit design 131B, and the design file 150C including the layout design 131C via the computer network 102 and the customer account 1 to the customer client device 1 for storage in the memory device of the customer client device 1. The processor of the customer client device 1 accesses one or more of the design files 150A, 150B and 150C from the memory device of the customer client device 1 for display of one or more of the designs 131A, 131B and 131C on the display device of the customer client device 1. The customer 1 uses the input device of the customer client device 1 to access the template design verification tool 157 from the DES 104 via the computer network 102 to test the layout design 131C.

In one embodiment, instead of accessing the template design verification tool 157, the customer 1 uses a template design verification tool that is stored within a memory device of the customer client device 1 or another client device that is accessible by the customer client device 1 via the computer network 102 to verify functionality of the template design 131A1.

In an embodiment, instead of the two separate databases 169A and 169B, a database stored within the one or more memory devices of the DES 104 includes a correspondence between an IP block, an identifier of a circuit design of the IP block, and an identifier of a layout design of the IP block.

Figure 1D:
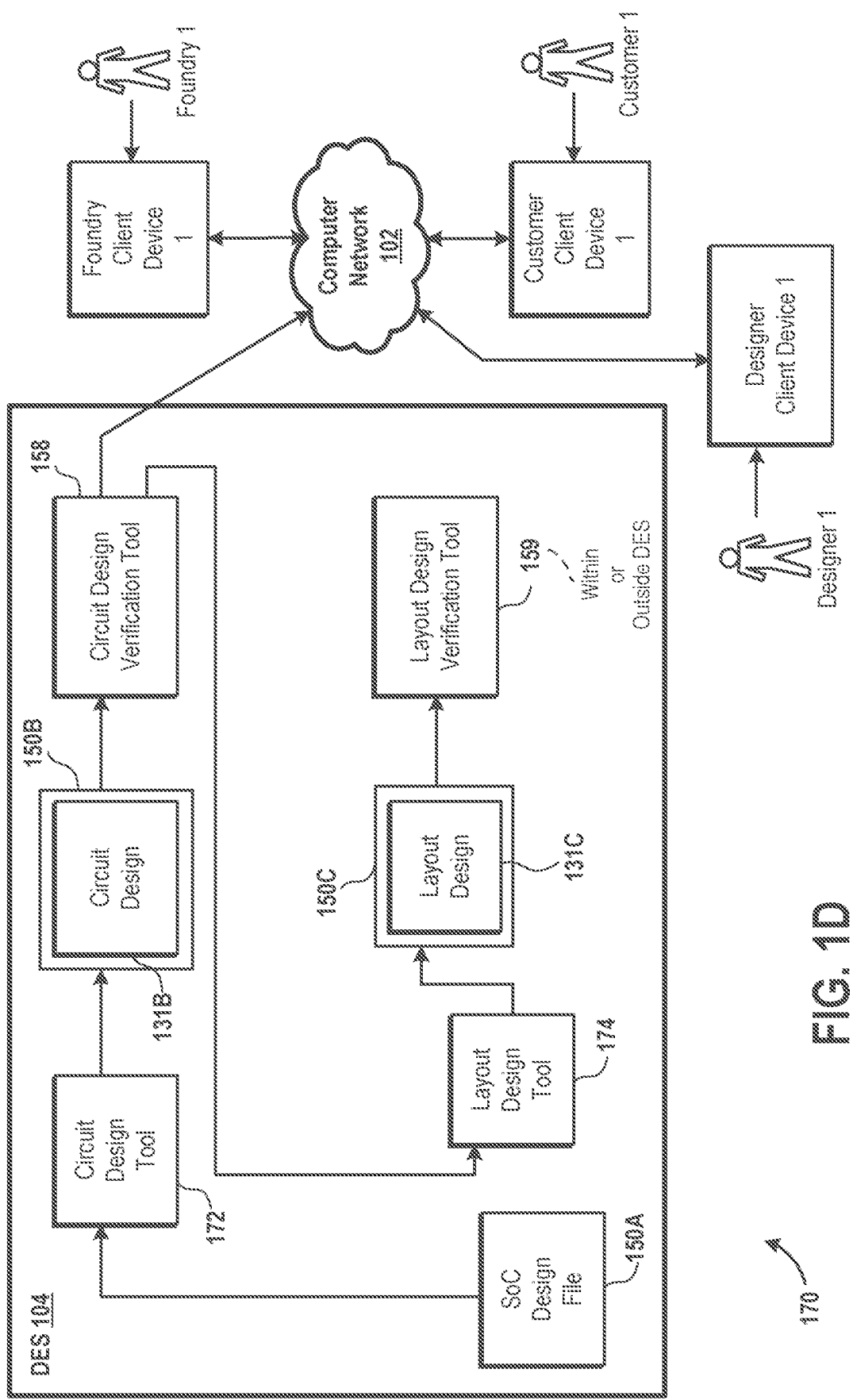
FIG. 1D is a diagram of an embodiment of a system to illustrate generation of a circuit design and a layout design from the template design by a designer.

FIG. 1D is a diagram of an embodiment of the system 170 to illustrate generation of the circuit design 131B and the layout design 131C from the template design 131A by the designer 1 or the designer 2. The system 170 includes the SoC design file 150A, a circuit design tool 172, a layout design tool 174, the circuit design 131B stored within the circuit design file 150B, the layout design 131C stored within the layout design file 150C, the circuit design verification tool 158, the layout design verification tool 159, the computer network 102, the foundry client device 1, the customer client device 1, and the designer client device 1.

An example of the circuit design tool 172 includes a tool that is used to create a gate-level circuit that includes logic gates and connections between the logic gates. Illustrations of the circuit design tool 172 include a SPICE™ software program and an LTSpice™ software program. The logic gates are examples of circuit components.

An example of the layout design tool 174 includes a tool that is used to create a layout design that includes the layout features and connections between the layout features. Illustrations of the layout design tool 174 include Cadence™ Virtuoso™ and Microwind™. It should be noted that the terms layout design, integrated circuit (IC) mask layout, and mask design, are used herein interchangeably. In an embodiment, a layout design is a representation of an integrated circuit having the SoC in terms of planar geometry shapes that correspond to patterns of metal, oxide, or semiconductor layers that make up components of the integrated circuit.

The one or more servers of the DES 104 determine whether a request is received via the computer network 102 and the customer account 1 to fabricate the SoC. Upon determining so, the one or more servers of the DES 104 post the SoC design file 150A to the website provided by DES 104 with a message indicating that the circuit design 131B is to be created. One of the more of the designers 1 and 2 can access via their corresponding designer accounts 1 and 2, the SoC design file 150A to generate the circuit design 131B and the layout design 131C of the SoC. For example, the designer 1 uses an input device of the designer client device 1 to log into the designer account 1 to access the website. Upon logging in, the designer 1 uses the input device of the designer client device 1 to access the design file 150A via the computer network 102. As an example, the designer client device 1 cannot download the template design file 150A via the computer network 102 and the designer account 1. The designer 1 further accesses the circuit design tool 172 via the computer network 102 and the designer account 1 and uses the circuit design tool 172 and the input device of the designer client device 1 to create the circuit design 131B. As an example, the designer client device 1 cannot download the circuit design tool 172 via the computer network 102 and the designer account 1.

Upon creating the circuit design 131B, the designer 1 uses the input device of the designer client device 1 to access the circuit design verification tool 158 via the computer network 102 and the designer account 1. For example, the designer client device 1 cannot download the circuit design verification tool 158 via the computer network 102 and the designer account 1. As another example, the designer 1 uses the input device of the designer client device 1 to execute the circuit design verification tool 158 to verify, such as test, an operation of the circuit design 131B. To illustrate, the circuit design verification tool 158 is executed to determine whether the circuit design 131B produces at its output node a voltage that is within a predetermined range at its output when a voltage is applied to an input node of the circuit design 131B. As another example, the circuit design verification tool 158 is executed to execute the compiler 154 to compile the configuration file 136, or the additional configuration file 148, or the configuration file 156 (FIG. 1B) and the SoC definition file 138 to output the circuit design file 150B having a verified version of the circuit design 131B.

Upon verifying the circuit design 131B, the designer 1 uses the input device of the designer client device 1 to indicate via the computer network 102 and the designer account 1 to the one or more servers of the DES 104 that the circuit design 131B is completed and verified. In response to receiving the indication, the one or more servers of the DES 104 post the circuit design file 150B including the circuit design 131B to the website provided by the DES 104 with a message indicating that the layout design 131C is to be created. One of the more of the designers 1 and 2 can access via their corresponding designer accounts 1 and 2, the circuit design file 150B to generate the layout design 131C. For example, the designer 2 (FIG. 1A) uses an input device of the designer client device 2 to log into the designer account 2 to access the website. The generation of the layout design 131C includes placement of layout features and routing between the layout features. Upon logging in, the designer 2 uses the input device of the designer client device 2 (FIG. 1A) to access the circuit design file 150B via the computer network 102. As an example, the designer client device 2 cannot download the circuit design file 150B via the computer network 102 and the designer account 2. The designer 2 further accesses the layout design tool 174 via the computer network 102 and the designer account 2 and uses the layout design tool 174 and the input device of the designer client device 2 to create the layout design 131C. As an example, the designer client device 2 cannot download the layout design tool 174 via the computer network 102 and the designer account 2.

Upon creating the layout design 131C, the designer 2 uses the input device of the designer client device 2 to access the layout design verification tool 159 via the computer network 102 and the designer account 1. For example, the designer client device 2 cannot download the layout design verification tool 159 via the computer network 102 and the designer account 2. As another example, the designer 2 uses the input device of the designer client device 2 to execute the layout design verification tool 159 to verify, such as test, an operation of the layout design 131C. To illustrate, the layout design verification tool 159 is executed to determine whether the layout design 131C produces at its output node a voltage that is within a predetermined range at its output when a voltage is applied to an input node of the layout design 131C. As another illustration, the layout design verification tool 159 is executed to apply the DRC, an Electrical Rule Check (ERC), or a functional check, or a combination thereof to the layout design 131C to test the layout design 131C. The DRC is performed to determine whether the layout design 131C meets requirements for manufacturing the SoC. The ERC and functional checks are performed to determine whether the layout design 131C meets requirements for an electrical design of the SoC and to determine whether the layout design 131C is functionally the same as the circuit design 131B. As another illustration, the layout design verification tool 159 is executed to execute the compiler 154 to compile the configuration file 136, or the additional configuration file 148, or the configuration file 156 (FIG. 1B) and the SoC definition file 138 to output the layout design file 150C having a verified version of the layout design 131C.

The one or more servers of the DES 104 provide an indication via the foundry account 1 (FIG. 1A) and the computer network 102 to the foundry client device 1 that the layout design 131C is ready for access. In response to receiving the indication, the foundry 1 uses an input device of the foundry client device 1 to access the layout design file 150C including the layout design 131C via the computer network 102 and the foundry account 1. The foundry 1 fabricates the SoC according to the layout design 131C and provides the SoC to the customer 1.

In an embodiment, the one or more servers of the DES 104 determine that instead of the request for fabricating the SoC, a request for the circuit design 131B or the layout 131C or both the designs 131B and 131C is received via the customer account 1. Upon determining so, the one or more servers of the DES 104 do not provide the design files 151B and 151C to the foundry account 1. Rather, the one or more servers of the DES 104 provide the design files 151B and 151C to the customer account 1.

In one embodiment, the circuit design verification tool 158 is a portion of the circuit design tool 172. In an embodiment, the layout design verification tool 159 is a portion of the layout design tool 174.

FIG. 1E-A is a diagram of an embodiment of multiple servers 192A, 192B, and 192C, which are examples of the one or more servers of the DES 104 (FIG. 1A). The server 192A includes a processor 194 and a memory device 196. The processor 194 is coupled to the memory device 196. Similarly, each of the remaining servers 192B and 192C include a processor and a memory device. Examples of a processor and a memory device are provided above.

In one embodiment, the DES 104 includes a number of servers other than that illustrated in FIG. 1E-A.

In an embodiment, the functions described herein as being performed by the one or more servers of the DES 104 are performed by the processor 194. In one embodiment, the functions described herein as being performed by the one or more servers of the DES 104 are performed by one or more of the processor 194 and additional processors of the servers 192B and 192C.

FIG. 1E-B is a diagram of an embodiment of a client device 185. Examples of the client device 185 include the customer client device 1, the customer client device 2, the designer client device 1, the designer client device 2, the DES client device 1, the foundry client device 1, and the foundry client device 2. The client device 185 includes a processor 187, a memory device 189, an input device 191, a graphical processing unit (GPU) 181, and an output device 193. Examples of each of the processor 187, the memory device 189, the input device 191, and the output device 193 are provided herein. The GPU 181, the processor 187, the memory device 189, the input device 191, and the output device 193 are coupled to each other via a bus 183. The GPU 181 executes a rendering program to display information or data, described herein, on the display device of the client device 185.

Figure 1F:
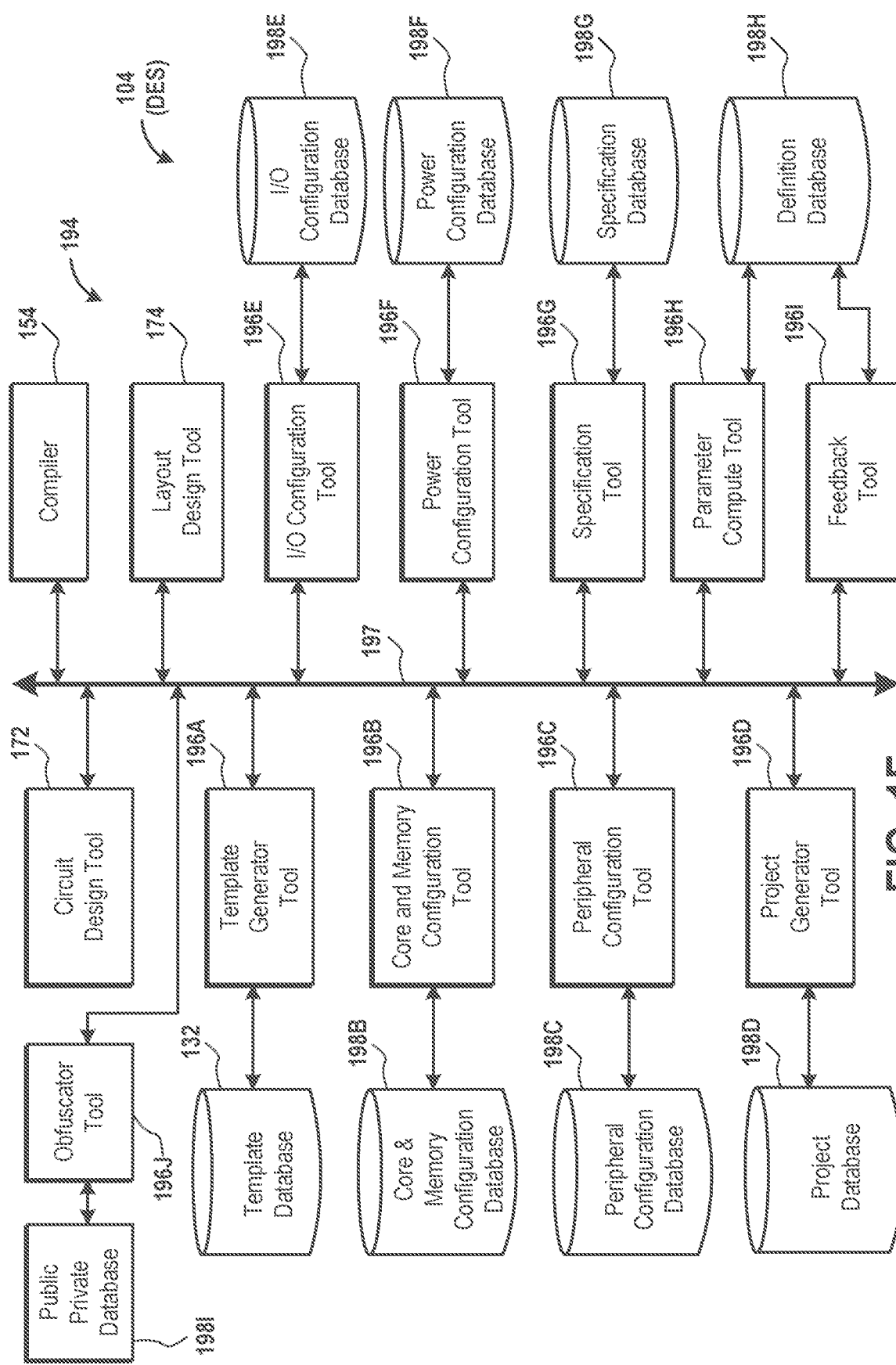
FIG. 1F is a diagram of an embodiment of a system to illustrate different tools of the DES.

FIG. 1F is a diagram of an embodiment of a system 194 to illustrate different tools, described herein. The system 194 includes a template generator tool 196A, a core and memory configuration tool 196B, a peripheral configuration tool 196C, a project generator tool 196D, an I/O configuration tool 196E, a power configuration tool 196F, a specification tool 196G, a parameter compute tool 196H, a feedback tool 196I, the tools 172 and 174, the compiler 154, and an obfuscator tool 196J. Moreover, the DES 104 includes the template database 132, a core and memory configuration database 198B, a peripheral configuration database 198C, a project database 198D, and I/O configuration database 198E, a power configuration database 198F, a specification database 198G, a definition database 198H, and a public-private database 198I.

The tools 172, 174, and 196A-196J, and the compiler 154 are coupled to each other via a connection 197, such as a bus or multiple cables or the computer network 102 (FIG. 1A), or a combination of two or more thereof. Moreover, the template database 132 is stored within one or more memory devices of the DES 104 and the one or more memory devices are coupled to the template generator tool 196A. Similarly, the core and memory configuration database 198B is stored within one or more memory devices of the DES 104 and the one or more memory devices are coupled to the core and memory configuration tool 196B. Also, the peripheral configuration database 198C is stored within one or more memory devices of the DES 104 and the one or more memory devices are coupled to the peripheral configuration tool 196C. The project database 198D is stored within one or more memory devices of the DES 104 and the one or more memory devices are coupled to the project generator tool 196D. The I/O configuration database 198E is stored within one or more memory devices of the DES 104 and the one or more memory devices are coupled to the I/O configuration tool 196E. Also, the power configuration database 198F is stored within one or more memory devices of the DES 104 and the one or more memory devices are coupled to the power configuration tool 196F. The specification database 198G is stored within one or more memory devices of the DES 104 and the one or more memory devices are coupled to the specification tool 196G. The definition database 198H is stored within one or more memory devices of the DES 104 and is coupled to the parameter compute tool 196H and the feedback tool 196I. The public-private database 198I is stored within one or more memory devices of the DES 104 and is coupled to the obfuscator tool 196J. The template database 132 stores the SoC design file 150A (FIG. 1D). Functionality of the tools 196A-196I is described below with reference to FIGS. 2 through 11E.

In one embodiment, any number of databases other than that illustrated in FIG. 1F is used. For example, the template database 132 and the definition database 198H are combined into a single database. As another example, the template database 132 and one or more of the databases 198B-198H are combined into one database.

In an embodiment, any number of tools other than that illustrated in FIG. 1F is used. For example, functions described herein as being performed by the core and memory configuration tool 196B and functions described herein as being performed by the peripheral configuration tool 196C are performed by one tool that is coupled to the bus 197.

In one embodiment, instead of or in addition to storing information, described herein, in the template database 132, the information is stored in the definition database 198H. For example, the SoC definition file 138 (FIG. 1B) is stored in the definition database 198H instead of or in addition to being stored within the template database 132.

In an embodiment, instead of or in addition to storing information, such as constraints and the performance rule set, described herein, in the definition database 198H, the information is stored in the template database 132.

In one embodiment, the definition database 198H is stored within the template database 132.

In one embodiment, each compiled file, described herein, is generated by the compiler 154 (FIG. 1F) and stored in the template database 132 (FIG. 1F) for access by one or more of the tools, described herein, of the DES 104.

Figure 2:
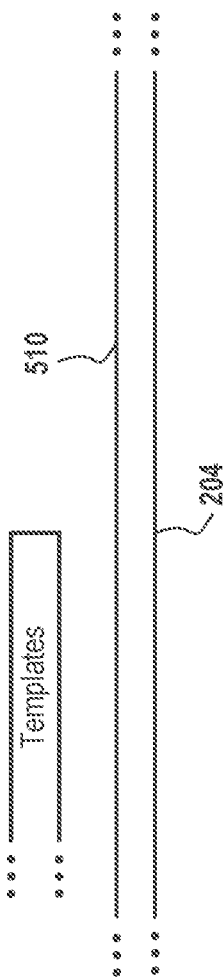
FIG. 2 is a diagram of an embodiment of a system to illustrate a login screen for logging into one or more software services that are provided by the one or more servers of the DES.

FIG. 2 is a diagram of an embodiment of a system 200 to illustrate a login screen for logging into one or more software services that are provided by the one or more servers of the DES 104 (FIG. 1A). The system 200 includes a login website 202 that is displayed on a display screen 204 of a display device of the customer client device 1 (FIG. 1A). The login website 202 is accessed using a web browser and has a web address, which is illustrated as https://DES.com. The login website 202 is hosted by the one or more servers of the DES 104.

On the login website 202, a login button 206 is displayed. Moreover, the login website 202, a field for a username and another field for a password are displayed. In response to receiving a selection of the login button 206 in addition to the username and password via the input device of the customer client device 1 from the customer 1 (FIG. 1A), the processor of the customer client device 1 generates web request, such as a Hypertext Transfer Protocol (HTTP) request, which includes the username and password and an indication of the selection of the login button 206. The processor of the customer client device 1 sends the web request via the computer network 102 (FIG. 1A) to the one or more servers of the DES 104.

Figures 1, 5B:
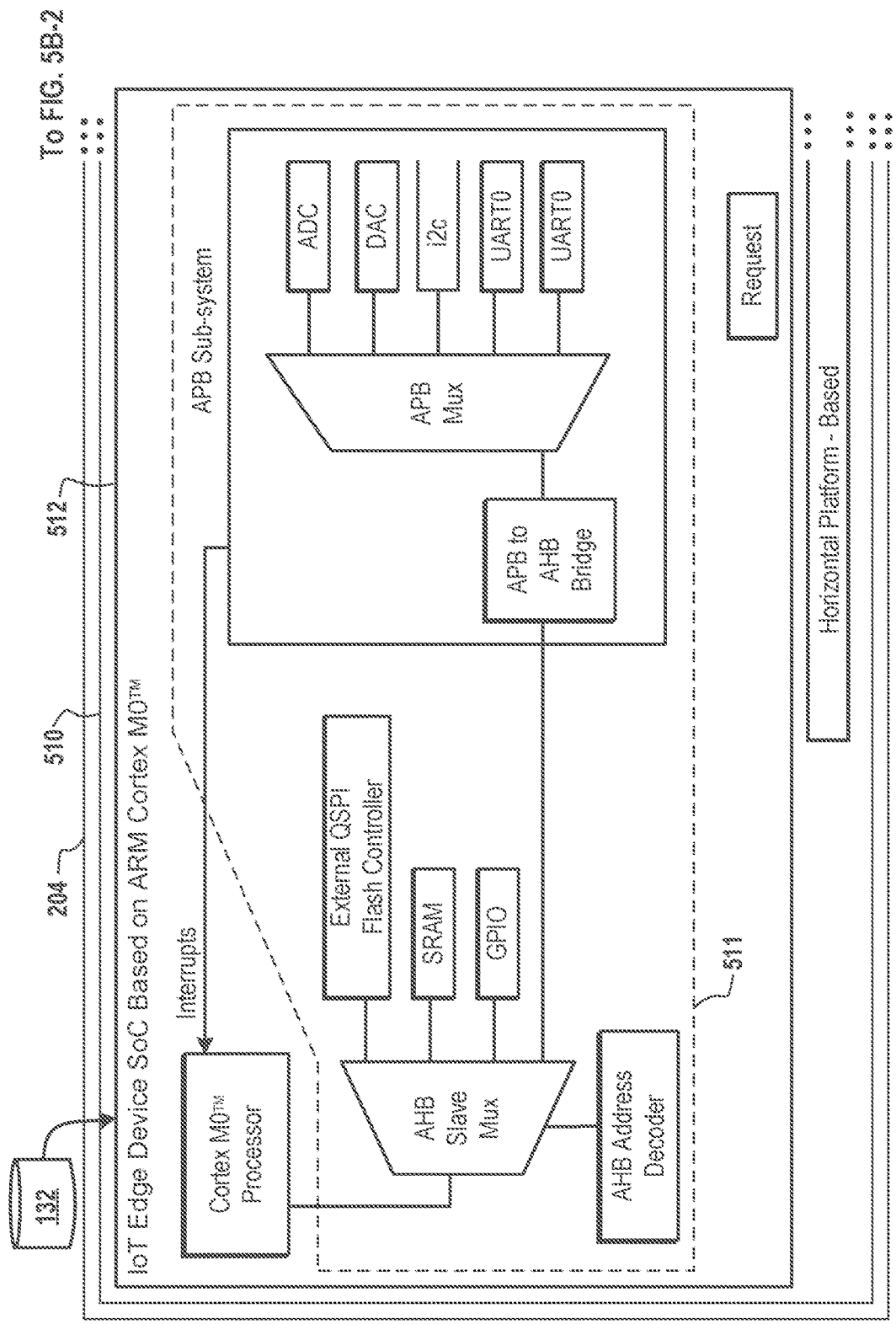
FIG. 5B-1 is a diagram of an embodiment of a first portion of another template selection webpage for selecting the template design.
Figure 5B:
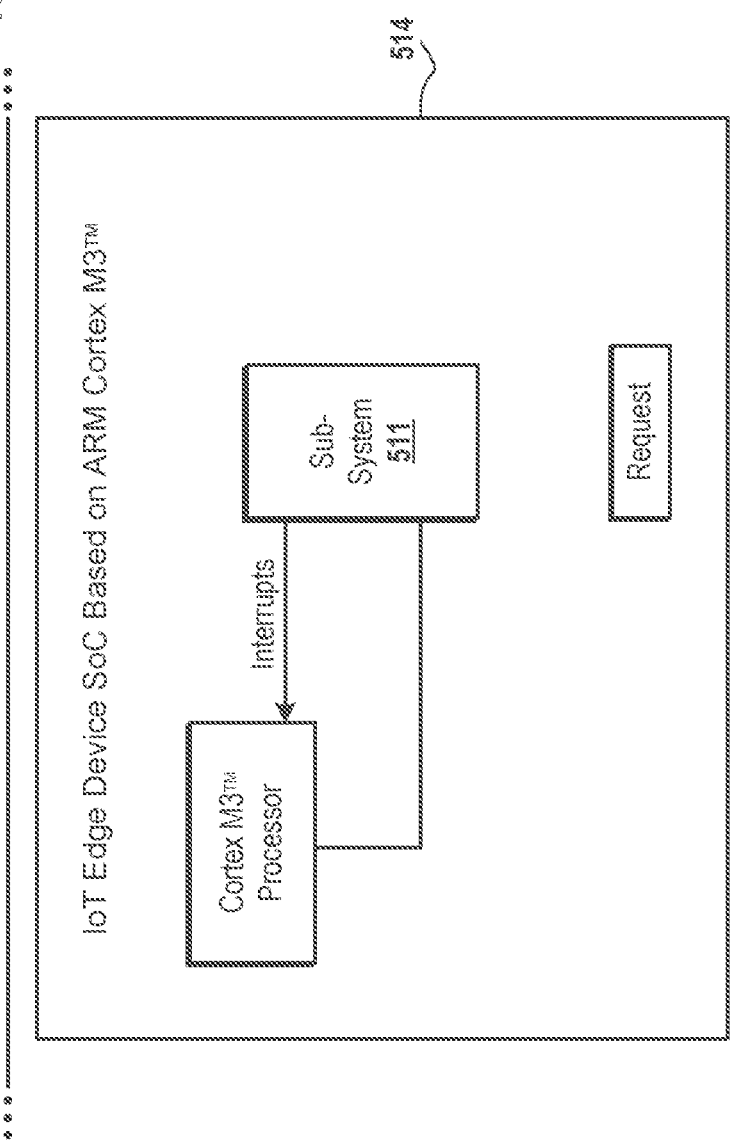

Upon receiving the web request, the one or more servers of the DES 104 authenticate the username and password to allow the login of the customer 1 into the customer account 1 (FIG. 1). In addition, the one or more servers of the DES 104 send webpage data for displaying a DES services webpage 302 (FIG. 3) via the computer network 102 to the customer client device 1. Upon receiving the webpage data, the processor of the customer client device 1 sends the webpage data to the GPU of the customer client device 1. Upon receiving the webpage data, the GPU of the customer client device 1 displays the DES services webpage 302, which is illustrated in FIG. 3, on the display screen 204 of the customer client device 1.

Figures 3, 5B:
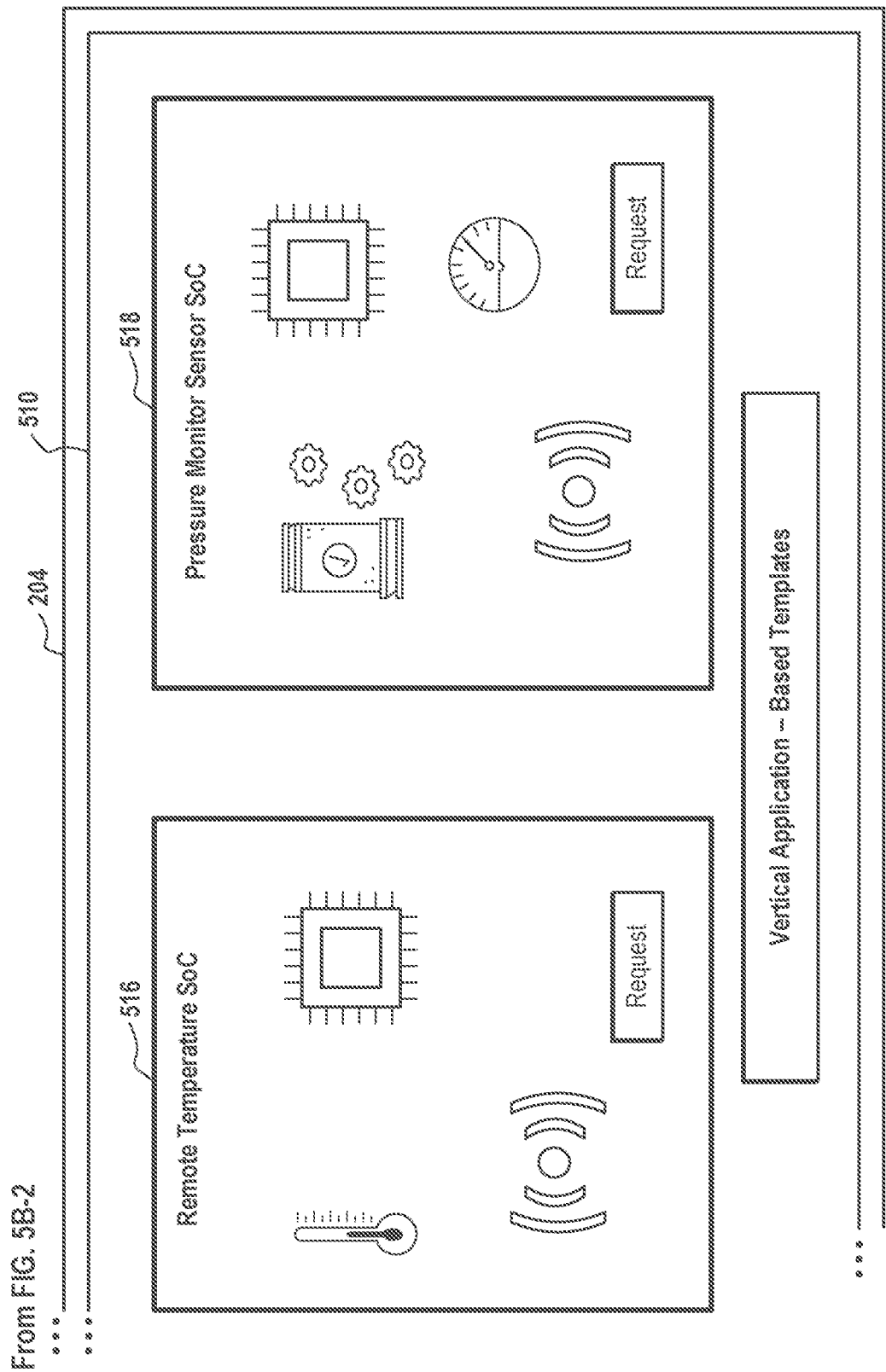
FIG. 3 is an embodiment of a DES services webpage that is accessed by the customer client device from the one or more servers of the DES.

FIG. 3 is an embodiment of the DES services webpage 302 that is accessed by the customer client device 1 (FIG. 1A) from the one or more servers of the DES 104 (FIG. 1A). The DES services webpage 302 includes multiple buttons 304A, 304B, 304C, and 304D. The button 304C indicates that a service request for designing the SoC is to be provided. The customer 1 (FIG. 1A) uses the input device of the customer client device 1 (FIG. 1A) to select the button 304C. Upon receiving an indication of the selection of the button 304C, the processor of the customer client device 1 generates a web request including data regarding the indication of the selection, and sends the web request via the computer network 102 (FIG. 1A) and the customer account 1 to the one or more servers of the DES 104. Upon receiving the web request including the indication of the selection of the button 304C, the one or more servers of the DES 104 generate webpage data for displaying a service request webpage 402, which is illustrated below in FIG. 4.

FIG. 4 is a diagram of an embodiment of the service request webpage 402. The webpage data for displaying the service request webpage 402 is sent from the one or more servers of the DES 104 (FIG. 1A) via the computer network 102 and the customer account 1 to the customer client device 1 (FIG. 1A) for display of the service request webpage 402 on the display screen 204 of the customer client device 1. The service request webpage 402 includes a create new request button 404A, and access existing request button 404B, and a delete existing request button 404C. The customer 1 (FIG. 1A) uses the input device of the customer client device 1 (FIG. 1A) to select the create new request button 404A to request a design of the SoC. Upon receiving an indication of the selection of the button 404A, the processor of the customer client device 1 generates a web request including data regarding the indication of the selection, and sends the web request via the computer network 102 (FIG. 1A) and the customer account 1 to the template generator tool 196A (FIG. 1F) of the one or more servers of the DES 104. Upon receiving the web request including the indication of the selection of the create new request button 404A, the template generator tool 196A of the DES 104 creates or accesses webpage data for displaying a template selection webpage 502, which is illustrated below in FIG. 5A. The webpage data for displaying the template selection webpage 502 is accessed from the template database 132 (FIG. 1F).

FIG. 5A is a diagram of an embodiment of the template selection webpage 502. The webpage data to display the template selection webpage 502 is sent from the template generator tool 196A (FIG. 1F) via the computer network 102 and the customer account 1 to the customer client device 1 (FIG. 1A) for display of the template selection webpage 502 on the display screen 204 of the customer client device 1. To generate the webpage data for the template selection webpage 502, the template generator tool 196A of the DES 104 accesses multiple templates 1 and 2, application data for displaying multiple applications 1 and 2, and foundry data for displaying identifiers of multiple foundries 1 and 2, from the template database 132 for designing the SoC. As an example, the templates 1 and 2 are obtained or read from the template database 132. An example of an identifier of a foundry includes a name of the foundry or an acronym of the name.

The template database 132 further includes a correspondence, such as a one-to-one association or a link or a unique relationship, between each template for designing the SoC and a foundry that can manufacture the SoC according to the template. For example, the foundry 1 does not have resources, such as plasma chambers, lithography tools, deposition chambers, etch chambers, radio frequency generators, impedance matching circuits, etc., to fabricate an integrated circuit from the template 2 for the application 2 and the foundry 2 does not have the resources to fabricate an integrated circuit from the template 1 for the application 1. The foundry 1 has the resources to fabricate the integrated circuit from the template 1 for the application 1 and foundry 2 has the resources to fabricate the integrated circuit from the template 2 for the application 2. Examples of the foundry include the foundry 1, such as GlobalFoundries™, and the foundry 2, such as Taiwan Semiconductor Manufacturing Company™ (TSMC™). Each foundry operates a semiconductor fab for fabricating designs of integrated circuits. In addition, the template database 132 includes a correspondence, such as a one-to-one relationship or a mapping, between each template 1 and 2 for designing the SoC and an application, such as the application 1 or 2, of the SoC.

Examples of the applications 1 and 2, such as technology applications, of the SoC include a sensing application, a monitoring application, and a control application. To illustrate, the SoC is a pedometer that senses or counts a number of steps taken by a user while walking or running. The pedometer is an example of an integrated circuit device. The pedometer is wearable by a user. For example, the user straps the pedometer around his/her arm or leg. As another illustration, the SoC monitors a heart rate of the user. The heart rate monitor is an example of another integrated circuit device. The heat rate monitor is also wearable by the user. For example, the user straps or ties or wraps and locks the heat rate monitor around his/her chest or wrist. As yet another illustration, the SoC is a controller for an Internet of Things (IoT) computing device. The IoT computing device is an example of an integrated circuit device. As another example, the SoC is implemented within a computer, such as a desktop computer or a laptop computer or a smart phone. Step monitoring, heart rate monitoring, IoT, and computing are examples of the application 1 or 2. As another example, the SoC is used in a custom silicon application. To illustrate, the SoC a part of multiple integrated circuit chips that are custom designed and used in a network switch.

A technology application is a generic application or a specific application. An example of the generic application is use of the SoC in multiple devices or products, such as a cell phone, a game console, and a wristwatch. An example of the specific application is use of the SoC for a specific product, such as a switch manufactured by Cisco Systems™, or a cell phone manufactured by Apple Inc.™, or a temperature sensor, or a playstation manufactured by Sony Corporation™.

It should be noted that each template is for a design of a different SoC. For example, the template 1 provides a design of a first SoC and the template 2 provides a design of a second SoC. As another example, the first SoC has at least one different component than the second SoC. To illustrate, the first SoC has a different configuration than the second SoC and the template 2 is designed using different configuration data than that used for designing the template 1. As another illustration, the first SoC has different layout features than that of the second SoC and has different circuit components than that of the second SoC. Examples of circuit components, as used herein, include logic gates, capacitors, inductors, resistors, light emitting diodes, and transistors. Examples of the layout features, as used herein, include an n-type well, a p-type well, a metal oxide layer, and a via.

In response to receiving the webpage data for displaying the template selection webpage 502 via the computer network 102 and the customer account 1, the processor of the customer client device 1 sends the webpage data to the GPU of the customer client device 1. The GPU of the customer client device 1 displays the template selection webpage 502 on the display screen 204 of the customer client device 1. The template selection webpage 502 includes a template gallery having the templates 1 and 2. The customer 1 uses the input device of the customer client device 1 to select one of the templates 1 and 2 displayed on the webpage 502 for designing the SoC.

In one embodiment, instead of two templates 1 and 2, any other number of templates is included within the template gallery illustrated in FIG. 5A. Moreover, in an embodiment, instead of two applications 1 and 2, any other number of applications is included on the template selection webpage 502.

In an embodiment, there is a correspondence between each template 1 and 2 and one of the applications 1 and 2 and between the template and multiple foundries. For example, a design of the SoC that is configured using the template 1 can be fabricated by multiple foundries, such as the foundry 1 and the foundry 2. As another example, there is a correspondence between a template of the SoC, an application of the SoC, and multiple foundries that can fabricate the SoC based on a design that is incorporated in the template.

Figure 7A:
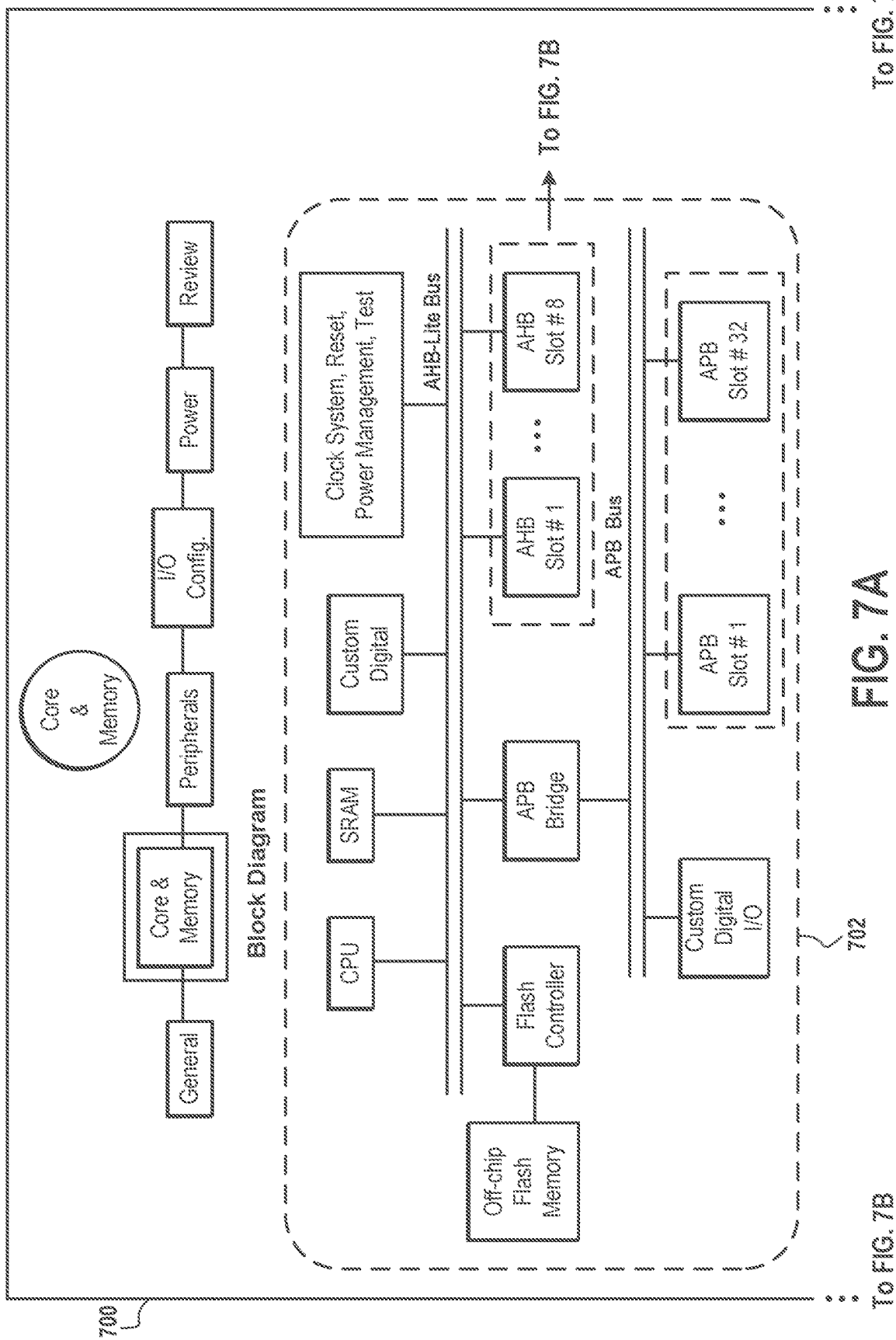
FIG. 7A is a diagram of an embodiment of a first portion of a core and memory configuration webpage.

In one embodiment, upon receiving the web request including the indication of the selection of the create new request button 404A (FIG. 4), the template generator tool 196A of the DES 104 creates or accesses webpage data for displaying a template selection webpage that does not include a template 702 (FIG. 7A). Instead, the template generator tool 196A of the DES 104 provides access to the customer client device 1 via the computer network 102 to multiple IP blocks 134(1)-134(n) to allow the customer 1 to create the template 702 via the input device of the customer client device 1. For example, the customer 1 uses the input device of the customer client device 1 to select multiple ones of the IP blocks 134(1)-134(n) to create the template 702.

FIG. 5B-1 is a diagram of an embodiment of a first portion of another template selection webpage 510 that is displayed on the display screen 204. The template selection webpage 510 is generated and displayed in the same or similar manner as that of the template selection webpage 502 of FIG. 5A. For example, upon receiving an indication of the selection of the create new request button 404A (FIG. 4), the template generator tool 196A (FIG. 1F) of the DES 104 accesses the template database 132 to obtain multiple templates for generating the webpage 510, generates webpage data incorporating the templates, and sends the webpage data via the computer network 102 (FIG. 1A) and the customer account 1 to the customer client device 1 for displaying the template selection webpage 510.

The template selection webpage 510 includes a template 512, another template 514, yet another template 516, and another template 518. The template 512 corresponds to an IoT application and has an Advanced RISC Machine (ARM™) Cortex-M0™ processor. The template 512 includes representations, such as images or diagrams or figures, of multiple components, such as the ARM Cortex-M0™ processor, an Advanced High-Performance Bus (AHB) slave multiplexer (MUX), an external Quad serial peripheral interface (QSPI) flash controller, a static random access memory (SRAM), a general-purpose input output (GPIO), an AHB address decoder, an Advanced Peripheral Bus (APB) to AHB bridge, an APB MUX, an analog-to-digital converter (ADC), a digital to analog converter (DAC), and Inter-IC (I2C) master, and multiple universal asynchronous receiver transmitters (UARTs). The UARTs are labeled as UARTOs in FIG. 5B-1. An input/output pin of the AHB slave MUX is coupled to the Cortex-M0™ processor and multiple input/output pins of the AHB slave MUX are coupled to the external QSPI flash controller, the SRAM, the GPIO, and the APH to AHB bridge. Moreover, the AHB address decoder is coupled to a control input pin of the AHB slave MUX. Also, an input/output pin of the APB MUX is coupled to the APH to AHB bridge and multiple input/output pins of the APB MUX are coupled to the ADC, the DAC, the I2C master, and the UARTOs. The APB to AHB bridge, the APB MUX, the DAC, the ADC, the I2C master, and the UARTOs are components of an APB sub-system. The AHB slave MUX, the external QSPI flash controller, the SRAM, the GPIO, the AHB address decoder, and the APB sub-system are components of a sub-system 511 of the template 512.

It should be noted that AHB and APB are on-chip bus standards, such as protocols for connection of the components of the SoC, management of the parameters of the components, and communication between the components. Both the AHB-Lite and the APB are parts of an Advanced Microprocessor Bus Architecture (AMBA). The APB standard is different from the AHB standard. As an example, AHB uses full duplex parallel communication between components that are coupled to the AHB-Lite bus and APB uses memory accesses. As another example, a transaction between two components coupled to the AHB-Lite bus includes an address phase for addressing one of the two components and a data phase for reading data from or writing data to the addressed component. A transaction between two components coupled to the APB bus includes a master component coupled to the APB bus that accesses data from or writes data to a slave component coupled to the APB bus. Also, APB is sometimes used to couple peripherals with each other and the AHB-Lite bus is used to couple main components, such as the CPU and SRAM, of the SoC.

SRAM is a type of a memory and is different from another type of memory, such as dynamic RAM (DRAM). For example, SRAM uses transistors and latches and DRAM uses capacitors and transistors. As another example, SRAM is faster than DRAM in storing and accessing data. As another example, SRAM is used within a cache memory and DRAM is used as a main memory. In a similar manner, a ROM is a different type of memory than RAM. For example, ROM is non-volatile and RAM is volatile.

It should be noted that a representation of a component of the SoC is coupled to a representation of another component of the SoC via an interconnection, such as a bus or a through-silicon via or a metal conductor or a conductive wire. For example, the input/output pins of the AHB slave MUX are coupled to the external QSPI flash controller, the SRAM, the GPIO, and the APH to AHB bridge via multiple interconnections. As another example, multiple input/output pins of the APB MUX are coupled to the ADC, the DAC, the I2C master, and the UART0s via multiple interconnections.

FIG. 5B-2 is a diagram of an embodiment of a second portion of the template selection webpage 510. The template 514 corresponds to an IoT application and has an ARM Cortex-M3™ processor. The template 514 has the same representations of components as that in the template 512 and the components are coupled in the same manner as that illustrated in the template 512 except that the template 514 includes the ARM Cortex-M3™ processor instead of the ARM Cortex-M0™ processor. The templates 512 and 514 are examples of horizontal platform-based templates.

FIG. 5B-3 is a diagram of an embodiment of a third portion, which is the remaining portion of the template selection webpage 510. The template 516 corresponds to an application for remotely monitoring temperature and the template 518 corresponds to an application for monitoring pressure. To illustrate, the template 516 is a design of the SoC that is a temperature monitor and the template 518 is a design of the SoC that is a pressure monitor sensor.

Any of the templates 512-518 is an example of the template 1, illustrated in FIG. 5A and any of remaining of the templates 512-518 is an example of the template 2, which is illustrated in FIG. 5A. For example, the template 512 is an example of the template 1 and the template 514 is an example of the template 2.

Figure 6:
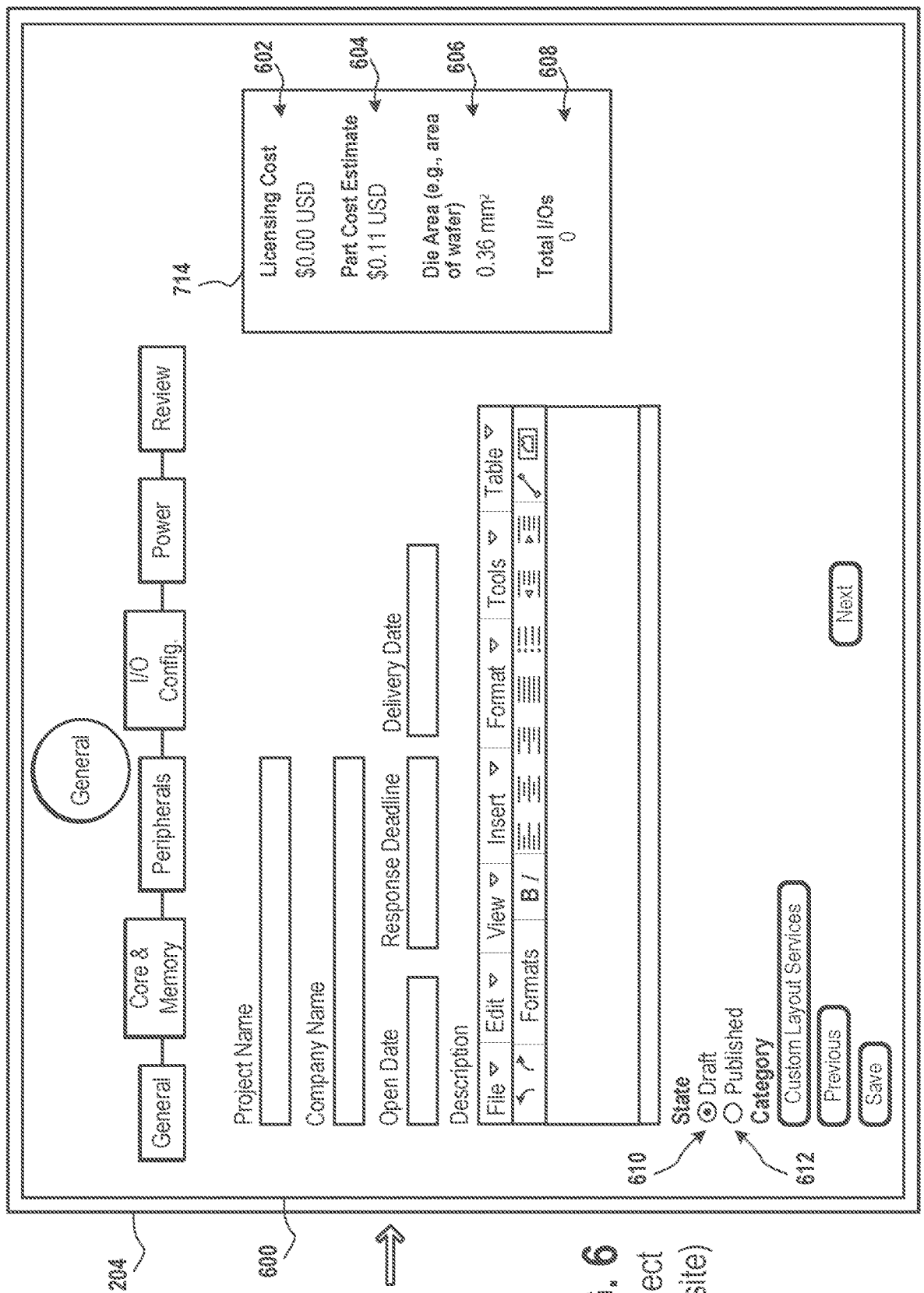
FIG. 6 is a diagram of an embodiment a project webpage that is displayed on a display screen of the customer client device in response to receiving a selection of the design template via the template selection webpage of FIG. 5A.

FIG. 6 is a diagram of an embodiment a project webpage 600 that is displayed on the display screen 204 of the customer client device 1 (FIG. 1A) in response to receiving a selection of the template 1 or the template 2, illustrated in FIG. 5A. For example, the customer 1 uses the input device of the customer client device 1 to select the template 1 on the template selection webpage 502 (FIG. 5A) via the customer account 1 (FIG. 1A). The processor of the customer client device 1 sends an indication of the selection of the template 1 via the computer network 102 and the customer account 1 to the project generator tool 196D (FIG. 1F) of the DES 104 (FIG. 1A).

In response to a reception of the indication of the selection of the template 1, the project generator tool 196D generates or accesses webpage data for displaying the project webpage 600 from the project database 198D and sends the webpage data via the computer network 102 and the customer account 1 for display of the project webpage 600 on the customer client device 1. The webpage data for displaying the project webpage 600 is accessed from the project database 198D (FIG. 1F). Upon receiving the webpage data for displaying the project webpage 600, the processor of the customer client device 1 sends the webpage data to the GPU of the customer client device 1 for display of the project webpage on the display screen 204.

In addition, in response to receiving the indication of the selection of the template 1, the one or more servers of the DES 104 generate and send copies of the project generator tool 196D, the parameter compute tool 196H, the feedback tool 196I, and copies of portions of the project database 198D and the definition database 198H via the computer network 102 to the customer client device 1. For example, when the indication of the selection of the template 1 is received, the one or more servers of the DES 104 apply the communication protocol to generate one or more packets including the copies of project generator tool 196D, the parameter compute tool 196H, and the feedback tool 196I, and copies of portions of the project database 198D and the definition database 198H and send the one or more packets via the computer network 102 to the processor of the customer client device 1. The processor of the customer client device 1 applies the communication protocol to the one or more packets to extract the copies of the project generator tool 196D, the parameter compute tool 196H, and the feedback tool 196I, and copies of portions of the project database 198D and the definition database 198H, and stores the copies of the tools 196D, 196H, and 196I, and the portions of the project database 198D and the definition database 198H in the memory device of the customer client device 1 for execution by the processor of the customer client device 1. The portion of the project database 198D and the definition database 198H are used to generate the webpage data for displaying the project webpage 600. For example, the portion of the definition database 198H is used by the parameter compute tool 196H to generate a parameter display field 714.

The project webpage 600 includes information fields, such as, a field for receiving a project name of the project, a field for receiving a company name, a field for receiving an open date for the project, a field for receiving a response deadline for the project, a field for receiving a delivery date for the project, a field for receiving a description of the project, a field 610 or 612 for receiving a state of publication of the project, a previous button, a next button, and the save button. An example of the state of publication includes whether the project is a draft or to be published. The project webpage 600 further includes the parameter display field 614.

Information, such as the project name, the company name, the open date, the response deadline, the delivery date, the description, and the state of publication, are provided by the customer 1 (FIG. 1A) via the input device of the customer client device 1 (FIG. 1A) and the customer account 1 (FIG. 1A). The project name is a name of the project for designing the SoC. The company name is the name of a company or entity that wishes to obtain a design of the SoC. As an example, the company name is a name of the customer 1. The open date is a date on which the one or more servers of the DES 104 (FIG. 1A) receive the information provided within one or more of the information fields. The information is received when the information is entered into one or more of the fields of the project webpage 600 by the customer 1 by using the input device of the customer client device 1. For example, the information entered by the input device of the customer client device 1 on the project webpage 600 is sent by the processor of the customer client device 1 via the computer network 102 to the project generator tool 196D immediately upon receipt of the information by the processor.

The response deadline is a deadline for receiving a response regarding the project. For example, the response deadline includes a due date for receiving a response to a question that is posted within the description field. As another example, the response deadline includes a due date for receiving the SoC design file 150A (FIG. 1D), the circuit design file 150B (FIG. 1D), or the layout design file 150C (FIG. 1D), or a combination thereof. The delivery date is a date of delivery of an integrated circuit having the SoC that is designed according to the configuration data 140 (FIG. 1B), the additional configuration data 142 (FIG. 1B), and the further configuration data. The integrated circuit having the SoC is delivered by the foundry 1 to the customer 1 via mail.

The description field is for receiving a textual description, or a graphical description, or a combination thereof of the project. Moreover, the description field allows attachment of files that include a description of the project or a specification of one or more components of the SoC. The description field provides an interface that is similar to that of a word processing computer program, such as Microsoft Word™ or WordPerfect™.

The customer 1 uses the input device of the customer client device 1 to select the field 610 to further select the draft state of the project. The draft state is a state in which the information received in one or more of the information fields on the project webpage 600 is not published to the community members via the DES 104. For example, the information received within the project webpage 600 is not sent from the one or more servers of the DES 104 to any designer of the community. To illustrate, the information received within the project webpage 600 is not sent via the designer account 1 (FIG. 1A) and the computer network 102 for display on the designer client device 1 and is also not sent from the one or more servers of the DES 104 via the designer account 2 (FIG. 1A) and the computer network 102 for display on the designer client device 2. As another example, in addition to the information received within the project webpage 600, configuration data, such as the configuration data 140, the additional configuration data 142, and the further configuration data, for configuring the SoC is not sent to any designer of the community.

The customer 1 uses the input device of the customer client device 1 to select the field 612 to further select the published state of the project. The published state of the project is a state in which the information received within one or more of the information fields on the project webpage 600 is published or sent to the community members via the DES 104.

The parameter display field 614 includes the one or more parameters, such as a licensing cost 602, a part cost estimate 604, a die area 606, and total I/Os 608. The licensing cost 602 is a cost for allowing or permitting the customer 1 to use the template design 131A (FIG. 1B), or the circuit design 131B (FIG. 1C), or the layout design 131C (FIG. 1C), or the SoC that is fabricated according to the layout design 131C, or a combination thereof. The template design 131A, the circuit design 131B, the layout design 131C, and the SoC that is fabricated according to the layout design 131C are examples of intellectual property embedded within, such as integrated within, the SoC. The licensing cost 602 reflects costs associated with non-recurring engineering (NRE), which includes a one-time cost of researching, designing, developing, and testing one or more components of the SoC.

The intellectual property embedded within the SoC is a result of creativity to which a designer of the intellectual property has legal rights. The designer may apply for intellectual property protection, such as patent protection, of the intellectual property embedded within the SoC to obtain the legal rights. Upon receiving the intellectual property protection, the designer can receive licensing fees, e.g., the licensing cost 602, for making, using, or selling the SoC having the intellectual property. The part cost estimate 604 is an estimate of fabricating, such as manufacturing, the SoC based on the layout design 131C. The die area 606 is an area on a semiconductor wafer that is consumed by the SoC fabricated according to the layout design 131C. The total I/Os 608 is a total or a sum of a number of I/O pins of an integrated circuit having the SoC fabricated based on the layout design 131C.

When the save button is selected by the customer 1 via the input device of the customer client device 1, the information received within the project webpage 600 is sent from the processor of the customer client device 1 via the computer network 102 and the customer account 1 to the project generator tool 196D of the DES 104. The project generator tool 196D of the DES 104 stores the information received within the project webpage 600 in the project database 198D (FIG. 1D) of the DES 104 and associates, such as establishes a one-to-one correspondence with or a mapping with, the information with the customer account 1. Moreover, when the next button on the project webpage 600 is selected by the customer 1 via the input device of the customer client device 1, an indication of the selection is sent via the computer network 102 and the customer account 1 to the project generator tool 196D of the DES 104. The project generator tool 196D of the DES 104 communicates the indication of the selection of the next button via the bus 197 (FIG. 1F) to the core and memory configuration tool 196B (FIG. 1F) of the DES 104. Upon receiving the indication of the selection of the next button, the core and memory configuration tool 196B of the DES 104 generates or accesses webpage data for displaying a core and memory configuration webpage 700, which is illustrated below in FIG. 7A. The webpage data for displaying the core and memory configuration webpage 700 is accessed from the core and memory configuration database 198B (FIG. 1F) of the DES 104.

In response to receiving the indication of the selection of the next button on the project webpage 600 (FIG. 6) from the customer client device 1 via the computer network 102 and the customer account 1, the one or more servers of the DES 104 send copies of the template generator tool 196A, the core and memory configuration tool 196B, a portion of the template database 132 (FIG. 1F), and a portion of the core and memory configuration database 198B (FIG. 1F) via the computer network 102 and the customer account 1 to the customer client device 1. For example, when the indication of the selection of the next button on the project webpage 600 is received, the one or more servers of the DES 104 apply the communication protocol to generate one or more packets including the copies of the tools 196A and 196B, and the portions of the core and memory configuration database 198B and the template database 132, and send the one or more packets via the computer network 102 to the processor of the customer client device 1. The processor of the customer client device 1 applies the communication protocol to the one or more packets to extract the copies of the template generator tool 196A and the core and memory configuration tool 196B, and the portions of the core and memory configuration database 198B and the template database 132, and stores the copies of the template generator tool 196A and the core and memory configuration tool 196B and the portions of the core and memory configuration database 198B and the template database 132 in the memory device of the customer client device 1 for execution by the processor of the customer client device 1.

The portion of the core and memory configuration database 198B has the webpage data for generating the core and memory configuration webpage 700. The portion of the template database 132 includes the template 702 (FIG. 7A). The portions of the databases 198B and 132 correspond to the template 702 and not to another template. For example, the portions of the databases 198B and 132 include information regarding components of the template 702 and fields for configuring the components of the template 702. Examples of the information are provided on the core and memory configuration webpage 700. As another example, if the customer 1 would have chosen the other template 2 instead of the template 702, portions of the databases 198B and 132 specific to the template 2 would have been transferred to the customer client device 1 for configuring the template 2 instead of the portions specific to the template 702.

The portions of the databases 198B and 132 do not include information for configuring components that cannot be a part of the template 702. For example, if a component cannot be used with the AHB-Lite bus or the APB bus and has different standards of communication than AHB or APB, the component cannot be a part of the template 702. As another example, the portions of the databases 198B and 132 that are transferred from the one or more servers of the DES system 104 to the customer client device 1 are specific to the template 702 and not to any other template, such as the template 2.

In one embodiment, the parameter display field 614 includes a power consumption estimate, which is an example of the one or more parameters. The power consumption estimate is an estimate of an amount of power that is consumed by the SoC fabricated according to the layout design 131C. In an embodiment, the parameter display field 614 includes a speed, measured in Hz, of operation of one or more components of the SoC fabricated based on the layout design 131C.

In one embodiment, the one or more parameters displayed within the parameter display field 714 include a cost of non-recurring engineering (NRE). For example, once the template 1 or 2 is selected, the parameter compute tool 196H of the DES 104 accesses from the definition database 196H of the DES 104, the cost of NRE for designing the template 1. As an illustration, NRE refers to a one-time or fixed cost for researching, designing, developing, and testing the template 1. The NRE costs stays the same for each integrated circuit of the SoC regardless of how many units, e.g., integrated circuits, of the SoC are fabricated. The NRE costs vary when the template 1 or 2 is configured using configuration data, described herein. For example, the parameter compute tool 196H of the customer client device 1 accesses an NRE cost for a custom IP block of the template 1 from the portion of the definition database 196H stored within the memory device of the customer client device 1, adds the NRE cost with NRE costs of other IP blocks of the template 1 to output a total NRE cost, and sends the total NRE cost to the GPU of the customer client device 1 for display.

FIG. 7A is a diagram of an embodiment of a first portion of the core and memory configuration webpage 700. The core and memory configuration tool 196B (FIG. 1F) of the DES 104 accesses the webpage data for displaying the core and memory configuration webpage 700 from the core and memory configuration database 198B (FIG. 1F) of the DES 104 and sends the webpage data via the computer network 102 and the customer account 1 to the customer client device 1. Upon receiving the webpage data for displaying the core and memory configuration webpage 700, the processor of the customer client device 1 sends the webpage data to the GPU of the customer client device 1. The GPU of the customer client device 1 displays the core and memory configuration webpage 700 on the display screen 204 (FIG. 6) of the customer client device 1.

The core and memory configuration webpage 700 includes the template 702, which is an example of the template 1 or the template 2 (FIG. 5A). The template 702 is a block diagram of an architecture that provides a context of a design of the SoC. The template 702 includes representations of components, such as, a CPU, an SRAM, a custom digital controller, one or more controllers that include a clock function, a reset function, a power management function, and a test function, an APB bridge, an AHB-Lite bus, a flash controller, an off-chip flash memory, an APB bridge, multiple AHB slots 1 through 8, an APB bus, a custom digital I/O controller, and multiple APB slots 1 through 32. The flash controller is coupled to the off-chip flash memory. The CPU, the SRAM, the custom digital controller, the one or more controllers, the flash controller, the APB bridge, and the AHB slots are coupled to each other via the AHB-Lite bus. Also, the APB bridge, the customer digital I/O controller, and the APB slots 1 through 32 are coupled to each other via the APB bus.

Examples of the custom digital controller include an accelerator, a sensor, a pedometer, and a heart rate monitor. A type of the sensor determines an amount of memory and a rate of sampling of data by the sensor. For example, if the sensor determines a heart rate of the user, the amount of memory, e.g., the off-chip memory or another memory that is coupled to the AHB-Lite bus or a memory within the custom digital controller, is greater than if the sensor determines a number of steps taken by the user while walking or running. As another example, a heart rate sensor samples data at a rate faster than a rate of sampling of data by a pedometer.

It should further be noted that a representation of a component of the SoC is associated with a function of the component. For example, the CPU of the template 702 executes multiple functions that are performed by an actual CPU. To illustrate, the CPU of the template 702 carries out, such as simulates execution of, multiple instructions of a computer program by performing arithmetic, logic, controlling, and I/O operations specified by the instructions. As another example, the SRAM of the template 702 carries out a function performed by an actual SRAM. To illustrate, the SRAM of the template 702 simulates using a flip-flop of the template 702 to store each bit, simulates a function of data remanence, and simulates a function of losing data when the SRAM of the template 702 is not powered by a power source. As another example, the AHB-Lite bus of the template 702 is executed by the one or more servers of the DES 104 to apply an open-standard, on-chip interconnect specification for connection and management of the CPU, the SRAM, the custom digital controller, the one or more controllers that include the clock function, the reset function, the power management function, and the test function, the Flash controller, the APB bridge, and components of the SoC within the APB slots 1 through 8. As yet another example, an ADC of the template 702 is executed by the one or more servers of the DES 104 to convert an analog signal to a digital signal. The ADC is an example of a peripheral of the SoC. Similarly, a DAC of the template 702 is executed by the one or more servers of the DES 104 to convert a digital signal to an analog signal. The DAC is another example of a peripheral of the SoC.

The customer 1 uses the input device of the customer client device 1 to select one or more of the components of the template 702 for removal from the template 702. For example, the flash controller can be removed from the template 704 by selecting the flash controller via the input device of the customer client device 1 and deleting the flash controller from the template 704 via the input device of the customer client device 1. To illustrate, a right click button on a mouse of the customer client device 1 is selected by the customer 1. When the right-click button is selected, the core and memory configuration tool 196B of the customer client device 1 accesses data for displaying a field having a remove button from the portion of the core and memory configuration database 198B stored in the memory device of the customer client device 1 and provides the data to the processor of the customer client device 1 for display on the display screen 204 of the customer client device 1. The processor of the customer client device 1 receives the data and sends the data to the GPU of the customer client device 1 to display the remove button on the display screen 204. The customer 1 selects the remove button to delete the flash controller from the template 704. When the flash controller is removed, the core and memory configuration tool 196B of the customer client device 1 also deletes the off-chip flash memory from the template 704.

When the one or more components are removed from the template 702, the parameter display field 714 (FIG. 7B) is updated in real-time. For example, the template 702 is an example of the configuration data 140 of FIG. 1B and the template 702 without the flash controller is an example of the additional configuration data 142 of FIG. 1B. When the flash controller is remote from the template 702, there is a change in the configuration data 140 to provide the additional configuration data 142.

During an occurrence of the change from the configuration data 140 to the additional configuration data 142, the parameter compute tool 196H of the customer client device 1 updates values of the one or more parameters in the parameter display field 714. For example, the template generator tool 196A (FIG. 1F) of the customer client device 1 provides template data of the template 702 to the parameter compute tool 196H (FIG. 1F) of the customer client device 1. The parameter compute tool 196H of the customer client device 1 computes one or more values of the one or more parameters based on the template data of the template 702 and sends the one or more values to the processor of the customer client device 1.

Upon receiving the one or more values, the processor of the customer client device 1 sends the one or more values to the GPU of the customer client device 1. The GPU of the customer client device 1 displays the one or more values on the display screen 204 of the customer client device 1. To illustrate, once the customer 1 changes the template 702 to remove the flash controller to provide a changed template, the parameter compute tool 196H of the customer client device 1 accesses the portion of the definition database 198H from the memory device of the customer client device 1 to determine a change in the one or more values of the one or more parameters based on the changed template data to further determine one or more changed values of the one or more parameters. The one or more changed values are sent from the parameter compute tool 196H of the customer client device 1 to the GPU of the customer client device 1. Upon receiving the one or more changed values, the GPU of the customer client device 1 displays the one or more changed values in the parameter display field 714. As such, the parameter display field 714 is updated in real-time. As another example, in a similar manner to that explained in the preceding example, the parameter display field 714 is updated when one or more components are added to the template 702. The one or more components are added to the template 702 by the customer 1 via the input device of the customer client device 1 and the customer account 1.

In one embodiment, if the custom digital controller includes an analog sensor, a representation of an ADC is added to the template 702 and the ADC is coupled to the AHB-Lite bus. The ADC converts analog signals received from the analog sensor into digital data.

In an embodiment, some components of the template 702 can be modified by the customer 1 and remaining components of the template 702 cannot be modified by the customer 1. For example, the flash controller or the custom digital controller can be removed by the customer 1 from the template 702. As another example, the CPU cannot be removed by the customer 1 from the template 702. To illustrate, the CPU cannot be selected by the customer 1 via the input device of the customer client device 1. As another illustration, when the customer 1 uses the input device of the customer client device 1 to select the CPU, the template generator tool 196B of the customer client device 1 sends a notification via the computer network 102 and the customer account 1 to the customer client device 1 that the CPU cannot be removed from the template 702.

In an embodiment, the customer 1 can add a component, such as another custom digital controller or another APB bus or another AHB bus, to the template 702, to the template 702. For example, the customer 1 uses the input device of the customer client device to select an add button (not shown) that is displayed on the core and memory configuration webpage 700. The selection of the add button is sent from the customer client device 1 to the template generator tool 196B of the customer client device 1. Upon receiving the selection of the add button, the template generator tool 196B of the customer client device 1 accesses data of one or more additional components that can be added to the template 702 from the portion of the template database 132 stored within the memory device of the customer client device 1, and provides the data to the GPU of the customer client device 1. Upon receiving the data, the GPU of the customer client device 1 displays data list of additional components that can be added to the template 702 on the core and memory configuration webpage 700. The customer 1 selects one of the additional components from the list. Upon receiving an indication of the selection, the template generator tool 196B of the customer client device 1 sends data regarding the additional component to the GPU of the customer client device 1. The GPU of the customer client device 1 displays the additional component as being coupled to either the AHB-Lite bus or the APB bus of the template 702.

The customer 1 uses the input device of the customer client device 1 to request one or more designs, such as a circuit design or a layout design or both the circuit and layout designs, of the additional component. An example of a circuit design, as used herein, includes a schematic design. To illustrate, a schematic design includes an arrangement of circuit components, such as transistors, resistors, gates, capacitors, and inductors, and connections between the components. An example of a layout design, as used herein, includes an arrangement of layout features and interconnections between the layout features. The core and memory configuration webpage 700 includes a design request button. The customer selects the design request button via the input device of the customer client device 1. The selection of the design request button is sent from the customer client device 1 via the computer network 102 and the customer account 1 to the one or more servers of the DES 104. The one or more servers of the DES 104 publish the request for the design to the designer account 1 and the designer account 2 (FIG. 1A). The designers 1 and/or 2 access one or more of the circuit design tool 172 (FIG. 1D) for generating the circuit design of the additional component and the layout design tool 174 (FIG. 1D) for generating the layout design of the additional component. Once the circuit and layout designs are generated, the circuit and layout designs for the additional component are sent from the designer client device 1 and/or the designer client device 2 via the computer network 102 to the customer client device 1 for display on the display device of the customer client device 1.

In an embodiment, the customer 1 can modify the template 702 in any manner. For example, the customer 1 can change connections between components of the template 702. To illustrate, the customer 1 uses the input device of the customer client device to select a modify connection button (not shown) that is displayed on the core and memory configuration webpage 700. The selection of the modify connection button is sent from the customer client device 1 to the template generator tool 196B of the customer client device 1. Upon receiving the selection of the add button, the template generator tool 196B of the customer client device 1 renders the template 702 as modifiable. For example, the template generator tool 196B highlights the template 702 or darkens the template 702 or lightens the template 702. The customer 1 uses the input device of the customer client device 1 to change one or more connections between the components of the template 702. The connections can be changed from a parallel connection between two components of the template to a serial connection between the two components or vice versa.

In one embodiment, a design, such as a layout design or a circuit design, of any of the components, such as the CPU and the SRAM, already included within the template 702 is requested by the customer 1 in the same manner, described above, in which a design of the additional component is requested by the customer. For example, the customer 1 uses the input device of the customer client device 1 to select one of the components of the template 702 to request the design of the component.

In one embodiment, a design, such as a circuit design or a layout design, of one or more of the components of the template 702 are obfuscated or not obfuscated based on whether the customer account 1 has permission to view a design, such as a circuit design or a layout design, of the component. For example, the obfuscator tool 196J (FIG. 1F) of the DES 104 (FIG. 1A) accesses the public-private database 198I to determine whether the customer account 1 is allowed access to the design of the component within the template 702. Upon determining that the customer account 1 is not allowed access to the design of the component within the template 702, the obfuscator tool 196J obfuscates the design to output or generate an obfuscated design. As an example, the obfuscator tool 196J covers or hides or renders opaque or renders as a black box, subcomponents within the circuit design of the component and connections between the subcomponents. As another example, the obfuscator tool 196J covers or hides or renders opaque or renders as a black box, layout features within the layout design of the component and connections between the layout features. Examples of the layout features include a dimension of an oxide layer, a dimension of metal layer, and a dimension of a semiconductor layer of the layout design of the component. Other examples of the layout features include a manner in which the layout features are placed within the layout design. An example of the connections between the components include routing between the layout features. The obfuscated design is sent from the obfuscator tool 196J via the computer network 102 and the customer account 1 to the customer client device 1 for display of the obfuscated design of the component within the template 702. On the other hand, upon determining that the customer account 1 is allowed access to the design of the component, the obfuscated tool 196J does not obfuscate the design and sends the design via the computer network 102 and the customer account 1 to the customer client device 1 for display on the display screen 204 of the customer client device 1. Upon receiving the design, the processor of the customer client device 1 sends the design to the GPU of the customer client device 1. The GPU of the customer client device 1 displays the subcomponents of the circuit design of the component and/or the layout features of the layout design of the component within the template 702.

It should be noted that the designer 1 or the designer 2 that created the design of the component determines whether the design is to be obfuscated. For example, the designer 1 accesses the designer account 1 (FIG. 1A) and uses the input device of the designer client device 1 (FIG. 1A) to select a button, such as a public button or a private button, to indicate whether the design is to be made public or to be kept private. The indication of the selection of the button is sent from the designer client device 1 via the designer account 1 (FIG. 1A) and the computer network 102 to the obfuscator tool 196J for storage in the public-private database 198I. The indication that the design be kept private or public applies to all accounts of the community members except for the designer account 1, or the DES account 1 (FIG. 1A), or both the designer account 1 and the DES account 1. For example, the designer account 2 cannot be used by the designer 2 to access a view of the design that is created by the designer 1.

In one embodiment, the designer 1 or the designer 2 that created the design of the component determines whether the design is to be obfuscated when displayed via one or more accounts of the community. For example, the designer 1 accesses the designer account 1 (FIG. 1A) and uses the input device of the designer client device 1 (FIG. 1A) to select a button, such as a public button or a private button, to indicate whether the design is to be made public or to be kept private. In addition to the selection of the button for indicating whether the design is to be made public or be kept private, the designer 1 uses the input device of the designer client device 1 to select another button, which identifies the one or more accounts for which the design is to be obfuscated. The indication of the selection of both the buttons are sent from designer client device 1 via the designer account 1 (FIG. 1A) and the computer network 102 to the obfuscator tool 196J for storage in the public-private database 198I. Upon receiving the indication of the selection of both the buttons indicating that the design is to be kept private and identifying the one or more accounts, the obfuscator tool 196J does not allow access of the design via the one or more accounts. Rather, the obfuscator tool 196J provides the obfuscated design via the one or more accounts and the computer network 102 to one or more client devices that are used to generate a request for the design.

In one embodiment, the template 702 is an example of one way to configure and connect two or more of the IP blocks 134(1) through 134(n) (FIG. 1B). As an example, any other combination and configuration of the IP blocks 134(1) through 134(n) can be used to create another template to implement another SoC. For example, the IP blocks 134(1) and 134(2) can be connected to each other in parallel to form a first combination and the IP blocks 134(3) and 134(4) can be connected to each other in parallel to form a second combination, and the first and second combinations can be connected to each other in series to design the other SoC.

Figure 7B:
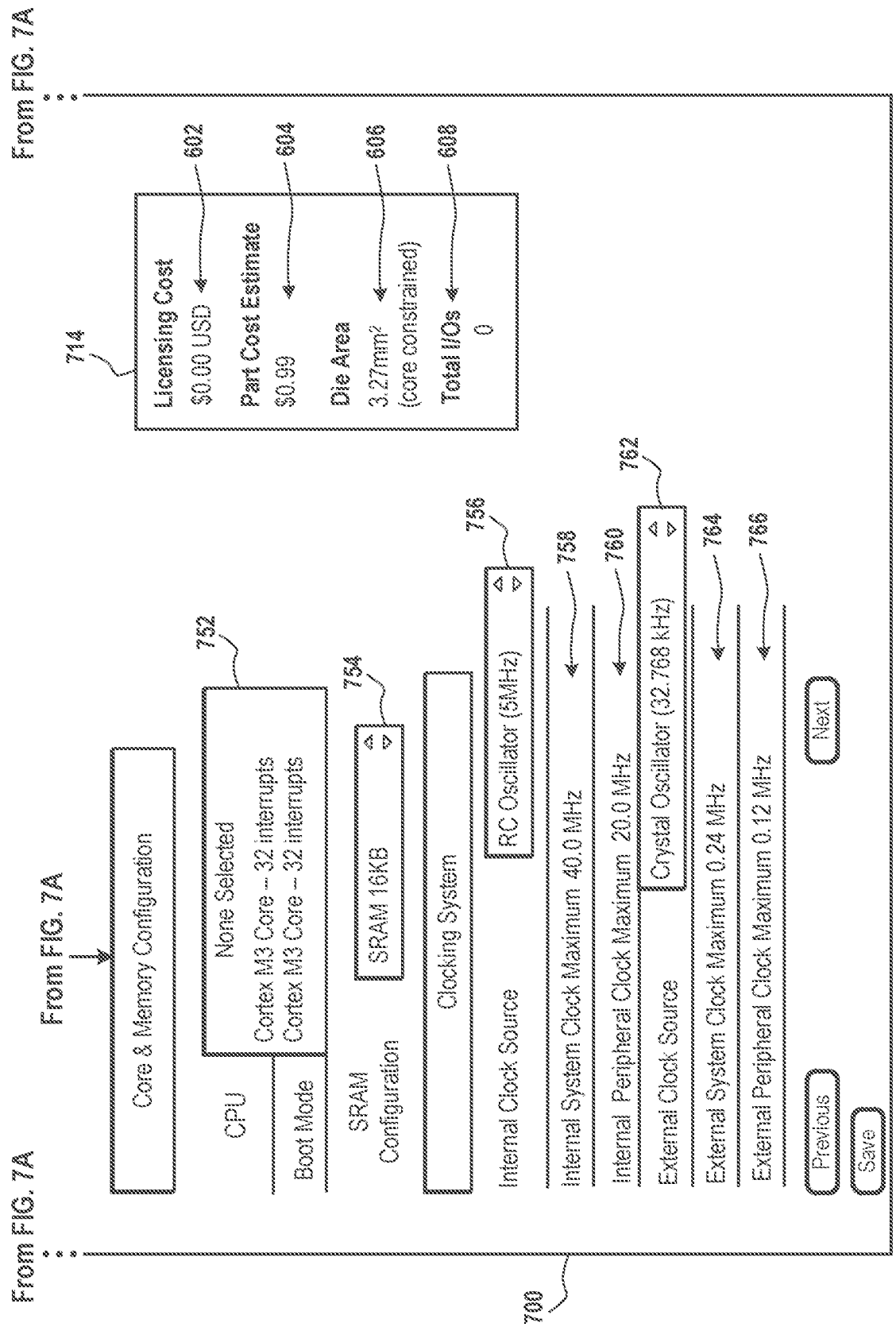
FIG. 7B is a diagram of an embodiment of a second portion, which is the remaining portion of the core and memory configuration webpage.

FIG. 7B is a diagram of an embodiment of a second portion, which is the remaining portion of the core and memory configuration webpage 700. The core and memory configuration webpage 700 includes a field 752 for receiving configuration data for configuring the CPU of the template 702 (FIG. 7A). For example, the CPU can be configured with the Cortex M3™ core or the Cortex M0™ core. The configuration data for configuring the CPU is an example of the configuration data 140 (FIG. 1B) or the configuration data 142 (FIG. 1B) or the further configuration data, described above.

Moreover, the core and memory configuration webpage 700 includes another field 754 for configuring the SRAM of the template 702. For example, the SRAM can be configured to include 16 kilobytes (kB) of memory. The configuration data for configuring the SRAM is an example of the configuration data 140 (FIG. 1B) or the configuration data 142 (FIG. 1B) or the further configuration data, described above.

Also, the core and memory configuration webpage 700 includes a field 756 for configuring an internal clock source, which is a clock source within the SoC. For example, the internal clock source is a resistor-capacitor (RC) oscillator that operates at a frequency of 5 megahertz (MHz). The internal clock source is used for an operation of the CPU. For example, the CPU operates synchronous to clock cycles of a clock signal generated by the internal clock source. To illustrate, the CPU performs logical operations in synchronization with the clock signal generated by the internal clock source. The configuration data for configuring the internal clock source is an example of the configuration data 140 (FIG. 1B) or the configuration data 142 (FIG. 1B) or the further configuration data.

Furthermore, the core and memory configuration webpage 700 includes a field 758 that indicates a maximum operating frequency of the internal clock source and a field 760 that indicates a maximum operating frequency of an internal peripheral clock source that is used to operate one or more peripherals, such as peripheral components, of the SoC. For example, one or more of the peripherals operate synchronous to clock cycles of a clock signal generated by the internal peripheral clock source. The internal peripheral clock source is embedded within the SoC and is coupled to one or more of the peripherals of the SoC.

The core and memory configuration webpage 700 includes a field 762 for configuring an external clock source, which is a clock source outside the SoC and is coupled to the SoC. For example, the external clock source is a crystal oscillator that operates at a frequency of 32.768 kilohertz (kHz). The external clock source is used for an operation of the CPU. For example, instead of or in addition to operating synchronous to the clock signal generated by the internal clock source, the CPU operates synchronous to clock cycles of a clock signal generated by the external clock source. The configuration data for configuring the external clock source is an example of the configuration data 140 (FIG. 1B) or the configuration data 142 (FIG. 1B) or the further configuration data.

The core and memory configuration webpage 700 further includes a field 764 that indicates a maximum operating frequency of the external clock source and a field 766 that indicates a maximum operating frequency of an external peripheral clock source that is used to operate one or more of the peripherals of the SoC. For example, instead of or in addition to operating synchronous to the clock signal generated by the internal peripheral clock source, one or more of the peripherals operate synchronous to clock cycles of a clock signal generated by the external peripheral clock source. The external peripheral clock source is located outside the SoC and is coupled to one or more of the peripherals of the SoC.

With entry of or change in configuration data in any of the fields on the core and memory configuration web page 700, there is a change in one or more values of the one or more parameters, such as the licensing cost 602, the part cost estimate 604, the die area 606, and the total I/Os 608. For example, the part cost estimate 604 increases from $0.0 (FIG. 6) to $0.99 and the die area 606 increases from 0 millimeter square (mm$^2$) (FIG. 6) to 3.27 mm$^2$. There is no change in a number of the total I/Os 608 compared a number of total I/Os 608 illustrated on the project webpage 600 (FIG. 6) and no change in the licensing cost 602 compared to that illustrated on the project webpage 600.

Any change in configuration data on the core and memory configuration web page 700 is sent from the input device of the customer client device 1 to the core and memory configuration tool 196B of the customer client device 1. Upon receiving the change in the configuration data, the core and memory configuration tool 196B of the customer client device 1 sends the change to the parameter compute tool 196H of the customer client device 1. Upon receiving the configuration data, the parameter computer tool 196H accesses the portion of the definition database 198H (FIG. 1F) from the memory device of the customer client device 1 to determine values of the one or more parameters based on the configuration data received within the core and memory configuration webpage 700. For example, the parameter compute tool 196H of the customer client device 1 identifies that the Cortex M0™ core is used as the CPU of the SoC from the configuration data. The parameter compute tool 196H of the customer client device 1 further obtains from the portion of the definition database 198H of the customer client device 1 an amount of power consumed by the Cortex M0™ core and applies the performance rule set to determine whether the amount of power exceeds the predetermined amount of power for the SoC. The determination that the amount of power exceeds the predetermined amount of power is provided from the parameter compute tool 196H of the customer client device 1 to the feedback tool 196I of the customer client device 1. The feedback tool 196I of the customer client device 1 generates feedback indicating that the amount of power exceeds the predetermined amount of power, and sends the feedback via the customer account 1 to the processor of the customer client device 1. Examples of feedback, as used herein, include a message or a notification. The parameter compute tool 196H of the customer client device 1 provides the amount of power to the GPU of the customer client device 1. The GPU of the customer client device 1 displays the amount of power within the parameter display field 714. Moreover, the feedback tool 196I of the customer client device 1 provides the indication that the amount of power exceeds the predetermined amount of power to the GPU of the customer client device 1. The GPU of the customer client device 1 displays a message on the core and memory configuration webpage 700 indicating that the amount of power exceeds the predetermined amount of power.

As another example, the parameter compute tool 196H of the customer client device 1 identifies from configuration data received on the core and memory configuration webpage 700 that the CPU within the template 702 is to have the Cortex M0™ core. The parameter compute tool 196H of the customer client device 1 further identifies from the configuration data received on the core and memory configuration webpage 700 that the SRAM of the template 702 has a memory size of 16 kB. A memory size defines an amount of memory. Examples of amounts of memory include 8 kB, 16 kB, 8 Gigabytes (Gb), 16 GB, etc. The configuration data is received on the core and memory configuration webpage 700 from the input device of the customer client device 1.

Continuing with the example, each time, such as, each instance, configuration data is received from the input device of the customer client device 1 by the parameter compute tool 196H of the customer client device 1, the parameter compute tool 196H of the customer client device 1 obtains from the portion of the definition database 198H stored within the customer client device 1, an amount of power consumed by a component, such as the Cortex M0™ core or the SRAM having the memory size of 16 kB, for which the configuration data is received. If no other configuration data for configuration of any other component of the SoC has been received at the time the configuration data is received, the parameter compute tool 196H of the customer client device 1 determines that the amount of power consumed by the component for which the configuration data is received is a total amount of power consumed by the SoC.

Continuing further with the example, each time configuration data is received from the input device of the customer client device 1 by the parameter compute tool 196H of the customer client device 1, the parameter compute tool 196H sums or adds an amount of power consumed by the component for which the configuration data is received with one or more amounts of power consumed by one or more other components of the SoC for which configuration data is previously received. To illustrate, when configuration data is received by the parameter compute tool 196H of the customer client device 1, the parameter compute tool 196H of the customer client device 1 adds the amount of power consumed by the 16 kB SRAM configured according to the configuration data with the amount of power consumed by the CPU having the Cortex M0™ core that is configured according to the configuration data to compute a total amount of power consumed by the SoC. The total amount of power consumed by the SoC defines a performance for the SoC when the SoC is manufactured.

Continuing with the example, each time the total amount of power is calculated, the parameter compute tool 196H of the customer client device 1 applies the performance rule set that determines whether the total amount of power exceeds the predetermined amount of power for the SoC. The determination that the total amount of power exceeds the predetermined amount of power is provided from the parameter compute tool 196H of the customer client device 1 to the feedback tool 196I of the customer client device 1. The total amount of power is sent from the parameter compute tool 196H and the feedback indicating that the total amount of power exceeds the predetermined amount of power is sent is sent from the feedback tool 196I of the customer client device 1 to the GPU of the customer client device 1. The GPU of the customer client device 1 displays the total amount of power expected to be consumed by the SoC within the parameter display field 714 on the core and memory configuration webpage 700 and displays the message that the total amount of power exceeds the predetermined amount of power on the core and memory configuration webpage 700.

As another example, in the same manner as that described above in the preceding example, the parameter compute tool 196H of the customer client device 1 identifies from configuration data received on the core and memory configuration webpage 700 that the CPU having the Cortex M0™ core and the 16 kB SRAM are to be included within the template 702. Continuing with the example, each time configuration data is received from the input device of the customer client device 1 by the parameter compute tool 196H of the customer client device 1, the parameter compute tool 196H obtains from the portion of the definition database 198H stored within the memory device of the customer client device 1 an amount of licensing cost for licensing a design of a component, such as the Cortex M0™ core CPU or the 16 kB SRAM, for which the configuration data is received. If no other configuration data for configuring any other component of the SoC has been received at the time the configuration data for configuring the component is received, the parameter compute tool 196H of the customer client device 1 determines that the amount of licensing cost for licensing the design of the component for which the configuration data is received is a total amount of licensing cost for licensing a design of the SoC.

Also, each time configuration data is received from the input device of the customer client device 1 by the parameter compute tool 196H of the customer client device 1, the parameter compute tool 196H of the customer client device 1 sums or adds an amount of licensing cost for licensing the design of the component for which the configuration data is received with one or more amounts of licensing costs of one or more designs of one or more other components of the SoC for which configuration data is previously received within one or more configuration files. To illustrate, when configuration data to configure the 16 kB SRAM is received by the parameter compute tool 196H of the customer client device 1, the parameter compute tool 196H adds the amount of licensing cost for licensing a design of the 16 kB SRAM configured according to the configuration data with the amount of licensing cost for licensing the design of the Cortex M0™ core CPU that is configured according to configuration data to compute a total amount of licensing cost for licensing the SoC to the customer 1 via the customer account 1. Each time the total amount of licensing cost is calculated, the parameter compute tool 196H sends the total amount of licensing cost to the GPU of the customer client device 1 for display of the total amount of licensing cost 602 within the parameter display field 714 on the core and memory configuration webpage 700.

As yet another example, the parameter compute tool 196H of the customer client device 1 identifies from configuration data received on the core and memory configuration webpage 700 that the Cortex M0™ core CPU and the 16 kB SRAM are to be included within the template 702. Each time configuration data is received from the input device of the customer client device 1 by the parameter compute tool 196H of the customer client device 1, the parameter compute tool 196H of the customer client device 1 obtains from the portion of the definition database 198H stored within the customer client device 1, an amount of part cost estimate for providing, such as fabricating or supplying, a component, such as the Cortex M0™ core CPU or the 16 kB SRAM, for which configuration data is received. If no other configuration data for configuration of any other component of the SoC has been received at the time the configuration data for configuring the component is received, the parameter compute tool 196H of the customer client device 1 determines that the amount of part cost estimate for providing the component for which the configuration data is received is a total amount of part cost estimate for providing the SoC.

Continuing with the example, each time configuration data is received from the input device of the customer client device 1 by the parameter compute tool 196H of the customer client device 1, the parameter compute tool 196H sums or adds an amount of part cost estimate for providing the component for which the configuration data is received with one or more amounts of part cost estimates for providing one or more other components of the SoC for which configuration data is previously received. To illustrate, when configuration data to configure the SRAM as 16 kB SRAM is received, the parameter compute tool 196H of the customer client device 1 adds the amount of part cost estimate for providing the 16 kB SRAM configured according to the configuration data with the amount of part cost estimate for providing the Cortex M0™ core CPU that is configured according to the configuration data received to compute a total amount of part cost estimate for providing the SoC to the customer 1 via the customer account 1. Each time the total amount of part cost estimate is calculated, the parameter compute tool 196H of the customer client device 1 sends the total amount of part cost estimate for providing to the GPU of the customer client device 1 for display of the total amount of part cost estimate 604 within the parameter display field 714 on the core and memory configuration webpage 700.

As another example, the parameter compute tool 196H of the customer client device 1 identifies from configuration data received on the core and memory configuration webpage 700 that the Cortex M0™ core CPU and the 16 kB SRAM are to be included within the template 702. Each time configuration data is received from the input device of the customer client device 1 by the parameter computer tool 196H of the customer client device 1, the parameter compute tool 196H obtains from the portion of the definition database 198H in the memory device of the customer client device 1, an amount of die area, on a wafer, that will be consumed by a component, such as the Cortex M0™ core CPU or the 16 kB SRAM, for which the configuration data is received. If no other configuration data for configuring any other component of the SoC has been received at the time the configuration data for configuring the component is received, the parameter compute tool 196H of the customer client device 1 determines that the amount of die area, on the wafer, that will be consumed by the component for which the configuration data is received is a total amount of die area for providing the SoC.

Also, continuing with the example, each time configuration data is received from the input device of the customer client device 1 by the parameter compute tool 196H of the customer client device 1, the parameter compute tool 196H sums or adds an amount of die area, on a wafer, that will be consumed by the component for which configuration data is received with one or more amounts of die areas, on the wafer, that will be consumed by one or more other components of the SoC for which configuration data is received previously. To illustrate, when configuration data for configuring the 16 kB SRAM is received, the parameter compute tool 196H of the customer client device 1 adds the amount of die area that will be consumed, on a semiconductor wafer, by the 16 kB SRAM configured according to the configuration data with the amount of die area that will be consumed, on the semiconductor wafer, by the Cortex M0™ core CPU configured according to the configuration data to compute a total amount of die area that will be consumed by the SoC. Each time the total amount of die area is calculated, the parameter compute tool 196H of the customer client device 1 sends the total amount of die area to the GPU of the customer client device 1 for display of the total amount of die area 606 within the parameter display field 714 on the core and memory configuration webpage 700.

Continuing further with the example, each time the total amount of die area is calculated, the parameter compute tool 196H of the customer client device 1 accesses a portion of the performance rule set stored within the memory device of the customer client device and applies the portion to determine whether the total amount of die area exceeds a predetermined amount of die area for the SoC. The predetermined amount of die area is stored in the portion of the definition database 198H (FIG. 1F) stored within the memory device of the customer client device 1. The determination that the total amount of die area exceeds the predetermined amount of die area is provided from the parameter compute tool 196H of the customer client device 1 to the feedback tool 196I of the customer client device 1. The total amount of die area is sent from the parameter compute tool 196H of the customer client device 1 and the feedback indicating that the total amount of die area exceeds the predetermined amount of die area is sent from the feedback tool 196I of the customer client device 1 to the GPU of the customer client device 1. The GPU of the customer client device displays the total amount of die area 606 expected to be used by the SoC within the parameter display field 714 on the core and memory configuration webpage 700 and displays the message that the total amount of die area exceeds the predetermined amount of die area on the core and memory configuration webpage 700.

As yet another example, the parameter compute tool 196H of the customer client device 1 identifies from configuration data received on the core and memory configuration webpage 700 that the Cortex M0™ core CPU and the 16 kB SRAM are to be included within the template 702. Each time configuration data is received from the input device of the customer client device 1 by the parameter computer tool 196H of the customer client device 1, the parameter compute tool 196H obtains from the portion of the definition database 198H stored within the memory device of the customer client device 1, a number of I/Os that will be coupled to a component, such as the Cortex M0™ core CPU or the 16 kB SRAM, for which configuration data is received. If no other configuration data for configuring any other component of the SoC has been received, the parameter compute tool 196H of the customer client device 1 determines that the number of I/Os that will be coupled to the component for which the configuration data is received is the total I/Os of the SoC. The number of I/Os that will be coupled to the component is integrated by the one more servers, such as the I/O configuration tool 196E (FIG. 1F) and a web server (not shown) or a web tool, of the DES 104 into an I/O configuration webpage 900, illustrated in FIGS. 9A-9D. The web server is coupled to the bus 197 (FIG. 1F).

Also, continuing with the example, each time configuration data is received from the input device of the customer client device 1 by the parameter compute tool 196H of the customer client device 1, the parameter compute tool 196H sums or adds a number of I/Os that will be coupled to the component for which the configuration data is received with one or more numbers of I/Os that will be coupled to one or more other components of the SoC for which configuration data is received previously. To illustrate, when configuration data for configuring the 16 kB SRAM is received by the parameter compute tool 196H of the customer client device 1, the parameter compute tool 196H of the customer client device 1 adds the number of I/Os that will be coupled to the 16 kB SRAM configured according to the configuration data received with the number of I/Os that will be coupled to the Cortex M0™ core CPU that is configured according to configuration data previously received to compute a total number of I/Os of the SoC. Each time the total number of I/Os is calculated, the parameter compute tool 196H of the customer client device 1 sends the total number of I/Os for providing to the GPU of the customer client device 1 via the customer account 1 for display of the total number of I/Os 608 within the parameter display field 714 on the core and memory configuration webpage 700.

Continuing with the example, each time the total I/Os is calculated, the parameter compute tool 196H of the customer client device 1 applies the portion of the performance rule set stored within the memory device of the customer client device 1 to determine whether the total I/Os exceeds a predetermined number of I/Os of a package of a wafer die in which the SoC is to be implemented. The predetermined number of I/Os is stored in the portion of the definition database 198H (FIG. 1F) stored in the memory device of the customer client device 1. The determination that the total I/Os exceeds the predetermined number of I/Os is provided from the parameter compute tool 196H of the customer client device 1 to the feedback tool 196I of the customer client device 1. The total I/Os are sent from the parameter compute tool 196H of the customer client device 1 and the feedback indicating that the total I/Os exceeds the predetermined number of I/Os is sent from the feedback tool 196I of the customer client device 1 to the GPU of the customer client device 1. The GPU of the customer client device 1 displays the total I/Os 608 of the SoC within the parameter display field 714 on the core and memory configuration webpage 700 and displays the message that the total I/Os 608 exceeds the predetermined number of I/Os on the core and memory configuration webpage 700.

The core and memory configuration webpage 700 further includes a save button, a previous button, and a next button. When the save button on the core and memory configuration webpage 700 is selected by the customer 1 via the input device of the customer client device 1, configuration data received within the project webpage 700 is sent from the processor of the customer client device 1 via the computer network 102 and the customer account 1 to the core and memory configuration tool 196B (FIG. 1F) of the DES 104. The core and memory configuration tool 196B of the DES 104 stores the configuration data received within the core and memory configuration webpage 700 in the core and memory configuration database 198B of the DES 104 and associates, such as links or establishes a one-to-one correspondence with, the configuration data with the customer account 1.

Moreover, when the next button on the core and memory configuration webpage 700 is selected by the customer 1 via the input device of the customer client device 1, an indication of the selection is sent from the processor of the customer client device 1 via the computer network 102 and the customer account 1 to the core and memory configuration tool 196B of the DES 104. The core and memory configuration tool 196B of the DES 104 provides the indication of the selection via the bus 197 (FIG. 1F) to the peripheral configuration tool 196C (FIG. 1F) of the DES 104. In response to receiving the indication of the selection of the next button displayed on the core and memory configuration webpage 700, the peripheral configuration tool 196C of the DES 104 generates or accesses webpage data from the peripheral configuration database 198C (FIG. 1F) of the DES 104 for displaying a peripheral configuration webpage 800, which is described below with reference to FIGS. 8A, 8B and 8C.

In response to receiving the indication of the selection of the next button on the core and memory configuration webpage 700 from the customer client device 1 via the computer network 102 and the customer account 1, the one or more servers of the DES 104 send a copy of the peripheral configuration tool 196C and a portion of the peripheral configuration database 198C (FIG. 1F) via the computer network 102 and the customer account 1 to the customer client device 1. For example, when the indication of the selection of the next button on the core and memory configuration webpage 700 is received, the one or more servers of the DES 104 apply the communication protocol to generate one or more packets including the copy of the peripheral configuration tool 196C, and the portion of the peripheral configuration database 198C, and send the one or more packets via the computer network 102 to the processor of the customer client device 1. The processor of the customer client device 1 applies the communication protocol to the one or more packets to extract the copy of the peripheral configuration tool 196C, and the portion of the peripheral configuration database 198C, and stores the copy of the template generator tool 196A and the portion of the peripheral configuration database 198C in the memory device of the customer client device 1 for execution by the processor of the customer client device 1.

The portion of the peripheral configuration database 198C has the webpage data for generating the peripheral configuration webpage 800. The portion of the peripheral configuration database 198C correspond to the template 702 and not to another template. For example, the portion of the peripheral configuration database 198C includes information regarding components of the template 702 and fields for configuring the components of the template 702. Examples of the information are provided on the peripheral configuration webpage 800. As another example, if the customer 1 would have chosen the other template 2 instead of the template 702, a portion of the peripheral configuration database 198C specific to the template 2 would have been transferred to the customer client device 1 for configuring the template 2 instead of the portion of the peripheral configuration database 198C specific to the template 702. As yet another example, the portion of the peripheral configuration database 198C that is transferred from the one or more servers of the DES system 104 to the customer client device 1 are specific to the template 702 and not to any other template, such as the template 2.

The portion of the peripheral configuration database 198C does not include information for configuring components that cannot be a part of the template 702. For example, if a peripheral component cannot be used with the AHB-Lite bus or the APB bus of the template 702 and has different standards of communication than AHB or APB, the portion of the peripheral configuration database 198C does not include configuration information for configuring the peripheral component.

FIG. 8A is a diagram of an embodiment of a first portion of the peripheral configuration webpage 800 that is used to receive configuration data for configuring the peripherals of the SoC. The peripheral configuration tool 196C (FIG. 1F) of the DES 104 accesses the webpage data for displaying the peripheral configuration webpage 800 from the peripheral edge configuration database 198C (FIG. 1F) of the DES 104 and sends the webpage data via the computer network 102 and the customer account 1 to the customer client device 1. In response to receiving the webpage data for displaying the peripheral configuration webpage 800, the GPU of the customer client device 1 displays the peripheral configuration webpage 800 on the display screen 204 (FIG. 6) of the customer client device 1. The peripheral configuration webpage 800 includes the template 702.

Figure 8B:
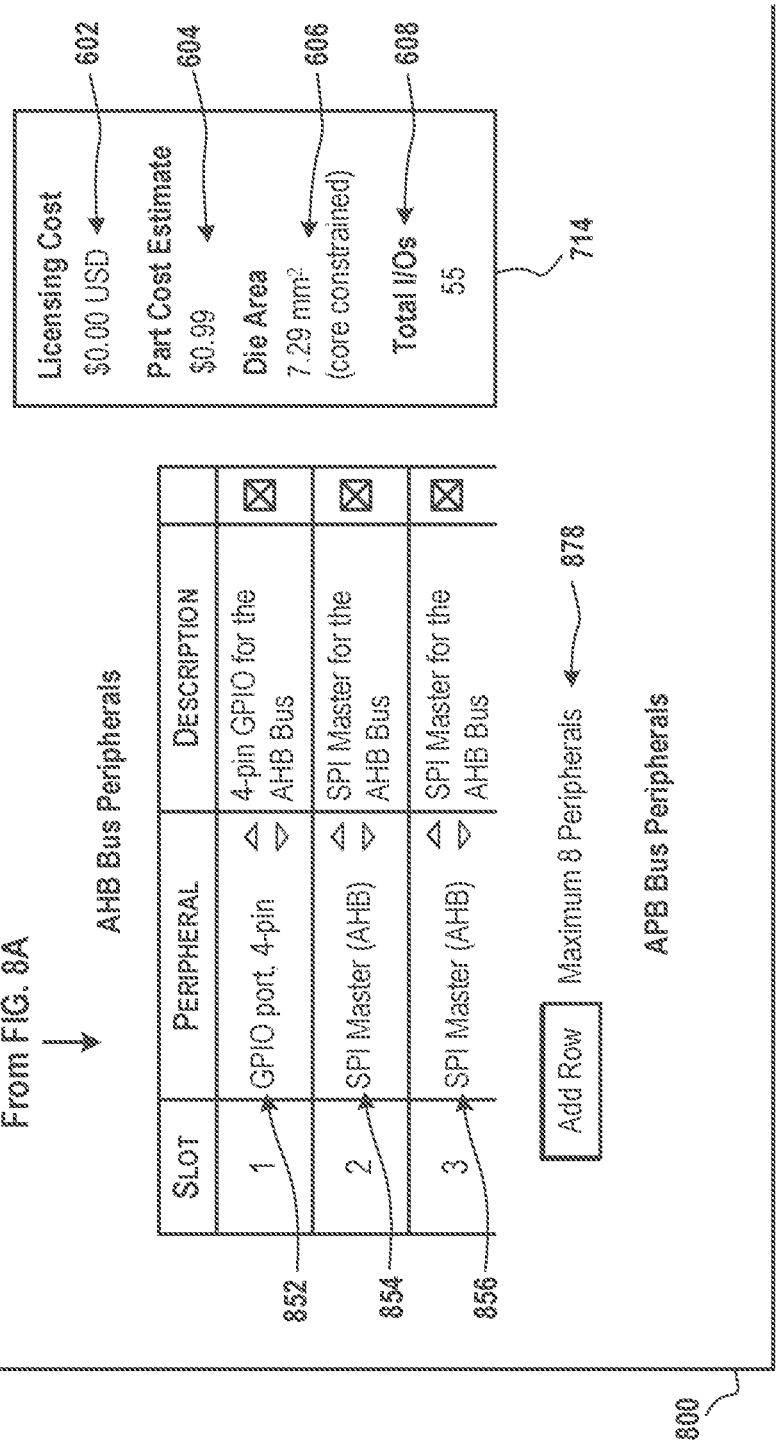
FIG. 8B is a diagram of an embodiment of a second portion of the peripheral configuration webpage.

FIG. 8B is a diagram of an embodiment of a second portion of the peripheral configuration webpage 800. The peripheral configuration webpage 800 includes fields for receiving configuration data, such as the configuration data 140 (FIG. 1B), the additional configuration data 142 (FIG. 1B), or the further configuration data, to configure the peripherals of the SoC and the peripherals are to be coupled to or located within one or more of the AHB slots of the template 702 (FIG. 8A). For example, a field 852 includes configuration data for configuring the AHB slot 1 as a GPIO port having four pins, another field 854 includes configuration data for configuring the AHB slot 2 as a Serial Parallel Interface (SPI) master, and yet another field 856 includes configuration data for configuring the AHB slot 3 as another SPI master. To illustrate, the AHB slot 1 is designated to include the GPIO port, the AHB slot 2 is designated to include the SPI master, and the AHB slot 3 is designated to include the other SPI master. The peripherals that are coupled to or located within one or more of the AHB slots are sometimes referred to herein as AHB bus peripherals. The AHB bus peripherals are of different types than APB bus peripherals, described below. For example, the AHB bus peripherals apply the AHB protocol to communicate with, such as read data from and write data to, each other and with the CPU and the APB bus peripherals apply the APB protocol to communicate with each other and with the CPU.

Moreover, the peripheral configuration webpage 800 includes an add row button. When the customer 1 uses the input device of the customer client device 1 to select the add row button, an indication of the selection is sent from the input device of the customer client device 1 to the peripheral configuration tool 196C (FIG. 1F) of the customer client device 1. Upon receiving the indication of the selection, the peripheral configuration tool 196C accesses the portion of the peripheral configuration database 198C from the memory device of the customer client device 1 to obtain data for displaying an additional row. The additional row is used for adding a component of the SoC to be coupled to the AHB-Lite bus in the template 702. The peripheral configuration tool 196C sends the data for displaying the additional row to the GPU of the customer client device 1. Upon receiving the data for displaying additional row, the GPU of the customer client device 1 displays the additional row on the webpage 800. The additional row includes a field for receiving configuration data for configuring the AHB slot 4.

Besides each field 852-856 is a description of the configuration data for the field. For example, besides the field 852, a description of configuration data for configuring the AHB slot 1 indicates that the 4-pin GPIO port within the AHB slot 1 is a 4-pin GPIO port for the AHB bus.

The second portion of the webpage 800 includes a constraint 878 that indicates the maximum number of peripherals that can be added to the AHB-lite bus of the template 702. The AHB-Lite bus is a high speed bus. The constraint 878 represents constraint data that is stored in the portion of the definition database 198H (FIG. 1F) stored within the customer client device 1. The constraint 878 provides a definition or a limit for configuring the AHB-lite bus of the template 702.

In one embodiment, the constraint 878 is displayed on the display screen 204 (FIG. 6) of the customer client device 1 when the constraint 878 is met. For example, when the customer 1 uses the input device of the customer client device 1 to add a ninth row to the web page 800, an indication of the addition of the ninth row is sent to the parameter compute tool 196H of the customer client device 1. The parameter compute tool 196H of the customer client device 1 accesses the portion of the definition database 198H from the memory device of the customer client device 1 to obtain the performance rule set, such as a definition of the AHB-lite bus within the template 702, to determine that the ninth row cannot be added to the webpage 800 and provides the determination to the feedback tool 196H of the customer client device 1. The feedback tool 196H of the customer client device 1 sends feedback, which is information or a notification, indicating that the customer 1 cannot add the ninth row via the customer account 1. The feedback indicating that the customer 1 cannot add the ninth row is sent to the GPU of the customer client device 1. Upon receiving the feedback indicating that the customer 1 cannot add the ninth row, the GPU of the customer client device 1 displays the feedback on the webpage 800.

FIG. 8C is an embodiment of a third portion of the peripheral configuration webpage 800. The third portion of the peripheral configuration webpage 800 includes fields 858, 860, 862, 864, 866, 868, 870, 872, and 874 for receiving configuration data, such as the configuration data 140 (FIG. 1B), the additional configuration data 142 (FIG. 1B), or the further configuration data, to configure the peripherals of the SoC and the peripherals are to be coupled to one or more of the APB slots of the template 702 (FIG. 8A). For example, the field 858 includes configuration data indicating that the APB slot 1 is to be configured as a 12-channel ADC for converting data that is to be sent to the CPU from an analog form to a digital form, the field 860 includes configuration data indicating that the APB slot 2 is to be configured as an 8-channel ADC for converting data that is to be sent to the CPU from an analog form to a digital form, and the field 862 includes configuration data indicating that the APB slot 3 is to be configured as a UART for receiving data from and sending data to the SoC. To illustrate, the APB slot 1 is designated to include the 12-channel ADC, the APB slot 2 is designated to include the 8-channel ADC, and the APB slot 3 is designated to include the UART. The peripherals that are coupled to or located within one or more of the APB slots are sometimes referred to herein as the APB bus peripherals.

Moreover, the field 864 includes configuration data indicating that the APB slot 4 is to be configured as a system clock for providing a clock signal to one or more components of the SoC, the field 866 includes configuration data indicating that the APB slot 5 is to be configured as a timer for timing operations of one or more components of the SoC, and the field 868 includes configuration data indicating that the APB slot 6 is to be configured as a 10-bit DAC to convert data being transferred from the SoC to another system or device from a digital form to an analog form. To illustrate, the APB slot 4 is designated to include the system clock, the APB slot 5 is designated to include the timer, and the APB slot 6 is designated to include the 10-bit DAC.

Also, the field 870 includes configuration data indicating that the APB slot 7 is to be configured as an I2C master that communicates with a single or multiple slave devices of the SoC, the field 872 includes configuration data indicating that the APB slot 8 is to be configured as an internal reference voltage for operation of the SoC, and the field 874 includes configuration data indicating that the APB slot 9 is to be configured as a 4-pin GPIO port to facilitate communication between the SoC and an external device or system outside the SoC. To illustrate, the APB slot 7 is designated to include the I2C master, the APB slot 8 is designated to include the internal reference voltage, and the APB slot 9 is designated to include the 4-pin GPIO port. An example of the internal reference voltage is a reference voltage source, such as a voltage supply.

Besides each field 858-874 is a description of the configuration data for the field. For example, besides the field 858, a description of configuration data for configuring the APB slot 1 indicates that the ADC within the APB slot 1 is to be configured as a 10-bit successive approximation ADC. As another example, besides the field 860, a description of configuration data for configuring the APB slot 2 indicates that the ADC within the APB slot 2 is also to be configured as a 10-bit successive approximation ADC. As yet another example, besides the field 866, a description of configuration data for configuring the APB slot 5 indicates that the timer within the APB slot 5 is a 32-bit timer. As another example, besides the field 872, a description of configuration data for configuring the APB slot 8 indicates that the internal reference voltage within the APB slot 8 is to be configured for outputting 1.235 volts. Any configuration data that is received within the field 858 or 860 or 862 or 864 or 866 or 868 or 870 or 872 or 874 is an example of the configuration data 140, or the additional configuration data 142, or the further configuration data.

With entry of configuration data in any of the fields on the web page 800 (FIG. 8B), there is a change in one or more values of the one or more parameters, such as the licensing cost 602, the part cost estimate 604, the die area 606, and the total I/Os 608. For example, the part cost estimate 604 increased from $0.99 on the core and memory configuration webpage 700 (FIG. 7B) to $2.20, the die area 606 increased from 3.27 millimeter square (mm²) on the core and memory configuration webpage 700 to 7.29 mm², and the total I/Os 608 increased from 0 on the core and memory configuration webpage 700 to 55. There is no change in the licensing cost 602 compared to that illustrated on the core and memory configuration webpage 700 (FIG. 7B).

Any change in configuration data on the peripheral configuration web page 800 is sent from the input device of the customer client device 1 to the parameter compute tool 196H of the customer client device 1. The parameter compute tool 196H of the customer client device 1 accesses the portion of the definition database 198H (FIG. 1F) from the memory device of the customer client device 1 to determine values of the one or more parameters based on the configuration data received within the peripheral configuration webpage 800. For example, the parameter compute tool 196H of the customer client device 1 identifies from configuration data received within the peripheral configuration webpage 800 that the SPI master is to be included within the AHB slot 2 (FIG. 8B) of the template 702. The parameter compute tool 196H of the customer client device 1 further identifies from the configuration data received that the other SPI master is to be included within the AHB slot 3 (FIG. 8B) of the template 702. The parameter compute tool 196H of the customer client device 1 further identifies from configuration data received that the ADC is to be included within the APB slot 1 that is coupled to the APB bus of the template 702 and identifies from the configuration data that the other ADC is to be included within the APB slot 2 that is coupled to the APB bus of the template 702.

Continuing with the example, each time configuration data is received from the input device of the customer client device 1 by the parameter compute tool 196H of the customer client device 1, the parameter compute tool 196H of the customer client device 1 obtains from the portion of the definition database 198H stored within the memory device of the customer client device 1 an amount of power consumed by a component, such as the SPI master, the other SPI master, the ADC, or the other ADC, for which the configuration data is received. Also, each time configuration data is received from the input device of the customer client device 1 by the parameter compute tool 196H of the customer client device 1, the parameter compute tool 196H sums or adds an amount of power consumed by the component for which the configuration data is received with one or more amount of power consumed by one or more other components of the SoC for which configuration data is received previously To illustrate, when configuration data to configure the other SPI master is received, the parameter compute tool 196H of the customer client device 1 adds the amount of power consumed by the other SPI master configured according to the configuration data with the amount of power consumed by the SPI master that is configured according to the configuration data to compute a total amount of power consumed by the SoC. As another illustration, when configuration data to configure the other ADC is received, the parameter compute tool 196H of the customer client device 1 adds the amount of power consumed by the other ADC configured according to the configuration data with the amount of power consumed by the ADC configured according to the configuration data, the amount of power consumed by the other SPI master configured according to the configuration data, and the amount of power consumed by the SPI master that is configured according to the configuration data to compute a total amount of power consumed by the SoC.

Continuing with the example, each time the total amount of power is calculated, the parameter compute tool 196H of the customer client device 1 applies the portion of the performance rule set stored within the memory device of the customer client device 1 to determine whether the total amount of power exceeds the predetermined amount of power for the SoC. The determination that the total amount of power exceeds the predetermined amount of power is provided from the parameter compute tool 196H of the customer client device 1 to the feedback tool 196I (FIG. 1F) of the customer client device 1. The total amount of power is sent from the parameter compute tool 196H and the feedback indicating that the total amount of power exceeds the predetermined amount of power is sent from the feedback tool 196I to the GPU of the customer client device 1. The GPU of the customer client device 1 displays the total amount of power expected to be consumed by the SoC within the parameter display field 714 on the peripheral configuration webpage 800 and displays the message that the total amount of power exceeds the predetermined amount of power on the peripheral configuration webpage 800.

As another example, in the same manner as that described above in the preceding example, the parameter compute tool 196H of the customer client device 1 identifies from configuration data received on the peripheral configuration webpage 800 that the SPI masters are to be included or located within the AHB slots 2 and 3. Moreover, the parameter compute tool 196H of the customer client device 1 identifies from the configuration data that ADCs are to be included or located within the APB slots 1 and 2. Continuing with the example, each time configuration data is received from the input device of the customer client device 1 by the parameter compute tool 196H of the customer client device 1, the parameter compute tool 196H obtains, from the portion of the definition database 198H stored within the memory device of the customer client device 1, an amount of licensing cost for licensing a design of a component, such as the SPI master, the other SPI master, the ADC, or the other ADC, for which the configuration data is received.

Also, each time configuration data is received from the input device of the customer client device 1 by the parameter compute tool 196H of the customer client device 1, the parameter compute tool 196H sums or adds an amount of licensing costs for licensing the design of a component for which configuration data is received with one or more amounts of licensing costs of one or more designs of one or more other components of the SoC for which configuration data is previously received. To illustrate, when configuration data to configure the other SPI master is received, the parameter compute tool 196H of the customer client device 1 adds the amount of licensing cost for licensing a design of the other SPI master configured according to the configuration data with the amount of licensing cost for licensing the design of the SPI master that is configured according to the configuration data received to compute a total amount of licensing cost for licensing the SoC to the customer 1 via the customer account 1. As another illustration, when configuration data to configure the other ADC is received, the parameter compute tool 196H of the customer client device 1 adds the amount of licensing cost for licensing a design of the other ADC configured according to the configuration data with the amount of licensing cost for licensing a design of the ADC configured according to the configuration data, the amount of licensing cost for licensing the design of the other SPI master configured according to the configuration data, and the amount of licensing cost for licensing the design of the SPI master that is configured according to the configuration data to compute a total amount of licensing cost for licensing the design of the SoC. Each time the total amount of licensing cost is calculated, the parameter compute tool 196H of the customer client device 1 sends the total amount of licensing cost to the GPU of the customer client device 1 via the customer account 1 for display of the total amount of licensing cost 602 within the parameter display field 714 on the peripheral configuration webpage 800.

As yet another example, the parameter compute tool 196H of the customer client device 1 identifies from configuration data received on the peripheral component webpage 800 that the SPI masters are to be included within the AHB slots 2 and 3 and that ADCs are to be included or located within the APB slots 1 and 2. Each time configuration data is received from the input device of the customer client device 1 by the parameter computer tool 196H of the customer client device 1, the parameter compute tool 196H obtains from the portion of the definition database 198H of the customer client device 1 an amount of part cost estimate for providing, such as fabricating or supplying, a component, such as the SPI master, the other SPI master, the ADC, or the other ADC, for which the configuration data is received.

Also, each time configuration data is received from the input device of the customer client device 1 by the parameter computer tool 196H of the customer client device 1, the parameter compute tool 196H sums or adds an amount of part cost estimate for providing the component for which the configuration data is received with one or more amounts of part cost estimates for providing one or more other components of the SoC for which configuration data is previously received. To illustrate, when configuration data to configure the other SPI master is received on the peripheral component webpage 800, the parameter compute tool 196H of the customer client device 1 adds the amount of part cost estimate for providing the other SPI master configured according to the configuration data with the amount of part cost estimate for providing the SPI master that is configured according to the configuration data to compute a total amount of part cost estimate for providing the SoC to the customer 1 via the customer account 1. As another illustration, when configuration data to configure the other ADC is received, the parameter compute tool 196H of the customer client device 1 adds the amount of part cost estimate for providing the other ADC configured according to the configuration data with the amount of part cost estimate for providing the ADC configured according to the configuration data, the amount of part cost estimate for providing the other SPI master configured according to the configuration data, and the amount of part cost estimate for providing the design of the SPI master that is configured according to the configuration data to compute a total amount of part cost estimate of the SoC. Each time the total amount of part cost estimate of the SoC is calculated, the parameter compute tool 196H of the customer client device 1 sends the total amount of part cost estimate to the GPU of the customer client device 1 via the customer account 1 for display of the total amount of part cost estimate 604 within the parameter display field 714 on the peripheral configuration webpage 800.

As another example, the parameter compute tool 196H of the customer client device 1 identifies from configuration data received on the peripheral component webpage 800 that the SPI masters are to be included within the AHB slots 2 and 3 and that ADCs are to be included or located within the APB slots 1 and 2. Each time configuration data is received from the input device of the customer client device 1 by the parameter compute tool 196H of the customer client device 1, the parameter compute tool 196H obtains from the portion of the definition database 198H of the customer client device 1 an amount of die area, on a wafer, that will be consumed by a component, such as the SPI master, the other SPI master, the ADC, or the other ADC, for which the configuration data is received.

Also, each time configuration data is received from the input device of the customer client device 1 by the parameter compute tool 196H of the customer client device 1, the parameter compute tool 196H sums or adds an amount of die area, on a wafer, that will be consumed by the component for which the configuration data is received with one or more amounts of die areas, on the wafer, that will be consumed by one or more other components of the SoC for which configuration data is previously received. To illustrate, when configuration data for configuring the other SPI master is received on the peripheral component webpage 800 from the input device of the customer client device 1, the parameter compute tool 196H of the customer client device 1 adds the amount of die area that will be consumed, on a semiconductor wafer, by the other SPI master configured according to the configuration data with the amount of die area that will be consumed, on the semiconductor wafer, by the SPI master that is configured according to the configuration data previously received on the peripheral component webpage 800 to compute a total amount of die area that will be consumed by the SoC to the customer 1 via the customer account 1. As another illustration, when configuration data to configure the other ADC is received from the input device of the customer client device 1, the parameter compute tool 196H of the customer client device 1 adds the amount of die area, on a wafer, that will be consumed by the other ADC configured according to the configuration data with the amount of amount of die area, on the wafer, that will be consumed by the ADC configured according to the configuration data previously received on the peripheral component webpage 800, the amount of amount of die area, on the wafer, that will be consumed by the other SPI master configured according to the configuration data previously received on the peripheral component webpage 800, and the amount of amount of die area, on the wafer, that will be consumed by the SPI master that is configured according to the configuration data previously received on the peripheral component webpage 800 to compute a total amount of amount of die area, on the wafer, that will be consumed by the SoC. Each time the total amount of die area is calculated, the parameter compute tool 196H of the customer client device 1 sends the total amount of die area to the GPU of the customer client device 1 via the customer account 1 for display of the total amount of die area 606 within the parameter display field 714 on the peripheral configuration webpage 800.

Continuing with the example, each time the total amount of die area is calculated, the parameter compute tool 196H of the customer client device 1 applies the portion of the performance rule set stored within the memory device of the customer client device 1 to determine whether the total amount of die area exceeds the predetermined amount of die area for the SoC. The determination that the total amount of die area exceeds the predetermined amount of die area is provided from the parameter compute tool 196H of the customer client device 1 to the feedback tool 196I of the customer client device 1. The total amount of die area is sent from the parameter compute tool 196H and the feedback indicating that the total amount of die area exceeds the predetermined amount of die area is sent from the feedback tool 196I of the customer client device 1 to the GPU of the customer client device 1. The GPU of the customer client device 1 displays the total amount of die area 606 expected to be used by the SoC within the parameter display field 714 on the peripheral configuration webpage 800 and displays the message that the total amount of die area exceeds the predetermined amount of die area on the peripheral configuration webpage 800.

As yet another example, the parameter compute tool 196H of the customer client device 1 identifies from configuration data received on the peripheral configuration webpage 800 that the SPI masters are to be included within the AHB slots 2 and 3 and that ADCs are to be included or located within the APB slots 1 and 2. Each time configuration data is received on the peripheral configuration webpage 800 from the input device of the customer client device 1, the parameter compute tool 196H of the customer client device 1 obtains from the portion of the definition database 198H stored within the memory device of the customer client device 1 a number of I/Os that will be coupled to a component, such as the SPI master, the other SPI master, the ADC, or the other ADC, for which the configuration data is received.

Also, each time configuration data is received from the input device of the customer client device 1 on the peripheral configuration webpage 800, the parameter compute tool 196H of the customer client device 1 sums or adds a number of I/Os that will be coupled to the component for which the configuration data is received with one or more numbers of I/Os that will be coupled to one or more other components of the SoC for which configuration data is previously received. To illustrate, when configuration data to configure the other SPI master is received, the parameter compute tool 196H of the customer client device 1 adds the number of I/Os that will be coupled to the other SPI master configured according to the configuration data with the number of I/Os that will be coupled to the SPI master that is configured according to the configuration data previously received to compute a total number of I/Os of the SoC. As another illustration, when configuration data to configure the other ADC is received, the parameter compute tool 196H of the customer client device 1 adds the amount of I/Os that will be coupled to the other ADC configured according to the configuration data with the amount of I/Os that will be coupled to the ADC configured according to the configuration data previously received on the peripheral configuration webpage 800, the amount of I/Os that will be coupled to the other SPI master configured according to the configuration data previously received on the peripheral configuration webpage 800, and the amount of I/Os that will be coupled to the SPI master that is configured according to the configuration data previously received on the peripheral configuration webpage 800 to compute a total number of I/Os of the SoC. Each time the total number of I/Os is calculated, the parameter compute tool 196H of the customer client device 1 sends the total number of I/Os to the GPU of the customer client device 1 via the customer account 1 for display of the total number of I/Os 608 within the parameter display field 714 on the peripheral configuration webpage 800.

Continuing with the example, each time the total I/Os is calculated, the parameter compute tool 196H of the customer client device 1 applies the portion of the performance rule set stored within the memory device of the customer client device 1 to determine whether the total I/Os exceeds the predetermined number of I/Os of a package of a wafer die in which the SoC is to be implemented. The determination that the total I/Os exceeds the predetermined number of I/Os is provided from the parameter compute tool 196H of the customer client device 1 to the feedback tool 196I of the customer client device 1. The total I/Os are sent from the parameter compute tool 196H of the customer client device 1 and the feedback indicating that the total I/Os exceeds the predetermined number of I/Os is sent from the feedback tool 196I of the customer client device 1 to the GPU of the customer client device 1. The GPU of the customer client device 1 displays the total I/Os 608 of the SoC within the parameter display field 714 on the peripheral configuration webpage 800 and displays the message that the total I/Os 608 exceeds the predetermined number of I/Os on the peripheral configuration webpage 800.

The third portion of the webpage 800 includes a constraint 880 that indicates the maximum number of peripherals that can be added to the APB bus of the template 702. The constraint 880 represents constraint data that is stored in the portion, of the definition database 198H (FIG. 1F), stored within the memory device of the customer client device 1. The constraint 880 provides a definition or a limit for configuring the APB bus of the template 702.

In one embodiment, the constraint 880 is displayed on the display screen 204 of the customer client device 1 when the constraint is met. For example, when the customer 1 adds a $33^{rd}$ row to the third portion of the web page 800, an indication of the addition of the $33^{rd}$ row is sent from the input device of the customer client device 1 to the parameter compute tool 196H of the customer client device 1. The parameter compute tool 196H of the customer client device 1 accesses the portion of the definition database 198H from the memory device of the customer client device 1 to obtain the portion of the performance rule set, such as a definition of the APB bus within the template 702, to determine that the $33^{rd}$ row cannot be added to the third portion of the webpage 800 and provides the determination to the feedback tool 196H of the customer client device 1. The feedback tool 196H of the customer client device 1 sends feedback, which is information or a notification, indicating that the customer 1 cannot add the $33^{rd}$ row via the customer account 1. The feedback indicating that the customer 1 cannot add the $33^{rd}$ row is sent from the feedback tool 196H of the customer client device 1 to the GPU of the customer client device 1. Upon receiving the feedback indicating that the customer 1 cannot add the $33^{rd}$ row, the GPU of the customer client device 1 displays the feedback on the webpage 800.

The peripheral configuration webpage 800 further includes a save button, a previous button, and a next button. When the save button on the peripheral configuration webpage 800 is selected by the customer 1 via the input device of the customer client device 1, configuration data received within the peripheral configuration webpage 800 is sent from the processor of the customer client device 1 via the computer network 102 and the customer account 1 to the peripheral configuration tool 196C (FIG. 1F) of the DES 104. The peripheral configuration tool 196C of the DES 104 stores the configuration data received within the peripheral configuration webpage 800 in the peripheral configuration database 198C (FIG. 1F) of the DES 104 and associates, such as links or establishes a one-to-one correspondence with, the customer account 1.

Moreover, when the next button on the peripheral configuration webpage 800 is selected by the customer 1 via the input device of the customer client device 1, an indication of the selection is sent from the processor of the customer client device 1 via the computer network 102 and the customer account 1 to the peripheral configuration tool 196C of the DES 104. The peripheral configuration tool 196C of the DES 104 provides the indication of the selection to the I/O configuration tool 196E (FIG. 1F) of the DES 104 via the bus 197 (FIG. 1F). In response to receiving the indication of the selection of the next button displayed on the peripheral configuration webpage 800, the I/O configuration tool 196E of the DES 104 generates or accesses webpage data for displaying the I/O configuration webpage 900, which is described below with reference to FIGS. 9A, 9B, 9C, and 9D. The webpage data for displaying the I/O configuration webpage 900 is accessed from the I/O configuration database 198E of the DES 104.

In response to receiving the indication of the selection of the next button on the peripheral configuration webpage 800 from the customer client device 1 via the computer network 102 and the customer account 1, the one or more servers of the DES 104 send a copy of the I/O configuration tool 196E and a portion of the I/O configuration database 198E (FIG. 1F) via the computer network 102 and the customer account 1 to the customer client device 1. For example, when the indication of the selection of the next button on the peripheral configuration webpage 800 is received, the one or more servers of the DES 104 apply the communication protocol to generate one or more packets including the copy of the I/O configuration tool 196E, and the portion of the I/O configuration database 198E, and send the one or more packets via the computer network 102 to the processor of the customer client device 1. The processor of the customer client device 1 applies the communication protocol to the one or more packets to extract the copy of the I/O configuration tool 196E, and the portion of the I/O configuration database 198E, and stores the copy of the I/O configuration tool 196E and the portion of the I/O configuration database 198E in the memory device of the customer client device 1 for execution by the processor of the customer client device 1.

The portion of the I/O configuration database 198E has the webpage data for generating the I/O configuration webpage 900. The portion of the I/O configuration database 198E correspond to the template 702 and not to another template. For example, the portion of the I/O configuration database 198E includes information regarding components of the template 702 and fields for configuring the components of the template 702. Examples of the information are provided on the I/O configuration webpage 900. As another example, if the customer 1 would have chosen the other template 2 instead of the template 702, a portion of the I/O configuration database 198E specific to the template 2 would have been transferred to the customer client device 1 for configuring the template 2 instead of the portion of the I/O configuration database 198E for configuring the template 702.

The portion of the I/O configuration database 198E does not include information for configuring components that cannot be a part of the template 702. For example, if a particular number of I/O pins cannot be used with a component coupled to the AHB-Lite bus of the template 702, the portion of the I/O configuration database 198E does not include that number of I/O pins for configuring the component.

Figure 9A:
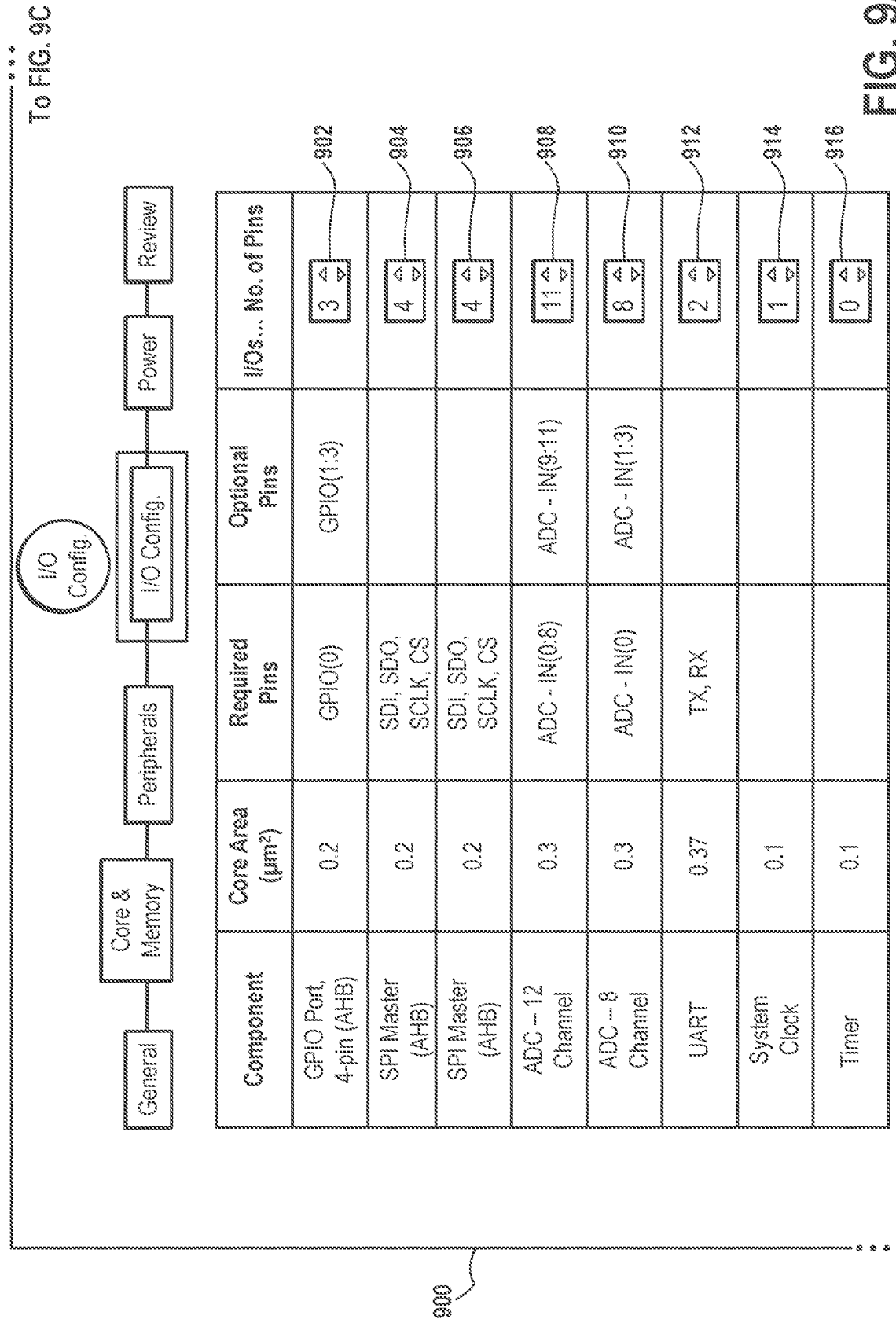
FIG. 9A is a diagram of an embodiment of a first portion of an input/output (I/O) configuration webpage that is used to receive configuration data for configuring I/Os of the SoC.

FIG. 9A is a diagram of an embodiment of a first portion of the I/O configuration webpage 900 that is used to receive configuration data for configuring the I/Os, such as the I/O pins, of the SoC. The I/O configuration tool 196E (FIG. 1F) of the DES 104 accesses the webpage data for displaying the I/O configuration webpage 900 from the I/O configuration database 198E (FIG. 1F) of the DES 104 and sends the webpage data via the computer network 102 and the customer account 1 to the customer client device 1. In response to receiving the webpage data for displaying the I/O configuration webpage 900, the GPU of the customer client device 1 displays the I/O configuration webpage 900 on the display screen 204 (FIG. 6) of the customer client device 1.

The I/O configuration webpage 900 includes fields for receiving configuration data, such as the configuration data 140 (FIG. 1B), the additional configuration data 142 (FIG. 1B), or the further configuration data, to configure a number of I/Os of the SoC. For example, a field 902 includes configuration data for configuring a number of I/O pins, such as three or four I/O pins, that are to be coupled to the GPIO port that is to be coupled to the AHB-Lite bus of the template 702 (FIG. 8A). In a row in which the field 902 is provided, there is description that I/O pins 1 through 3 for the GPIO port are optional and an I/O pin 0 for the GPIO port is required. Moreover, in the row, a description of the GPIO port as being a 4-pin AHB port is provided and an amount of core area, such as a die area on a wafer, that is consumed by the GPIO port is provided. As another example, a field 904 includes configuration data for configuring a number of I/O pins, such as 4 I/O pins, that are to be coupled to the SPI master that is to be coupled to the AHB-Lite bus of the template 702. In a row in which the field 904 is provided, there is description that all of the 4 I/O pins for the SPI master are required. Moreover, in the row, a description of the SPI master as being an SPI master for AHB, e.g., the AHB-Lite bus, is provided and an amount of core area, such as a die area on the wafer, that is consumed by the SPI master is provided.

As yet another example, a field 906 includes configuration data for configuring a number of I/O pins, such as 4 I/O pins, that are to be coupled to the other SPI master that is to be coupled to the AHB-Lite bus of the template 702. In a row in which the field 906 is provided, there is description that all of the 4 I/O pins for the other SPI master are required. Moreover, in the row, a description of the other SPI master as being an SPI master for AHB, e.g., the AHB-Lite bus, is provided and an amount of core area, such as a die area on the wafer, that is consumed by the other SPI master is provided.

As another example, a field 908 includes configuration data for configuring a number of I/O pins, such as 11 or 12 I/O pins, that are to be coupled to the 12-channel ADC of the template 702. In a row in which the field 908 is provided, there is description that I/O pins 9 through 11 for the 12-channel ADC are optional and the I/O pins 0 through 8 are required. Moreover, in the row, an amount of core area, such as a die area on the wafer, that is consumed by the 12-channel ADC is provided. As yet another example, a field 910 includes configuration data for configuring a number of I/O pins, such as 8 I/O pins, that are to be coupled to the 8-channel ADC of the template 702. In a row in which the field 910 is provided, there is description that I/O pins 1 through 3 for the 8-channel ADC are optional and an I/O pin 0 for the 8-channel ADC is required. Moreover, in the row, an amount of core area, such as a die area on the wafer, that is consumed by the 8-channel ADC is provided.

As yet another example, a field 912 includes configuration data for configuring a number of I/O pins, such as two I/O pins, that are to be coupled to the UART of the template 702. In a row in which the field 912 is provided, there is description that the two I/O pins for the UART are required. Moreover, in the row, an amount of core area, such as a die area on the wafer, that is consumed by the UART is provided. As another example, a field 914 includes configuration data for configuring a number of I/O pins, such as 1 I/O pin, that are to be coupled to the system clock of the template 702. As yet another example, a field 916 includes configuration data for configuring a number of I/O pins, such as 1 I/O pin, that are to be coupled to the timer of the template 702.

FIG. 9B is a diagram of an embodiment of a second portion of the I/O configuration webpage 900. The second portion of the I/O configuration webpage 900 includes fields for receiving configuration data, such as the configuration data 140 (FIG. 1B), the additional configuration data 142 (FIG. 1B), or the further configuration data, to configure a number of I/Os of the SoC. For example, a field 918 includes configuration data for configuring a number of I/O pins, such as one I/O pin, that are to be coupled to the 10-bit DAC of the template 702 (FIG. 8A). In a row in which the field 918 is provided, a description of the DAC as being the 10-bit DAC is provided and an amount of core area, such as a die area on the wafer, that is consumed by the 10-bit DAC is provided.

As another example, a field 920 includes configuration data for configuring a number of I/O pins, such as two I/O pins, that are to be coupled to the I2C master of the template 702 (FIG. 8A). In a row in which the field 920 is provided, an amount of core area, such as a die area on the wafer, that is consumed by the I2C master is provided. As yet another example, a field 922 includes configuration data for configuring a number of I/O pins, such as zero I/O pins, that are to be coupled to the internal reference voltage of the template 702 (FIG. 8A). In a row in which the field 922 is provided, an amount of core area, such as a die area on the wafer, that is consumed by the internal reference voltage is provided.

As another example, a field 924 includes configuration data for configuring a number of I/O pins, such as four I/O pins, that are to be coupled to the GPIO port. The GPIO port is to be coupled to the APB bus of the template 702 (FIG. 8A). In a row in which the field 924 is provided, a description of the GPIO port as being a 4-pin APB port is provided and an amount of core area, such as a die area on the wafer, that is consumed by the GPIO port is provided.

As yet another example, a field 926 includes configuration data for configuring a number of I/O pins, such as zero I/O pins, that are to be coupled to the RC oscillator of the template 702 (FIG. 8A). In a row in which the field 926 is provided, an amount of core area, such as a die area on the wafer, that is consumed by the RC oscillator is provided. As another example, a field 928 includes configuration data for configuring a number of I/O pins, such as zero I/O pins, that are to be coupled to the crystal oscillator of the template 702 (FIG. 8A). In a row in which the field 928 is provided, an amount of core area, such as a die area on the wafer, that is consumed by the crystal oscillator is provided.

As another example, a field 930 includes configuration data for configuring a number of I/O pins, such as fifteen I/O pins, that are to be coupled to the Cortex M3™ core of the template 702 (FIG. 8A). In a row in which the field 930 is provided, an abbreviation for one or more of the I/O pins, such as XI, XO, RESET, WKUP, JTAG-CLK, JTAG-TMS, JTAG-TDI, JTAG-TDO, SWDB_SCLK, SWDG-SIO, and NMI, is provided. Also, in the row, an amount of core area, such as a die area on the wafer, that is consumed by the Cortex M3™ core is provided and a description is provided. The description includes that the Cortex M3™ core is a Cortex M3™ core that can handle at most 32 interrupts from the peripherals of the SoC or from another device, such as another SoC or a computer, that is coupled to the SoC. As another example, a field 932 includes configuration data for configuring a number of I/O pins, such as zero I/O pins, that are to be coupled to the SRAM of the template 702 (FIG. 8A). In a row in which the field 932 is provided, a description that the SRAM is a 16 kB SRAM is provided and an amount of core area, such as a die area on the wafer, that is consumed by the SRAM is provided.

Figure 9C:
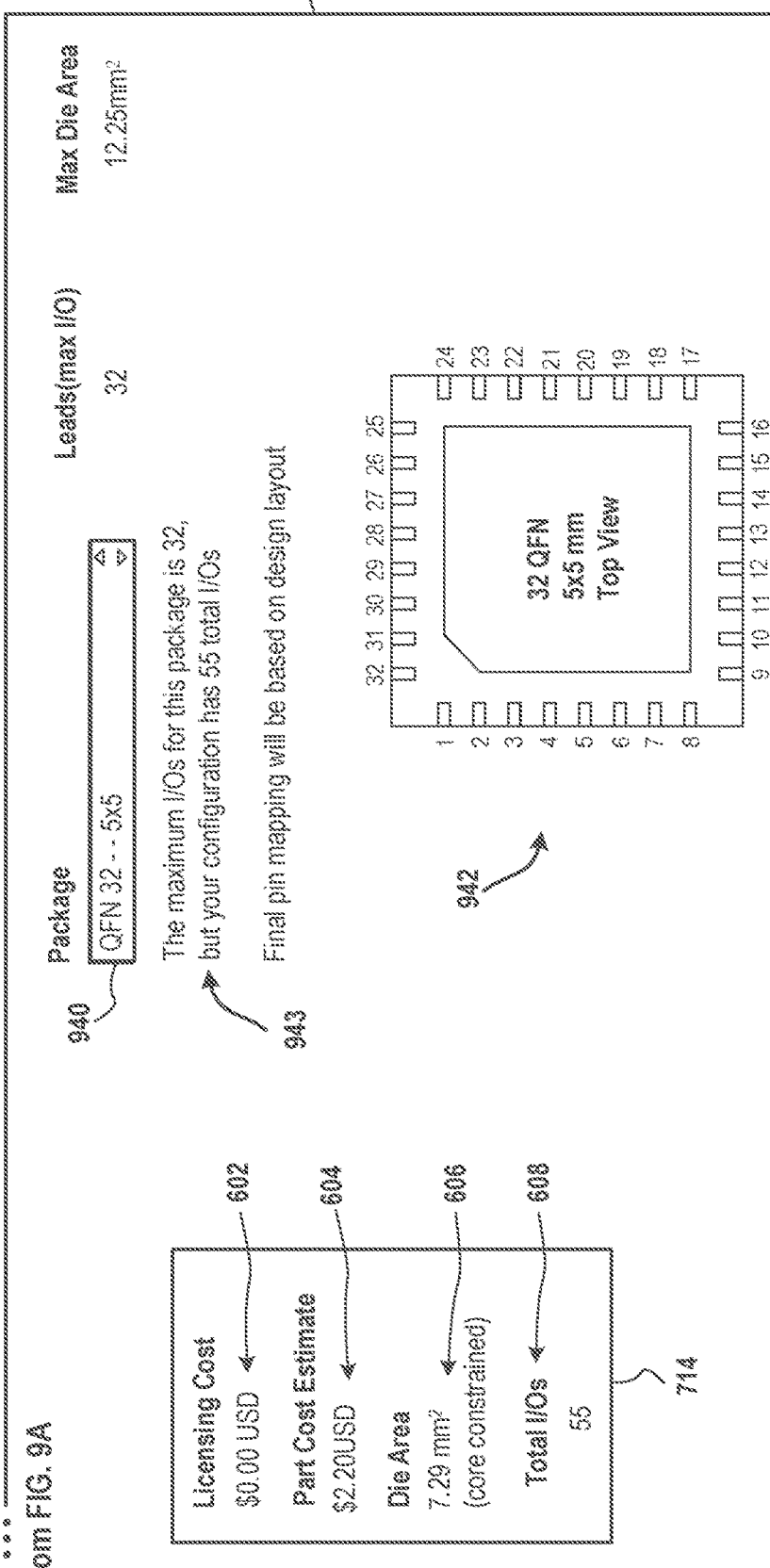
FIG. 9C is a diagram of an embodiment of a third portion of the I/O configuration webpage.

FIG. 9C is a diagram of an embodiment of a third portion of the I/O configuration webpage 900. The third portion of the I/O configuration webpage 900 includes fields for receiving configuration data, such as the configuration data 140 (FIG. 1B), the additional configuration data 142 (FIG. 1B), or the further configuration data, to configure a package of an integrated circuit chip that includes the SoC. For example, a field 940 includes configuration data for configuring the package of a wafer die to be a QFN 32—5×5 package, where 32 is a total number of I/O pins of the package and 5×5 indicates a size of the package. In a row in which the field 940 is provided, there is a number of the I/O pins, such as 32 I/O pins, of the package and a maximum die area that is consumed by the package on the wafer. An example of the maximum die area consumed by the QFN 32 package is 12.25 millimeter$^2$ (mm$^2$). The integrated circuit chip is sometimes referred to herein as a wafer die.

Each time the customer 1 uses the input device of the customer client device 1 to change or modify a number of I/O pins for a component, such as one of the peripherals, the CPU, or the memory, of the SoC in one of the fields 902-932 (FIGS. 9A-9B) displayed on the I/O configuration webpage 900 to provide configuration data, the configuration data is sent, in real-time, via the I/O configuration webpage 900 and the customer account 1 to the I/O configuration tool 196E of the customer client device 1. As an example, the customer 1 uses the input device of the customer client device 1 to change or increase the number of I/O pins within the field 902 (FIG. 9A) from 4 to 5. The changed number of I/O pins within the field 902 is sent from the input device of the customer client device 1 to the I/O configuration tool 196E of the customer client device 1. As another example, the customer 1 uses the input device of the customer client device 1 to change or decrease the number of I/O pins within the field 908 from 12 to 11. The changed number of I/O pins within the field 908 is sent from the input device of the customer client device 1 to the I/O configuration tool 196E of the customer client device 1.

The I/O configuration tool 196E of the customer client device 1 receives the configuration data, such as a changed number of I/O pins, from the I/O configuration webpage 900 and provides the configuration data to the parameter compute tool 196H of the customer client device 1. The parameter compute tool 196H of the customer client device 1 sums or adds a number of I/Os that will be coupled to the component of the SoC for which the configuration data is received from the I/O configuration tool 196E of the customer client device 1 with one or more numbers of I/Os that will be coupled to one or more other components of the SoC for which configuration data is previously received from the I/O configuration tool 196E of the customer client device 1. To illustrate, when configuration data to configure the number of I/Os that will be coupled to the 12-channel ADC is received from the I/O configuration tool 196E of the customer client device 1, the parameter compute tool 196H of the customer client device 1 adds the number of I/Os that will be coupled to the 12-channel ADC with the number of I/Os that will be coupled to the GPIO port that is configured according to configuration data previously received on the I/O configuration webpage 900 to compute a total number of I/Os of the SoC. Each time the total number of I/Os is calculated, the parameter compute tool 196H sends the total number of I/Os for providing to the GPU of the customer client device 1 for display of the total number of I/Os within the parameter display field 714 on the I/O configuration webpage 900.

Continuing further with illustration, each time configuration data for configuring the package is selected via the field 940 and is received in real-time by the I/O configuration tool 196E of the customer client device 1, the I/O configuration tool 196E accesses a diagram of a top view of the package from the portion of the I/O configuration database 198E (FIG. 1F) stored within the memory device of the customer client device 1. The diagram is sent from the I/O configuration tool 196E of the customer client device 1 to the GPU of the customer client device 1 for display of the diagram on the I/O configuration webpage 900. An example of the diagram is a diagram 942 of the package that is selected via the field 940.

Continuing with the illustration, each time the total I/Os is calculated, the parameter compute tool 196H of the customer client device 1 applies the portion of the performance rule set stored within the memory device of the customer client device 1 to determine whether the total I/Os exceeds a number of the I/Os for the package that is selected in the field 940. The number of I/Os for the package selected via the field 940 is an example of the predetermined number of I/Os. The determination that the total I/Os exceeds the predetermined number of I/Os is provided from the parameter compute tool 196H of the customer client device 1 to the feedback tool 196I (FIG. 1F) of the customer client device 1. The total I/Os are sent from the parameter compute tool 196H of the customer client device 1 and the feedback indicating that the total I/Os exceeds the predetermined number of I/Os is sent from the feedback tool 196I of the customer client device 1 to the GPU of the customer client device 1. The GPU of the customer client device 1 displays the total I/Os 608 of the SoC within the parameter display field 714 on the I/O configuration webpage 900 and displays the message that the total I/Os 608 exceeds the predetermined number of I/Os on the I/O configuration webpage 900. An example of the message is a message 943, which describes that "The maximum I/Os for this package is 32, but your configuration has 55 total I/Os". Moreover, the message includes a field 936 in which another package QFN 56—7×7 is recommended. The message further includes a maximum number of leads, such as I/O pins, of the other package QFN 56—7×7 and a maximum die area consumed by the other package QFN 56—7×7 on a wafer. In addition, the message includes a diagram 938 (FIG. 9D) illustrating a top view of the other package QFN 56—7×7.

FIG. 9D is a diagram of a fourth portion, which is the remaining portion of the I/O configuration webpage 900. The I/O configuration webpage includes the diagram 938. The I/O configuration webpage 900 further includes a save button, a previous button, and a next button. When the save button on the I/O configuration webpage 900 is selected by the customer 1 via the input device of the customer client device 1, configuration data received on the I/O configuration webpage 900 is sent from the processor of the customer client device 1 via the computer network 102 and the customer account 1 to the I/O configuration tool 196E (FIG. 1F) of the DES 104. The I/O configuration tool 196E of the DES 104 stores the configuration data received within the I/O configuration webpage 900 in the I/O configuration database 198E of the DES 104 and associates, such as links or establishes a one-to-one correspondence between, the configuration data and the customer account 1.

Moreover, when the next button on the I/O configuration webpage 900 is selected by the customer 1 via the input device of the customer client device 1, an indication of the selection is sent from the processor of the customer client device 1 via the computer network 102 and the customer account 1 to the I/O configuration tool 196E (FIG. 1F) of the DES 104. In response to receiving the indication of the selection of the next button displayed I/O configuration webpage 900, the I/O configuration tool 196E of the DES 104 provides the indication of the selection via the bus 197 (FIG. 1F) to the power configuration tool 196F (FIG. 1F) of the DES 104. Upon receiving the indication of the selection, the power configuration tool 196F of the DES 104 generates or accesses webpage data for displaying a power configuration webpage 1000, which is described below with reference to FIGS. 10A, 10B, and 10C. The webpage data for displaying the power configuration webpage 1000 is accessed from the power configuration database 198F of the DES 104.

In response to receiving the indication of the selection of the next button on the I/O configuration webpage 900 from the customer client device 1 via the computer network 102 and the customer account 1, the one or more servers of the DES 104 send a copy of the power configuration tool 196F and a portion of the power configuration database 198F via the computer network 102 and the customer account 1 to the customer client device 1. For example, when the indication of the selection of the next button on the I/O configuration webpage 900 is received, the one or more servers of the DES 104 apply the communication protocol to generate one or more packets including the copy of the power configuration tool 196F, and the portion of the power configuration database 198F, and send the one or more packets via the computer network 102 to the processor of the customer client device 1. The processor of the customer client device 1 applies the communication protocol to the one or more packets to extract the copy of the power configuration tool 196F, and the portion of the power configuration database 198F, and stores the copy of the power configuration tool 196F and the portion of the power configuration database 198F in the memory device of the customer client device 1 for execution by the processor of the customer client device 1.

The portion of the power configuration database 198F has the webpage data for generating the power configuration webpage 1000. The portion of the power configuration database 198F correspond to the template 702 and not to another template. For example, the portion of the power configuration database 198F includes information regarding components of the template 702 and fields for configuring the components of the template 702. Examples of the information are provided on the power configuration webpage 1000. The portion of the power configuration database 198F does not include information for configuring components that cannot be a part of the template 702.

Figure 10A:
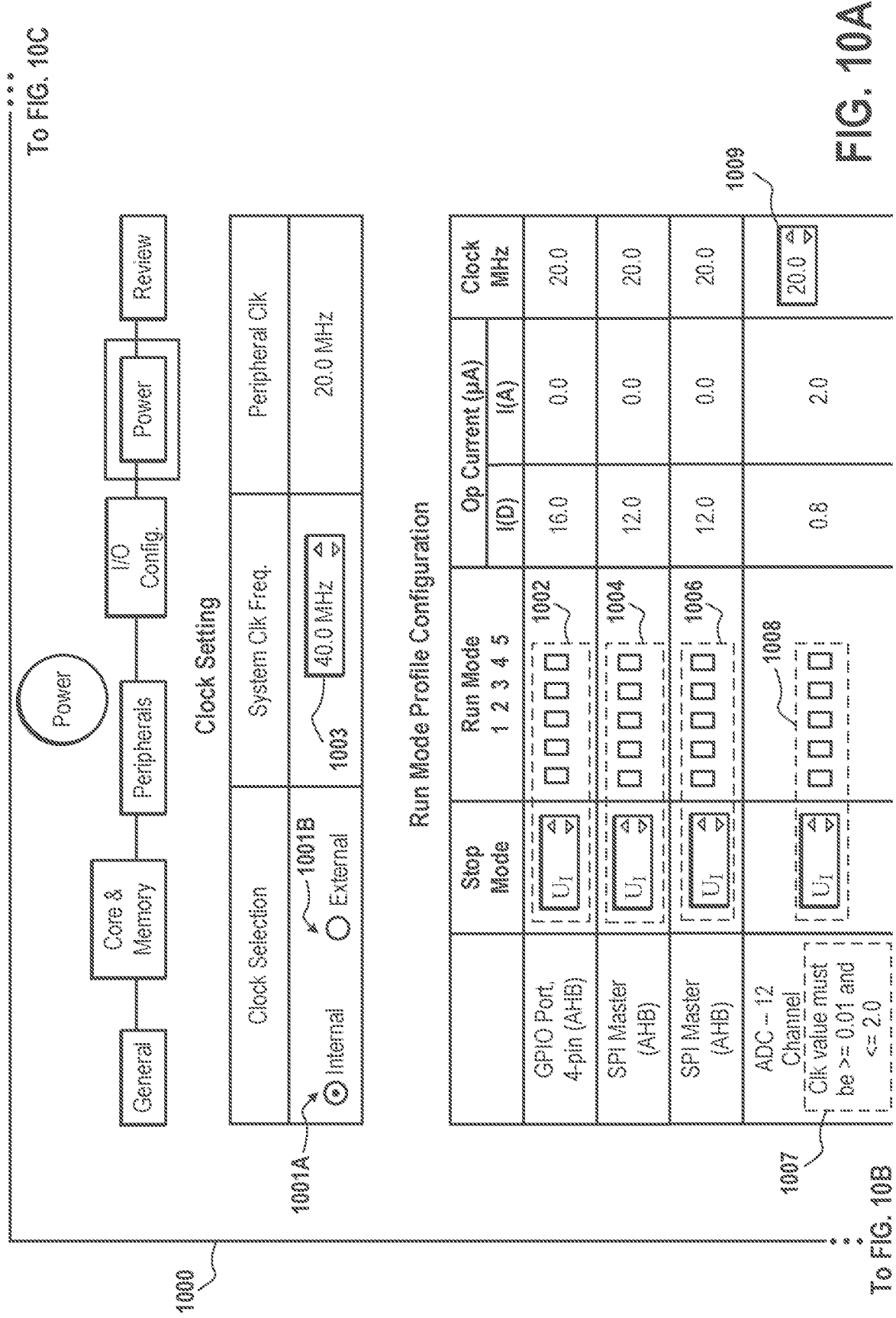
FIG. 10A is a diagram of an embodiment of a first portion of a power configuration webpage that is used to receive configuration data for configuring run modes and stop modes of components of the SoC.

FIG. 10A is a diagram of an embodiment of a first portion of the power configuration webpage 1000 that is used to receive configuration data for configuring run modes, stop modes, and clock sources for operating the components of the SoC. The power configuration tool 196F (FIG. 1F) of the DES 104 accesses the webpage data for displaying the power configuration webpage 1000 from the power configuration database 198F (FIG. 1F) of the DES 104 and sends the webpage data via the computer network 102 and the customer account 1 to the customer client device 1. In response to receiving the webpage data for displaying the power configuration webpage 1000, the GPU of the customer client device 1 displays the power configuration webpage 1000 on the display screen 204 (FIG. 6) of the customer client device 1.

The power configuration webpage 1000 includes fields for receiving configuration data, such as the configuration data 140 (FIG. 1B), the additional configuration data 142 (FIG. 1B), or the further configuration data, to configure the run modes, stop modes, and clock sources for operating the components of the SoC. For example, a field 1001A includes configuration data for configuring the SoC to receive a clock signal from the internal clock source and another field 1001B includes configuration data for configuring the SoC to receive a clock signal from the external clock source. For example, the customer 1 uses the input device of the customer client device 1 to select the field 1001A to configure the SoC to receive a clock signal from the internal clock source or to select the field 1001B to configure the SoC to receive a clock signal from the external clock source.

In a row that includes the fields 1001A and 1001B of the power configuration webpage 1000, a field 1003 includes configuration data for configuring a frequency of a clock source, such as the internal clock source or the external clock source, that will provide a clock signal to the CPU of the SoC. Moreover, in the row that includes the fields 1001A and 1001B of the power configuration webpage 1000, configuration data, such as a frequency of 20 megahertz (MHz) of the internal clock source or the external clock source that will provide a clock signal to the peripherals of the SoC, is described.

As another example, the power configuration webpage 1000 further includes multiple fields 1002 for receiving configuration data for configuring a level of power that is consumed by the GPIO port coupled to the AHB-Lite bus of the template 702 (FIG. 7A). To illustrate, the fields 1002 include a field that is selected by the customer 1 via the input device of the customer client device 1 (FIG. 1A) to indicate that the GPIO port operate in a stop mode. In a stop mode, a component of the SoC is disabled. The component is disabled when the component does not receive a power signal from a power source to disable operation of the component. For example, a switch between the power source and the component is turned off to cut off the power signal to the component to disable an operation of the component. The switch is another example of a component of the SoC.

The fields 1002 further include multiple fields, one of which is selected by the customer 1 via the input device of the customer client device 1 to select one of multiple run modes 1 through 5 for operation of the GPIO port. In a run mode, a component of the SoC is operational and is not disabled. For example, the switch between the power source and the component is turned on to provide the power signal to the component to enable the operation of the component.

As an example of the run modes, when the component is in the run mode 1, the component consumes a different amount, such as a higher or lower amount, of power than that consumed in the run mode 2. Similarly, when the component is in the run mode 2, the component consumes a different amount, such as a higher or lower amount, of power than that consumed in the run mode 3, and when the component is in the run mode 3, the component consumes a different amount, such as a higher or lower amount, of power than that consumed in the run mode 4. When the component is in the run mode 4, the component consumes a different amount, such as a higher or lower amount, of power than that consumed in the run mode 5. As another example of run modes, when the component is in the run mode 1, the component is operational for a different amount, such as a greater amount or a lower amount, of time during a predetermined number of clock cycles than when the component is in the run mode 2. An example of the predetermined number of clock cycles is one or more clock cycles of a clock signal received by the component from a clock source, internal or external to the SoC. Similarly, when the component is in the run mode 2, the component is operational for a different amount of time during the predetermined number of clock cycles than when the component is in the run mode 3 and when the component is in the run mode 3, the component is operational for a different amount of time during the predetermined number of clock cycles than when the component is in the run mode 4. When the component is in the run mode 4, the component is operational for a different amount of time during the predetermined number of clock cycles than when the component is in the run mode 5. As yet another example of the run modes, when the component is in the run mode n, the component is operational for a different percentage, such as a greater percentage or a lower percentage, of time during the predetermined number of clock cycles than when the component is in the run mode (n+m), where n is one and m is an integer equal to or greater than one.

As an example, a run mode, of the component, of a lower level, such as 1, than another run mode, such as 2, of the component consumes a greater amount of power than that consumed in the other run mode. To illustrate, when the component is in the run mode 4, the component is provided a clock signal that is being shared with another component, which is also operating in the run mode 4. When the component is in the run mode 5, the component receives a power signal from a power source to the SoC, but does not receive a clock signal for executing a function, such as sampling, that the component is capable of performing synchronous to the clock signal. As another illustration, when the component is in the run mode 1, a wake up of the component is faster than when the component is in the run mode 2. Similarly, when the component is in the run mode 2, a wake up of the component is faster than when the component is in the run mode 3 and when the component is in the run mode 3, a wake up of the component is faster than when the component is in the run mode 4. When the component is in the run mode 4, a wake up of the component is faster than when the component is in the run mode 5. A wake up can be performed by sending an interrupt signal to the component.

The customer 1 uses the input device of the customer client device 1 to select whether the GPIO port is to operate in the run mode or to operate in the stop mode. To elect the GPIO port for operation in the run mode, the customer 1 uses the input device of the customer client device 1 to select one of the run modes 1 through 5. In a row that includes the stop mode and the run modes of the GPIO port that is coupled to the AHB-Lite bus, an amount of operational current I(D) that is received or consumed by the GPIO port during operation of the GPIO port and an amount of operational current I(A) that is received or consumed by the GPIO port during operation of the GPIO port are provided. Also, in the row that includes the stop mode and the run modes of the GPIO port that is coupled to the AHB-Lite bus, a frequency of a clock signal that is received by the GPIO port from a clock source, internal or external to the SoC, is provided.

I(D) represents an amount of operational current that is received or consumed by a component of the SoC when the component is an analog component and I(A) represents an amount of operational current that is received or consumed by the component when the component is a digital component. A digital component, as an example, is a component that is capable of detecting digital or discrete values of voltage or power and an analog component, as an example, is a component that is capable of detecting analog or continuous values of voltage or power. To illustrate, the digital component supports or detects two levels of voltage, high and low, and does not detect any other levels of voltage. Comparatively, the analog component detects any voltage between a lower value and a high value, such as between 0 volts and 4 volts.

In the same manner in which the run modes and the stop mode of the GPIO port coupled to the AHB-Lite bus are configured, the power configuration webpage 1000 further includes multiple fields 1004 for receiving configuration data for configuring the run modes and the stop mode of the SPI master coupled to the AHB-Lite bus of the template 702. Also, in the same manner in which the row for the GPIO port coupled to the AHB-Lite bus includes the operational currents I(D), I(A), and a frequency of the clock signal supplied to the GPIO port, in a row that includes the fields 1004, operational currents I(D), I(A), and a frequency of a clock signal supplied by a clock source, internal or external to the SoC are provided for the SPI master.

Similarly, the power configuration webpage 1000 further includes multiple fields 1006 for receiving configuration data for configuring a level of power that is consumed by the other SPI master coupled to the AHB-Lite bus of the template 702. The fields 1006 for receiving a selection from the input device of the customer client device 1 to indicate one of run modes 1 through 5 of operation of the other SPI master coupled to the AHB-Lite bus or a stop mode of non-operation of the other SPI master are provided. Also, in a row that includes the fields 1006, operational currents I(D), I(A), and a frequency of a clock signal supplied by a clock source, internal or external to the SoC are provided for the other SPI master.

The power configuration webpage 1000 further includes multiple fields 1008 for receiving configuration data for configuring a level of power that is consumed by the 12-channel ADC of the template 702. The fields 1008 for receiving a selection from the input device of the customer client device 1 to indicate one of run modes 1 through 5 of operation of the 12-channel ADC or a stop mode of non-operation of the 12-channel ADC are provided. Also, in a row that includes the fields 1008, operational currents I(D) and I(A), and a frequency of a clock signal supplied by a clock source, internal or external to the SoC are provided for the 12-channel ADC. The frequency of the clock signal to be supplied to the 12-channel ADC is provided in a field 1009 on the power configuration webpage 1000. The customer 1 uses the input device of the customer client device 1 to change a value of the frequency within the field 1009 for changing a frequency of the clock signal that is provided to the 12-channel ADC.

In an embodiment, instead of five run modes, any other number, such as three or four, run modes is used.

Figure 10B:
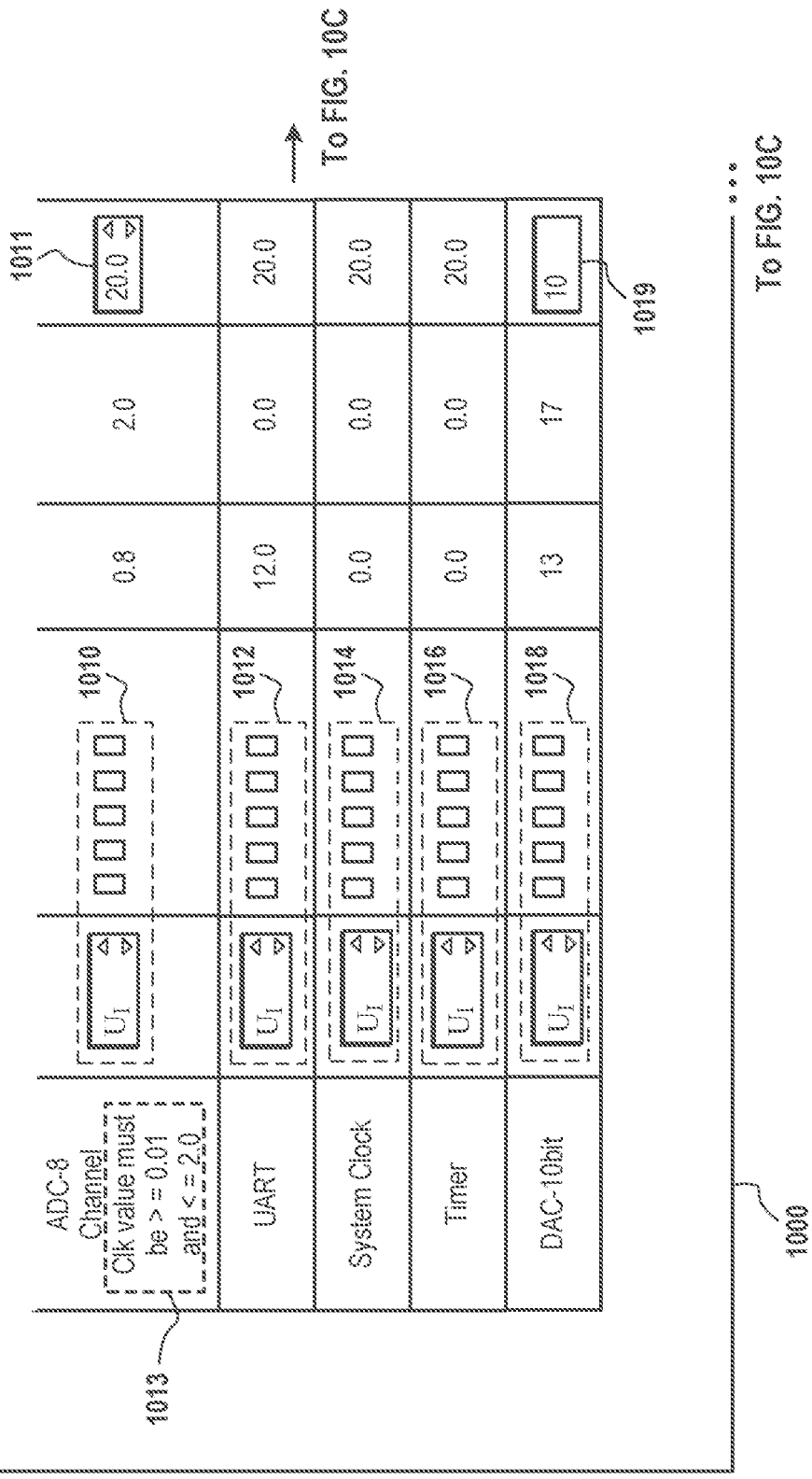
FIG. 10B is a diagram of an embodiment of a second portion of the power configuration webpage.

FIG. 10B is a diagram of an embodiment of a second portion of the power configuration webpage 1000. As another example, the power configuration webpage 1000 further includes multiple fields 1010 for receiving configuration data for configuring a level of power that is consumed by the 8-channel ADC of the template 702. The fields 1010 for receiving a selection from the input device of the customer client device 1 to indicate one of run modes 1 through 5 of operation of the 8-channel ADC or a stop mode of non-operation of the 8-channel ADC are provided. Also, in a row that includes the fields 1010, operational currents I(D) and I(A), and a frequency of a clock signal supplied by a clock source, internal or external to the SoC are provided for the 8-channel ADC. The frequency of the clock signal to be supplied to the 8-channel ADC is provided in a field 1011 on the power configuration webpage 1000. The customer 1 uses the input device of the customer client device 1 to change a value of the frequency within the field 1011 for changing a frequency of the clock signal that is provided to the 12-channel ADC.

The power configuration webpage 1000 further includes multiple fields 1012 for receiving configuration data for configuring a level of power that is consumed by the UART of the template 702. The fields 1012 for receiving a selection from the input device of the customer client device 1 to indicate one of run modes 1 through 5 of operation of the UART or a stop mode of non-operation of the UART are provided. Also, in a row that includes the fields 1012, operational currents I(D) and I(A), and a frequency of a clock signal supplied by a clock source, internal or external to the SoC are provided for the UART.

Similarly, fields 1014 and 1016 for receiving configuration data for configuring a level of power that is consumed by the system clock and the timer, respectively, of the template 702 are provided. Also, in a row that includes the fields 1014, operational currents I(D) and I(A), and a frequency of a clock signal supplied by a clock source, internal or external to the SoC are provided for the system clock and in a row that includes the fields 1016, operational currents I(D) and I(A), and a frequency of a clock signal supplied by a clock source, internal or external to the SoC are provided for the timer.

The power configuration webpage 1000 further includes multiple fields 1018 for receiving configuration data for configuring a level of power that is consumed by the 10-bit DAC of the template 702. The fields 1018 for receiving a selection from the input device of the customer client device 1 to indicate one of run modes 1 through 5 of operation of the 10-bit DAC or a stop mode of non-operation of the 10-bit DAC are provided. Also, in a row that includes the fields 1018, operational currents I(D) and I(A), and a frequency of a clock signal supplied by a clock source, internal or external to the SoC are provided for the 10-bit DAC. The frequency of the clock signal to be supplied to the 10-bit DAC is provided in a field 1019 on the power configuration webpage 1000. The customer 1 uses the input device of the customer client device 1 to change a value of the frequency within the field 1019 for changing a frequency of the clock signal that is provided to the 10-bit DAC.

Figure 10C:
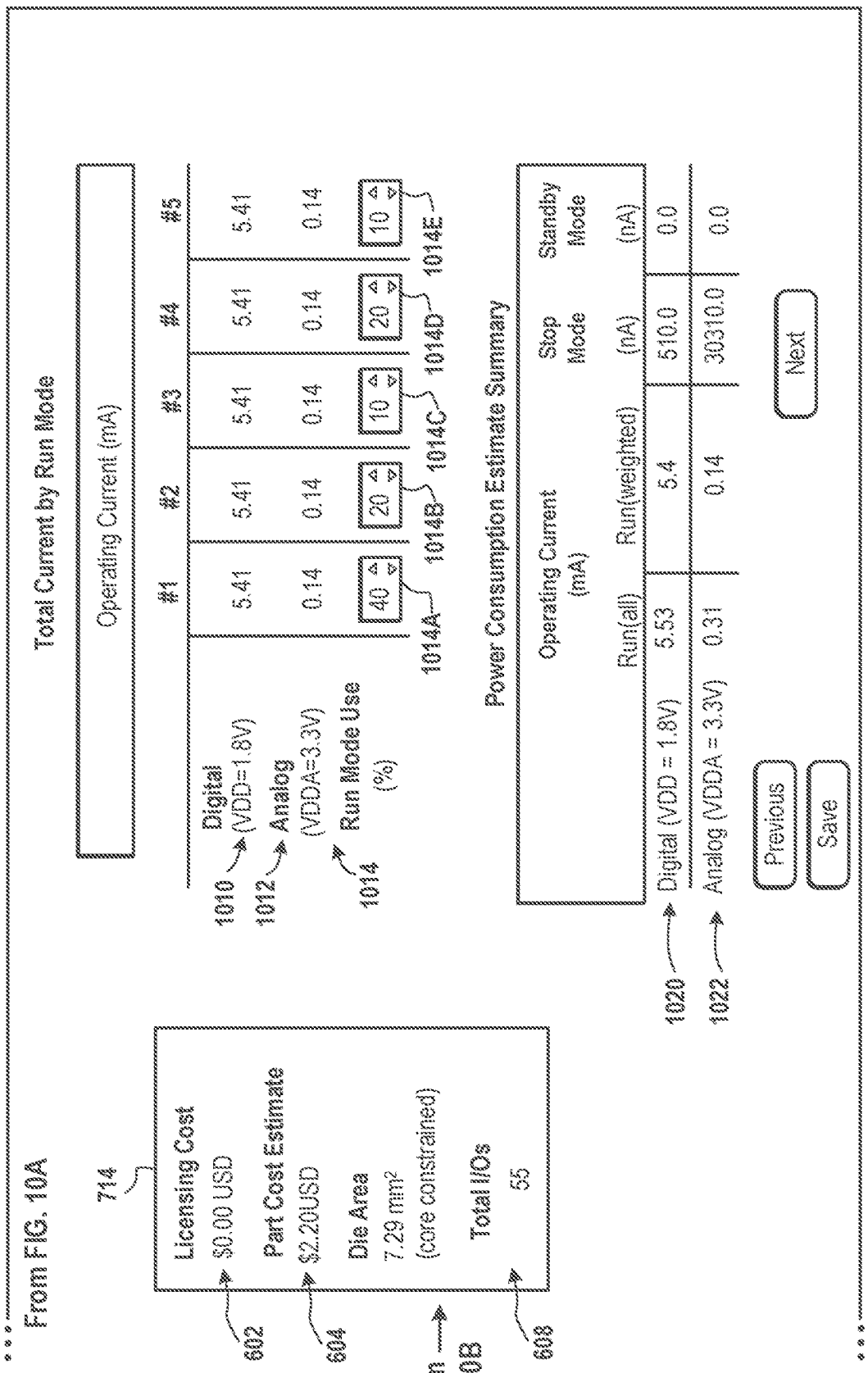
FIG. 10C is a diagram of an embodiment of a third portion of the power configuration webpage.

FIG. 10C is a diagram of an embodiment of a third portion of the power configuration webpage 1000. The power configuration webpage 1000 includes a row 1010 that includes an amount of voltage, e.g., 1.8 volts (V), of a voltage source VDD for generating a current to be supplied to the digital components of the SoC. The row 1010 further includes an amount of operational current to be supplied by the voltage source VDD during each of the run modes 1 through 5 of the digital components. Moreover, the power configuration webpage 1000 includes a row 1012 that includes an amount of voltage, e.g., 3.3 volts, of a voltage source VDDA for generating a current to be supplied to the analog components of the SoC. The row 1012 also has an amount of operational current to be supplied by the voltage source VDDA during each of the run modes 1 through 5 of the analog components.

The power configuration webpage 1000 further includes multiple fields 1014A, 1014B, 1014C, 1014D, and 1014E for receiving configuration data for configuring a percentage for which the run modes 1 through 5 are to be used during operation of the SoC. The fields 1014A, 1014B, 1014C, 1014D, and 1014E are aligned in a row 1014. Each field 1014A, 1014B, 1014C, 1014D, and 1014E includes a percentage of use of each of the run modes during the predetermined number of clock cycles. For example, the field 1014A includes configuration data indicating that the run mode 1 is to be used for 40% of a clock cycle of a clock signal supplied by a clock source, internal or external to the SoC. The field 1014B includes configuration data indicating that the run mode 2 is to be used for 20% of the clock cycle, the field 1014C includes configuration data indicating that the run mode 3 is to be used for 10% of the clock cycle, the field 1014D includes configuration data indicating that the run mode 4 is to be used for 20% of the clock cycle, and the field 1014E includes configuration data indicating that the run mode 5 is to be used for 10% of the clock cycle. The customer 1 uses the input device of the customer computing device 1 (FIG. 1A) to modify the percentage within any of the fields 1014A, 1014B, 1014C, 1014D, and 1014E.

The power configuration webpage 1000 includes a power consumption estimate summary. In a row 1020 of the power consumption estimate summary, an amount of operating current, such as 5.53 microamperes (mA), is provided and the amount of the operating current is consumed or received by the digital components of the SoC when the digital components are operational for equal amounts of time during the predetermined number of clock cycles regardless of their run modes. For example, when the 12-channel ADC is operated in the run mode 1 and the 8-channel ADC is operated in the run mode 2, both the 12-channel ADC and the 8-channel ADC are operated for the same amount of time during the predetermined number of clock cycles.

Moreover, in the row 1020, an amount of operating current, such as 5.4 mA, is provided and the amount of the operating current is consumed or received by the digital components of the SoC when the digital components are operated in their corresponding run modes for the percentages of the predetermined number of clock cycles provided in the fields 1014A through 1014E. For example, when the 12-channel ADC is operated in the run mode 1 and the 8-channel ADC is operated in the run mode 2, the 12-channel ADC is operated to consume 40% of time during a clock cycle and the 8-channel ADC is operated to consume 20% of time during the clock cycle.

Also, in the row 1020, an amount of operating current, such as 510 nanoamperes (nA), is provided and the amount of the operating current is consumed or received by the digital components of the SoC when the digital components are operated in a standby mode. In the standby mode, a digital component of the SoC receives power from a power source, such as VDD, but does not receive a clock signal from a clock source, internal or external to the SoC for operation of the digital component. In the standby mode, the digital component does not execute its functions. The digital component does not receive the clock when a switch of the SoC is turned off to prevent the digital component from obtaining the clock signal. In the row 1020, an amount of operating current, such as 0 nA, is provided and the amount of the operating current is consumed or received by the digital components of the SoC when the digital components are operated in the stop mode.

Similarly, in a row 1022 of the power consumption estimate summary, an amount of operating current, such as 0.31 mA, is provided and the amount of the operating current is consumed or received by the analog components of the SoC when the analog components are operational for equal amounts of time during the predetermined number of clock cycles regardless of their run modes. Moreover, in the row 1022, an amount of operating current, such as 0.14 mA, is provided and the amount of the operating current is consumed or received by the analog components of the SoC when the analog components are operated in their corresponding run modes for the percentages of the predetermined number of clock cycles provided in the fields 1014A through 1014E. Also, in the row 1022, an amount of operating current, such as 30310 nA, is provided and the amount of the operating current is consumed or received by the analog components of the SoC when the analog components are operated in the standby mode. In the standby mode, an analog component of the SoC receives power from a power source, such as VDDA, but does not receive a clock signal from a clock source, internal or external to the SoC. The analog component does not receive the clock when a switch of the SoC is turned off to prevent the analog component from obtaining the clock signal. In the row 1022, an amount of operating current, such as 0 nA, is provided and the amount of the operating current is consumed or received by the analog components of the SoC when the analog components are operated in the stop mode.

Any change in configuration data on the power configuration web page 1000 is sent from the input device of the customer client device 1 to the power configuration tool 196F of the customer client device 1. In response to the reception of the configuration data, the power configuration tool 196F of the customer client device 1 sends the configuration data to the parameter compute tool 196H of the customer client device 1. Upon receipt of the configuration data, the parameter compute tool 196H accesses the portion of the definition database 198H (FIG. 1F) from the memory device of the customer client device 1 to determine values of the one or more parameters based on the configuration data received within the power configuration webpage 1000. For example, the parameter compute tool 196H of the customer client device 1 identifies that a run mode of operation of the 12-channel ADC is 1 from the configuration data received on the power configuration webpage 900. The parameter compute tool 196H of the customer client device 1 further obtains from the definition database 198H an amount of power consumed by the run mode 1 of the 12-channel ADC and applies the performance rule set to determine whether the amount of power exceeds the predetermined amount of power for the SoC. The determination that the amount of power exceeds the predetermined amount of power is provided from the parameter compute tool 196H of the customer client device 1 to the feedback tool 196I of the customer client device 1. The parameter compute tool 196H of the customer client device 1 sends the amount of power to the GPU of the customer client device 1 for display on the display device of the customer client device 1.

Moreover, the feedback tool 196I of the customer client device 1 generates feedback, such as a notification or a message, indicating that the amount of power exceeds the predetermined amount of power, and sends the feedback to the GPU of the customer client device 1. The GPU of the customer client device 1 receives the amount of power and displays the amount of power within the parameter display field 714 on the power configuration webpage 1000. Moreover, the GPU of the customer client device 1 receives the feedback that the amount of power exceeds the predetermined amount of power and displays, on the power configuration webpage 1000, the feedback as a message indicating that the amount of power exceeds the predetermined amount of power. It should be noted that if no other configuration data for configuration of any other component of the SoC has been received via the power configuration webpage 900 from the power configuration tool 196F of the customer client device 1, the parameter compute tool 196H of the customer client device 1 determines that the amount of power consumed by the component for which the configuration data is received is a total amount of power consumed by the SoC.

As another example, the parameter compute tool 196H of the customer client device 1 identifies from configuration data received from the power configuration tool 196F of the customer client device 1 that the 12-channel ADC is to operate in the run mode 1. The parameter compute tool 196H of the customer client device 1 further identifies from configuration data received from the power configuration tool 196F of the customer client device 1 that the 8-channel ADC is to operate in a run mode 5. Continuing with the example, each time configuration data is received from the power configuration tool 196F of the customer client device 1, the parameter compute tool 196H of the customer client device 1 further obtains from the portion of the definition database 198H stored within the memory device of the customer client device 1, an amount of power consumed by the run modes of the components, such as the run mode 1 of the 12-channel ADC and the run mode 5 of the 8-channel ADC, for which the configuration data is received.

Continuing further with the example, each time configuration data for configuring a component of the SoC of the template 702 is received from the power configuration tool 196F of the customer client device 1, the parameter compute tool 196H of the customer client device 1 sums or adds an amount of power consumed by the run mode of the component for which the configuration data is received with one or more amounts of power consumed by one or more run modes of one or more other components of the SoC for which configuration data is previously received. To illustrate, when configuration data to configure the 8-bit channel ADC is received from the power configuration tool 196F of the customer client device 1, the parameter compute tool 196H of the customer client device 1 adds the amount of power consumed by the 8-bit channel ADC configured according to the configuration data to operate in the run mode 5 with the amount of power consumed by the 12-bit channel ADC previously configured to operate in the run mode 1 to compute a total amount of power consumed by the SoC.

Continuing with the example, each time the total amount of power is calculated, the parameter compute tool 196H of the customer client device 1 determines whether the total amount of power exceeds the predetermined amount of power for the SoC. The determination that the total amount of power exceeds the predetermined amount of power is provided from the parameter compute tool 196H of the customer client device 1 to the feedback tool 196I of the customer client device 1. The total amount of power is sent from the parameter compute tool 196H of the customer client device 1 and the feedback indicating that the total amount of power exceeds the predetermined amount of power is sent from the feedback tool 196I of the customer client device 1 to the GPU of the customer client device 1. The GPU of the customer client device 1 displays the total amount of power expected to be consumed by the SoC within the parameter display field 714 on the power configuration webpage 1000 and displays the message that the total amount of power exceeds the predetermined amount of power on the power configuration webpage 1000.

As another example, the parameter compute tool 196H of the customer client device 1 identifies that a frequency of operation of the 12-channel ADC is 20 megahertz from the configuration data received. The frequency of operation of the 12-channel ADC is received within the field 1009 (FIG. 10A). The parameter compute tool 196H of the customer client device 1 further obtains from the portion of the definition database 198H stored within the memory device of the customer client device 1, a predetermined frequency range designated for the 12-channel ADC to apply the performance rule set to determine whether the frequency of operation of the 12-channel ADC lies outside the predetermined frequency range for the 12-channel ADC. The determination that the frequency of operation of the 12-channel ADC lies outside the predetermined frequency range is provided from the parameter compute tool 196H of the customer client device 1 to the feedback tool 196I of the customer client device 1. The feedback tool 196I of the customer client device 1 generates feedback, such as a notification or a message, indicating the predetermined frequency range, and sends the feedback to the GPU of the customer client device 1. The GPU of the customer client device 1 receives the feedback and displays the feedback within a display area 1007 (FIG. 10A) on the power configuration webpage 1000. The display area 1007 is in the same row in which the fields 1008 and 1009 are located. In a similar manner, another display area 1013 (FIG. 10B) on the power configuration webpage 1000 displays feedback regarding a frequency of operation of the 8-channel exceeding the predetermined frequency range.

The power configuration webpage 1000 further includes a save button, a previous button, and a next button. When the save button on the power configuration webpage 1000 is selected by the customer 1 via the input device of the customer client device 1, configuration data received within the power configuration webpage 1000 is sent from the processor of the customer client device 1 via the computer network 102 and the customer account 1 to the power configuration tool 196F (FIG. 1F) of the DES 104. The power configuration tool 196F of the DES 104 stores the configuration data received within the power configuration webpage 1000 in the power configuration database 198F of the DES 104 and associates, such as links or establishes a one-to-one correspondence with, the configuration data with the customer account 1.

Moreover, when the next button on the power configuration webpage 1000 is selected by the customer 1 via the input device of the customer client device 1, an indication of the selection is sent from the processor of the customer client device 1 via the computer network 102 and the customer account 1 to the power configuration tool 196F of the DES 104. The power configuration tool 196F of the DES 104 provides the indication of the selection via the bus 197 (FIG. 1F) to the specification tool 196G (FIG. 1F) of the DES 104. In response to receiving the indication of the selection of the next button displayed on the power configuration webpage 1000, the specification tool 196G of the DES 104 generates or accesses webpage data for displaying a specification review webpage 1100, which is described below with reference to FIGS. 11A, 11B and 11C. The webpage data for displaying the specification review webpage 1100 is accessed from the specification database 198G of the DES 104.

When an indication of the selection of the next button on the power configuration webpage 1000 is received via the computer network 102, the specification tool 196G of the DES 104 receives the configuration data received within the webpages 700 (FIGS. 7A-7B), 800 (FIGS. 8A-8C), 900 (FIGS. 9A-9D), and 1000 (FIGS. 10A-0C) from the customer client device 1 and stores the configuration data in the specification database 198G (FIG. 1F). The specification tool 196G of the DES 104 accesses the configuration data from the specification database 198G of the DES 104 to generate a specification 1120 (FIG. 11B). The specification tool 198G of the DES 104 integrates the specification 1120 within the webpage data for the specification review webpage 1100 and sends the webpage data via the computer network 120 and the customer account 1. For example, the specification tool 196G of the DES 104 applies a Hypertext Transfer protocol (HTTP) to serve one or more files that include the specification 1120. Upon receiving the webpage data for the specification review webpage 1100, the GPU of the customer client device 1 displays the specification review webpage 1100 on the display screen 204 (FIG. 4) of the customer client device 1.

In one embodiment, the predetermined frequency range for the 12-channel ADC is different from the predetermined frequency range for the 8-channel ADC. For example, the predetermined frequency range for the 12-channel ADC is between 0.05 and 2 megahertz and the predetermined frequency range for the 8-channel ADC is between 0.01 and 2 megahertz.

Figure 11A:
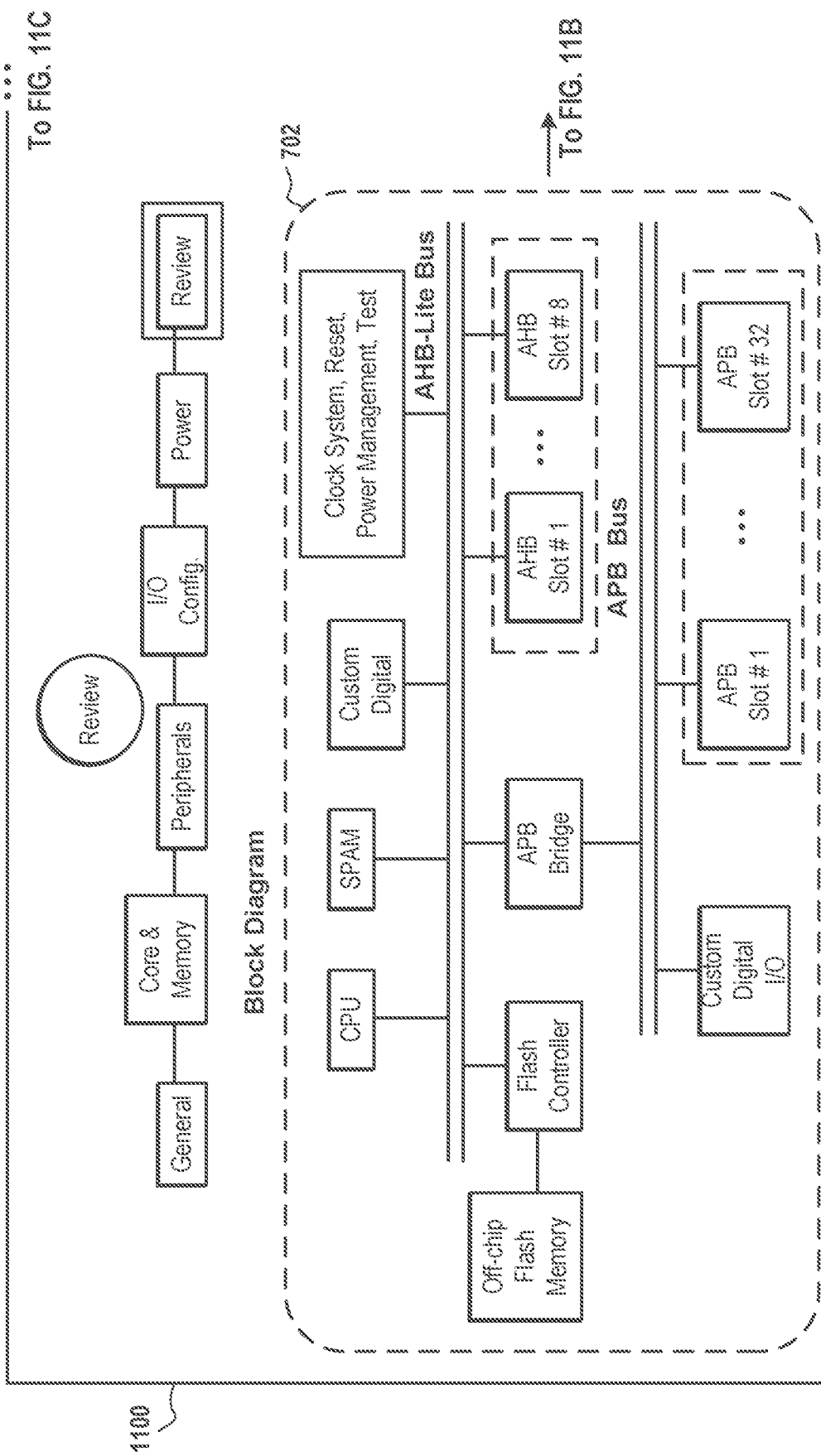
FIG. 11A is a diagram of an embodiment of a first portion of a specification review webpage.
Figure 11B:
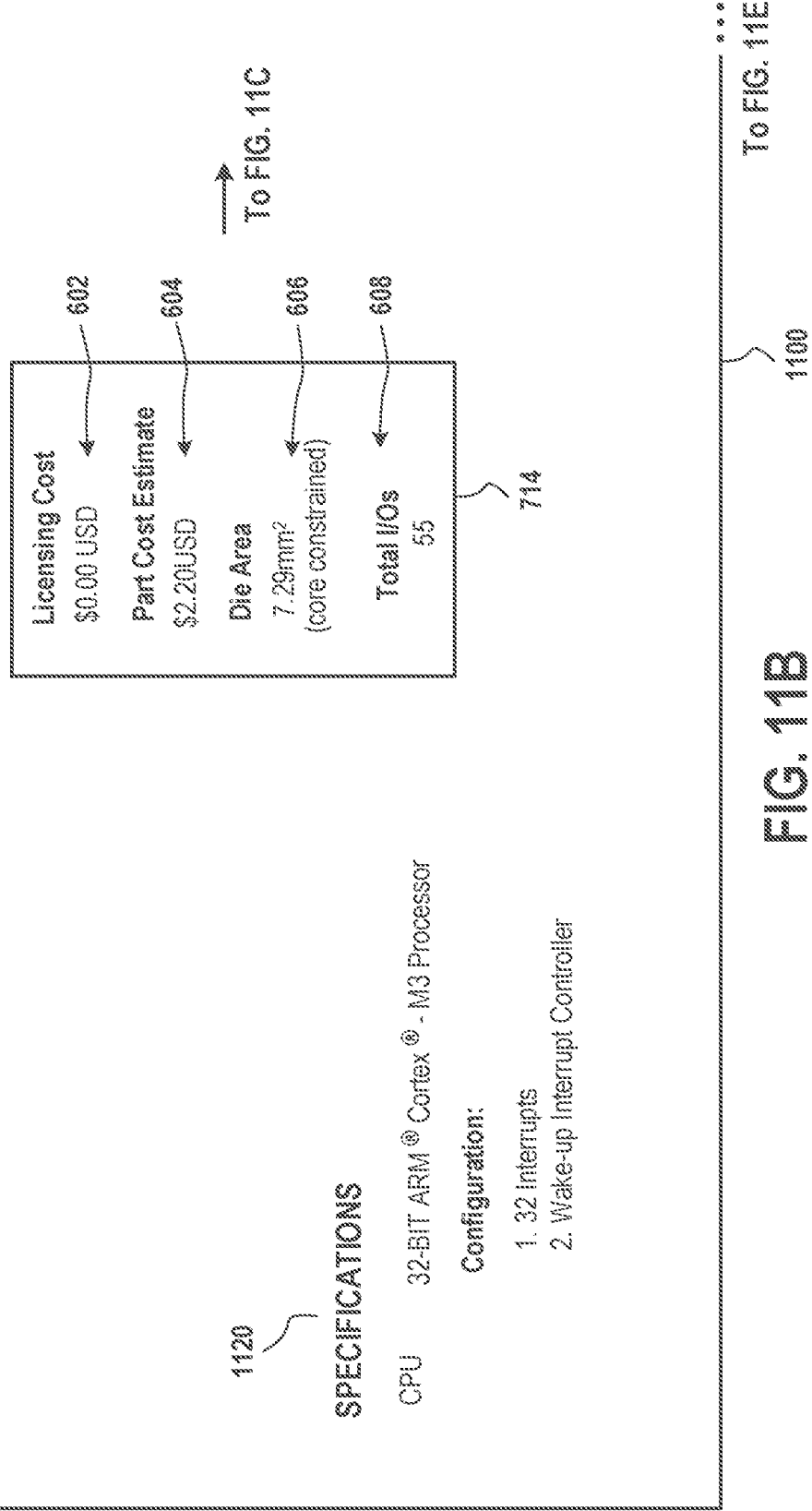
FIG. 11B is a diagram of an embodiment of a second portion of the specification review webpage.

FIG. 11A is a diagram of an embodiment of a first portion of the specification review webpage 1100. The specification review webpage 1100 includes the template 702 that is configured according to the configuration data received within the webpages 700 (FIGS. 7A-7B), 800 (FIGS. 8A-8C), 900 (FIGS. 9A-9D), and 1000 (FIGS. 10A-10C).

FIG. 11B is a diagram of an embodiment of a second portion of the specification review webpage 1100. The specification review webpage 1100 includes the specification 1120 of the SoC that is configured according to the configuration data received within the webpages 700 (FIGS. 7A-7B), 800 (FIGS. 8A-8C), 900 (FIGS. 9A-9D), and 1000 (FIGS. 10A-10C). Also, the specification review webpage 1100 includes the parameter display field 714. The parameter display field 714 includes values of the one or more parameters of the SoC that is configured according to the configuration data.

FIG. 11C is a diagram of an embodiment of a third portion of the specification review webpage 1100.

FIG. 11D is a diagram of an embodiment of a fourth portion of the specification review webpage 1100.

FIG. 11E is a diagram of an embodiment of a fifth portion of the specification review webpage 1100. The specification review webpage 1100 includes the diagram 938 of a top view of the other package QFN 56—7×7. Moreover, the specification review webpage 1100 includes the power consumption estimate having the rows 1020 and 1022.

It should be noted that in one embodiment, webpage data for generating and updating any of the webpages described above is created by a client device, described herein, such as the customer client device 1, and the one or more servers of the DES 104 (FIG. 1A). For example, any real-time update of configuration data displayed on any of the webpages is performed by a processor of the client device via a web browser and JavaScript, and other functions, described herein, such as generating the webpage data, are executed by the one or more servers of the DES 104. The Javascript achieves the real-time update to achieve a dynamic display of the webpages and the web browser is used to interpret the configuration data received at the client device via an input device of the client device. Other functions, such as the save and publish functions, described above, are executed by the one or more servers of the DES 104 as part of a request from the client device to update data stored within the DES 104. The compiler 154 (FIG. 1B) used for generating one or more SoC design files is not used for updating the configuration data in real-time at the client device. Examples of the configuration data include the configuration data 140 (FIG. 1B), the additional configuration data 142 (FIG. 1B), and the further configuration data.

In one embodiment, the functions described herein as being performed by the parameter compute tool 196H or by the feedback tool 196I, or both the parameter computer tool 196H and the feedback tool 196I are performed by the compiler 154.

In one embodiment, the terms requester and customer are used herein interchangeably. For example, the customer 1 is a requester 1 and the customer client device 1 is a requester client device 1.

It should be noted that some of the above-described embodiments are described with respect to functions executed by one or more servers. In various embodiments, the functions described herein as being performed by the one or more servers are performed by one or more processors of the one or more servers.

It should be noted that some of the above-described embodiments are described with respect to functions executed by a server. In various embodiments, the functions described herein as being performed by one server are performed by multiple servers, such as two or more servers. For example, one of the multiple servers performs some of the functions and another one of the servers performed remaining of the functions.

It should further be noted that some of the above-described embodiments are described with respect to functions executed by a processor of a client device. In various embodiments, the functions described herein as being performed by the processor of the client device are performed by two processors of the client device. For example, a function of displaying one or more parameters on a display device of the client device is performed by a graphical processing unit (GPU) of the client device.

It should be noted that some of the above-described embodiments are described with respect to functions executed by a processor, such as a processor of a server. In various embodiments, the functions described herein as being performed by one processor of a server are performed by multiple processors, such as two or more processors, of the server or of different servers. For example, one of the multiple processors performs some of the functions and another one of the processors performed remaining of the functions.

In one aspect, one or more embodiments described in the present disclosure are fabricated as computer-readable code on a computer-readable storage medium, which is a storage device or a memory device. The computer-readable storage medium holds data which is readable by a processor. Examples of the computer-readable storage medium include network attached storage (NAS), a memory device, a ROM, a RAM, a combination of RAM and ROM, a Compact Disc (CD), a Blu-Ray™ disc, a flash memory, a hard disk, and a magnetic tape. The computer-readable storage medium, in one embodiment, is distributed over a network-coupled computer system so that the computer readable code is stored and executed in a distributed fashion.

In one embodiment, some features described in one of the embodiments described above are combined with some features described in another one of the embodiments described above.

Although the embodiments described in the present disclosure have been described in detail for purposes of clarity of understanding, it will be apparent that certain changes and modifications can be practiced within the scope of the appended claims. Accordingly, the embodiments are to be considered as illustrative and not restrictive, and the embodiments are not to be limited to the details given herein, but may be modified within the scope and equivalents of the appended claims.

The invention claimed is:

1. A method comprising:
    receiving, at a client device via an online account, a selection identifying a template for designing a system-on-a-chip (SoC);
    sending the selection identifying the template from the client device via a computer network to a server system;
    in response to said sending the selection identifying the template, receiving, by the client device via the computer network, a parameter compute tool from the server system;
    receiving, at the client device, a first set of configuration data via the online account, wherein the first set of configuration data is used to configure one or more components of the template of the SoC; and
    upon receiving the first set of configuration data, applying, at the client device, the parameter compute tool to the first set of configuration data to generate a first set of parameters for the one or more components of the template of the SoC.

2. The method of claim 1, further comprising:
    receiving a request, via the online account, to publish the template with the first set of configuration data;
    in response to the request, generating a configuration file having the template and the first set of configuration data;
    sending the configuration file via the computer network to the server system.

3. The method of claim 1, wherein the first set of parameters is generated before a second set of configuration data to configure one or more additional components of the SoC is received.

4. The method of claim 1, wherein the template is to be used for a technology application of the SoC and a foundry that fabricates the SoC, wherein the SoC is to be fabricated by the foundry, the method further comprising:
    receiving, via the online account, a selection identifying another template for designing an additional SoC, wherein the other template is to be used for another technology application and is to be fabricated by another foundry.

5. The method of claim 1, wherein in response to said sending the selection identifying the template, receiving, via the computer network, a configuration tool from the server system, wherein the configuration tool is executed apply the first set of configuration data to configure a core of the SoC, a memory of the SoC, a peripheral to be coupled to the SoC, and a number of input/output pins to be assigned to the peripheral.

6. The method of claim 1, wherein the parameter compute tool is applied to determine an amount of area on a wafer die occupied by the one or more components configured according to the first configuration data, an amount of licensing costs for licensing intellectual property of the one or more components configured according to the first configuration data, a total number of input/output pins of the SoC having the one or more components configured according to the first configuration data, and a cost of fabricating the SoC having the one or more components configured according to the first configuration data.

7. The method of claim 1, further comprising:
displaying the first set of parameters on a display device besides a graphical representation of the first set of configuration data on the display device;
receiving a second set of configuration data via the online account, wherein the second set of configuration data is used to configure the one or more components of the template of the SoC;
displaying a graphical representation of the second set of configuration data on the display device;
upon receiving the second set of configuration data, applying the parameter compute tool to the second set of configuration data to modify the first set of configuration data, wherein the first set of configuration data is modified to generate a second set of parameters for the one or more components of the template of the SoC; and
updating the first set of parameters to the second set of parameters to display the second set of parameters on the display device, wherein the second set of parameters are displayed besides the graphical representation of the second set of configuration data.

8. The method of claim 1, wherein in response to said sending the selection identifying the template, receiving, via the computer network, a configuration tool from the server system via the computer network, the method further comprising:
executing, by a processor of the client device, the configuration tool to configure the one or more components of the template of the SoC according to the first set of configuration data; and
executing, by the processor, the parameter compute tool to determine the first set of parameters based on the first set of configuration data.

9. A client device comprising:
a processor configured to:
receive, via an online account, a selection identifying a template for designing a system-on-a-chip (SoC);
send the selection identifying the template via a computer network to a server system;
receive, via the computer network, a parameter compute tool from the server system in response to the selection identifying the template being sent;
receive a first set of configuration data via the online account, wherein the first set of configuration data is used to configure one or more components of the template of the SoC; and
apply the parameter compute tool to the first set of configuration data to generate a first set of parameters for the one or more components of the template of the SoC; and
a memory device coupled to the processor.

10. The client device of claim 9, wherein the processor is configured to:
receive a request, via the online account, to publish the template with the first set of configuration data;
in response to the request, generate a configuration file having the template and the first set of configuration data;
send the configuration file via the computer network to the server system.

11. The client device of claim 9, wherein the first set of parameters is generated before a second set of configuration data to configure one or more additional components of the SoC is received.

12. The client device of claim 9, wherein the template is to be used for a technology application of the SoC and a foundry that fabricates the SoC, wherein the SoC is to be fabricated by the foundry, wherein the processor is configured to:
receive, via the online account, a selection identifying another template for designing an additional SoC, wherein the other template is to be used for another technology application and is to be fabricated by another foundry.

13. The client device of claim 9, wherein the processor is configured to receive, via the computer network, a configuration tool from the server system in response to the selection identifying the template being sent, wherein the configuration tool is executed apply the first set of configuration data to configure a core of the SoC, a memory of the SoC, a peripheral to be coupled to the SoC, and a number of input/output pins to be assigned to the peripheral.

14. The client device of claim 9, wherein the parameter compute tool is applied to determine an amount of area on a wafer die occupied by the one or more components configured according to the first configuration data, an amount of licensing costs for licensing intellectual property of the one or more components configured according to the first configuration data, a total number of input/output pins of the SoC having the one or more components configured according to the first configuration data, and a cost of fabricating the SoC having the one or more components configured according to the first configuration data.

15. The client device of claim 9, wherein the processor is configured to:
control a display device to display the first set of parameters besides a graphical representation of the first set of configuration data on the display device;
receive a second set of configuration data via the online account, wherein the second set of configuration data is used to configure the one or more components of the template of the SoC;
control the display device to display a graphical representation of the second set of configuration data on the display device;
when the second set of configuration data is received, apply the parameter compute tool to the second set of configuration data to modify the first set of configuration data, wherein the first set of configuration data is modified to generate a second set of parameters for the one or more components of the template of the SoC; and
update the display of the first set of parameters to the second set of parameters, wherein the second set of parameters are displayed besides the graphical representation of the second set of configuration data.

16. The client device of claim 9, wherein the processor is configured:
receive, via the computer network, a configuration tool from the server system in response to the selection identifying the template being sent;
execute the configuration tool to configure the one or more components of the template of the SoC according to the first set of configuration data; and
execute the parameter compute tool to determine the first set of parameters based on the first set of configuration data.

17. A non-transitory computer-readable medium containing program instructions, wherein execution of the program instructions by one or more processors of a computer system causes the one or more processors to carry out a plurality of operations comprising:
- receiving, at a client device via an online account, a selection identifying a template for designing a system-on-a-chip (SoC);
- sending the selection identifying the template from the client device via a computer network to a server system;
- in response to said sending the selection identifying the template, receiving, by the client device via the computer network, a parameter compute tool from the server system;
- receiving, at the client device, a first set of configuration data via the online account, wherein the first set of configuration data is used to configure one or more components of the template of the SoC; and
- upon receiving the first set of configuration data, applying, at the client device, the parameter compute tool to the first set of configuration data to generate a first set of parameters for the one or more components of the template of the SoC.

18. The non-transitory computer-readable medium of claim 17, wherein the plurality of operations comprise:
- receiving a request, via the online account, to publish the template with the first set of configuration data;
- in response to the request, generating a configuration file having the template and the first set of configuration data;
- sending the configuration file via the computer network to the server system.

19. The non-transitory computer-readable medium of claim 17, wherein the first set of parameters is generated before a second set of configuration data to configure one or more additional components of the SoC is received.

20. The non-transitory computer-readable medium of claim 17 wherein the plurality of operations comprise:
- displaying the first set of parameters on a display device besides a graphical representation of the first set of configuration data on the display device;
- receiving a second set of configuration data via the online account, wherein the second set of configuration data is used to configure the one or more components of the template of the SoC;
- displaying a graphical representation of the second set of configuration data on the display device;
- upon receiving the second set of configuration data, applying the parameter compute tool to the second set of configuration data to modify the first set of configuration data, wherein the first set of configuration data is modified to generate a second set of parameters for the one or more components of the template of the SoC; and
- updating the first set of parameters to the second set of parameters to display the second set of parameters on the display device, wherein the second set of parameters are displayed besides the graphical representation of the second set of configuration data.

21. The non-transitory computer-readable medium of claim 17, wherein in response to said sending the selection identifying the template, receiving, via the computer network, a configuration tool from the server system via the computer network, wherein the plurality of operations comprise:
- executing, by a processor of the client device, the configuration tool to configure the one or more components of the template of the SoC according to the first set of configuration data; and
- executing, by the processor, the parameter compute tool to determine the first set of parameters based on the first set of configuration data.

* * * * *